(12) United States Patent
Pallardy et al.

(10) Patent No.: US 12,373,374 B2
(45) Date of Patent: Jul. 29, 2025

(54) METHOD FOR MANAGING THE OPERATION OF A SYSTEM ON CHIP, AND CORRESPONDING SYSTEM ON CHIP

(71) Applicants: STMicroelectronics (Rousset) SAS, Rousset (FR); STMicroelectronics (Grand Ouest) SAS, Le Mans (FR)

(72) Inventors: Loic Pallardy, Rouillon (FR); Nicolas Saux, Aix-en-Provence (FR)

(73) Assignees: STMICROELECTRONICS (GRAND OUEST) SAS, Le Mans (FR); STMICROELECTRONICS (ROUSSET) SAS, Rousset (FR)

( * ) Notice: Subject to any disclaimer, the term of this patent is extended or adjusted under 35 U.S.C. 154(b) by 83 days.

(21) Appl. No.: 17/587,954

(22) Filed: Jan. 28, 2022

(65) Prior Publication Data

US 2022/0156217 A1 May 19, 2022

Related U.S. Application Data

(63) Continuation-in-part of application No. 16/951,198, filed on Nov. 18, 2020, now Pat. No. 11,700,174.

(51) Int. Cl.
*G06F 13/362* (2006.01)
*G06F 13/40* (2006.01)

(52) U.S. Cl.
CPC ........ *G06F 13/4068* (2013.01); *G06F 13/362* (2013.01)

(58) Field of Classification Search
CPC .............. G06F 13/4058; G06F 13/362; G06F 13/4072; G06F 13/4081

USPC .......................................... 709/220, 224–228
See application file for complete search history.

(56) References Cited

U.S. PATENT DOCUMENTS

| | | | |
|---|---|---|---|
| 5,919,255 | A | 7/1999 | Seshan et al. |
| 6,138,228 | A | 10/2000 | Douady |
| 6,145,041 | A | 11/2000 | Chambers |
| 6,546,496 | B1 | 4/2003 | Wang et al. |
| 7,228,440 | B1 | 6/2007 | Giles et al. |
| 7,353,259 | B1 | 4/2008 | Bakke et al. |

(Continued)

FOREIGN PATENT DOCUMENTS

| | | | | |
|---|---|---|---|---|
| BR | 102014006206 A2 | * | 10/2015 | ............... G06F 1/26 |
| BR | 112013025855 B1 | | 8/2021 | |

(Continued)

OTHER PUBLICATIONS

Gerstlauer, A., "EE382V System-on-a-Chip (SoC) Design, Lecture 12—SoC Communication Architectures," University of Texas at Austin, © 2014 A. Gerstlauer, 43 pages.

(Continued)

*Primary Examiner* — Khanh Q Dinh
(74) *Attorney, Agent, or Firm* — Slater Matsil, LLP

(57) ABSTRACT

A system including a first port configured to simultaneously couple with a first device and a second device; and a management circuit configured to route a data signal received from a first controller to the first device in response to receiving a first-device direction from the first controller and route the data signal received from the first controller to the second device in response to receiving a second-device direction from the first controller unless an override condition for the management circuit is satisfied.

20 Claims, 25 Drawing Sheets

(56) References Cited

U.S. PATENT DOCUMENTS

| | | | |
|---|---|---|---|
| 7,870,455 B2 | 1/2011 | Mayer | |
| 9,091,727 B1 | 7/2015 | Lupu et al. | |
| 9,143,392 B2 | 9/2015 | Duchesneau | |
| 9,548,731 B2* | 1/2017 | Shah | H10D 89/10 |
| 9,703,944 B2 | 7/2017 | Hopkins et al. | |
| 9,946,674 B2 | 4/2018 | Mayer et al. | |
| 10,042,342 B1* | 8/2018 | Tyrrell | H02J 13/00002 |
| 10,176,131 B1 | 1/2019 | Arbel | |
| 10,359,827 B1* | 7/2019 | Amarilio | G06F 9/30141 |
| 10,372,883 B2 | 8/2019 | Hurst et al. | |
| 10,983,937 B2 | 4/2021 | Ferrand et al. | |
| 11,050,570 B1 | 6/2021 | Totah et al. | |
| 11,088,876 B1 | 8/2021 | Farjadrad | |
| 11,112,418 B1 | 9/2021 | Holmes et al. | |
| 11,144,235 B1 | 10/2021 | Lyons et al. | |
| 11,175,839 B1 | 11/2021 | Volpe et al. | |
| 11,182,110 B1 | 11/2021 | Ansari et al. | |
| 11,308,573 B2* | 4/2022 | Nystad | G06F 12/10 |
| 11,700,174 B2* | 7/2023 | Anquet | H04L 49/109 710/10 |
| 2002/0083387 A1 | 6/2002 | Miner et al. | |
| 2003/0035371 A1* | 2/2003 | Reed | H04L 49/254 370/419 |
| 2003/0108030 A1 | 6/2003 | Gao | |
| 2004/0064757 A1 | 4/2004 | Jahnke | |
| 2004/0073759 A1 | 4/2004 | Arimilli et al. | |
| 2004/0075478 A1 | 4/2004 | Correale | |
| 2004/0095942 A1* | 5/2004 | Lung | H04W 28/12 370/465 |
| 2004/0158784 A1 | 8/2004 | Abuhamdeh et al. | |
| 2004/0216080 A1 | 10/2004 | Roesner et al. | |
| 2005/0188248 A1 | 8/2005 | O'Brien et al. | |
| 2005/0235281 A1 | 10/2005 | Lefrancois | |
| 2006/0174163 A1 | 8/2006 | Gravoille et al. | |
| 2006/0193273 A1 | 8/2006 | Passier et al. | |
| 2006/0239692 A1 | 10/2006 | Lee et al. | |
| 2007/0116023 A1 | 5/2007 | Tatapudi et al. | |
| 2007/0182445 A1 | 8/2007 | Chen et al. | |
| 2008/0062891 A1 | 3/2008 | Van Der Merwe | |
| 2008/0123423 A1 | 5/2008 | Kim | |
| 2008/0183305 A1 | 7/2008 | Foster et al. | |
| 2008/0204089 A1 | 8/2008 | Nakasha | |
| 2008/0209007 A1 | 8/2008 | Gurecki | |
| 2009/0324764 A1 | 12/2009 | Sekihara et al. | |
| 2010/0067507 A1 | 3/2010 | Park | |
| 2011/0016310 A1 | 1/2011 | Yong | |
| 2011/0016338 A1 | 1/2011 | Williamson et al. | |
| 2012/0030730 A1 | 2/2012 | Smith et al. | |
| 2012/0079590 A1 | 3/2012 | Sastry et al. | |
| 2012/0239895 A1 | 9/2012 | Zbiciak et al. | |
| 2012/0266230 A1 | 10/2012 | Vanderpol et al. | |
| 2013/0047037 A1 | 2/2013 | Moyer | |
| 2013/0059576 A1 | 3/2013 | Park et al. | |
| 2013/0151829 A1 | 6/2013 | Amann et al. | |
| 2014/0006644 A1 | 1/2014 | Pullagoundapatti et al. | |
| 2015/0113100 A1 | 4/2015 | Tweedale et al. | |
| 2015/0234734 A1 | 8/2015 | Agrawal | |
| 2015/0339435 A1 | 11/2015 | Greenberg | |
| 2016/0019180 A1 | 1/2016 | Liu et al. | |
| 2016/0179646 A1 | 6/2016 | Neve De Mevergnies et al. | |
| 2016/0179740 A1 | 6/2016 | Halleck | |
| 2016/0234686 A1* | 8/2016 | Bone | H04W 4/70 |
| 2016/0350225 A1 | 12/2016 | Podaima et al. | |
| 2016/0373106 A1* | 12/2016 | Shah | H10D 30/4755 |
| 2017/0147807 A1 | 5/2017 | Rooyakkers | |
| 2018/0013578 A1 | 1/2018 | Gozloo et al. | |
| 2018/0039598 A1* | 2/2018 | Mishra | G06F 13/364 |
| 2018/0342252 A1* | 11/2018 | Fuchs | H04S 3/008 |
| 2019/0056875 A1 | 2/2019 | Nimura | |
| 2019/0108149 A1* | 4/2019 | Graif | G06F 13/4291 |
| 2019/0179645 A1 | 6/2019 | Prasad | |
| 2019/0294344 A1* | 9/2019 | Hahn | G06F 3/0614 |
| 2019/0303328 A1 | 10/2019 | Balski et al. | |
| 2020/0004994 A1* | 1/2020 | Hershman | G06F 21/85 |
| 2020/0065280 A1 | 2/2020 | Huang et al. | |
| 2020/0073836 A1* | 3/2020 | Graif | G06F 1/10 |
| 2020/0092449 A1 | 3/2020 | Chang | |
| 2020/0120024 A1* | 4/2020 | Padavala | H04L 63/029 |
| 2021/0058336 A1* | 2/2021 | Muralidharan | H04L 47/6245 |
| 2021/0058970 A1* | 2/2021 | Kwak | H04W 72/23 |
| 2021/0152620 A1* | 5/2021 | Amarilio | H04S 1/007 |
| 2021/0157668 A1 | 5/2021 | Pallardy et al. | |
| 2021/0160134 A1 | 5/2021 | Anquet et al. | |
| 2021/0160193 A1 | 5/2021 | Olson et al. | |

FOREIGN PATENT DOCUMENTS

| | | | | |
|---|---|---|---|---|
| CA | 2779774 A1 | * | 11/2013 | G06Q 20/3574 |
| CN | 1497468 A | | 5/2004 | |
| CN | 104219115 A | * | 12/2014 | |
| EP | 2521345 A2 | | 11/2012 | |
| EP | 2621136 A2 | | 7/2013 | |
| FR | 3003054 A1 | | 9/2014 | |
| WO | 2016099812 A1 | | 6/2016 | |

OTHER PUBLICATIONS

Rao, V.R. et al., "A Frame Work on AMBA Bus Based Communication Architecture to Improve the Real Time Computing Performance in MPSoC," International Journal of Computer Applications (0975-8887), vol. 91, No. 5, Apr. 2014, 5 pages.

"Octo-SPI Interface on STM32 Microcontrollers," AN5050, Revision 7, Application Note, STMicroelectronics, Sep. 2021, 74 pages.

"SPC58EHx/SPC58NHx N OctalSPI IO Manager," TN1365, Technical Note, STMicroelectronics, 2021, 8 pages.

Zhu, Guoqing et al., "Dual-cpu Data Processing System on the Basis of DSP and Singlechip", Beijing Institute of Technology, China, 1002-8331-(2005)21-0113-03, A, TP274+2, 6 pages.

* cited by examiner

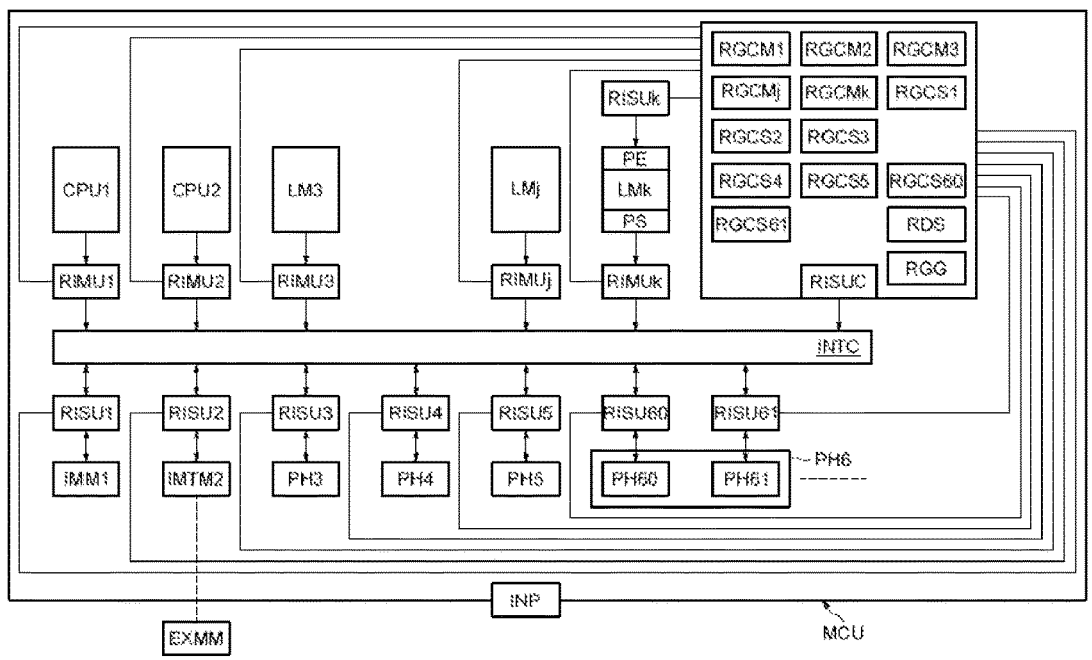
[Fig 1]

[Fig 2]
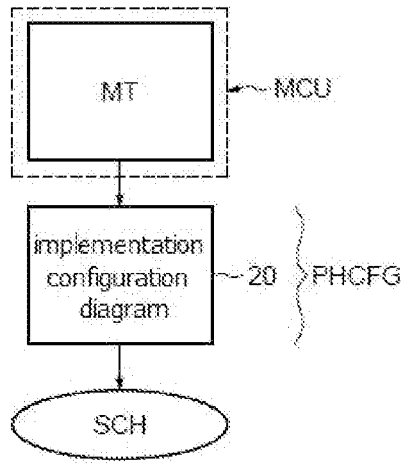
[Fig 3]
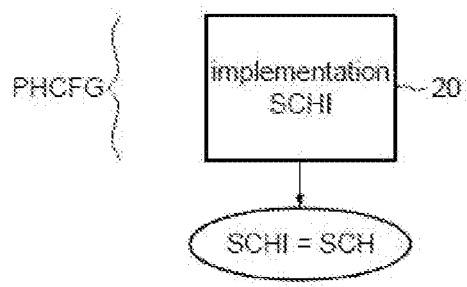
[Fig 4]
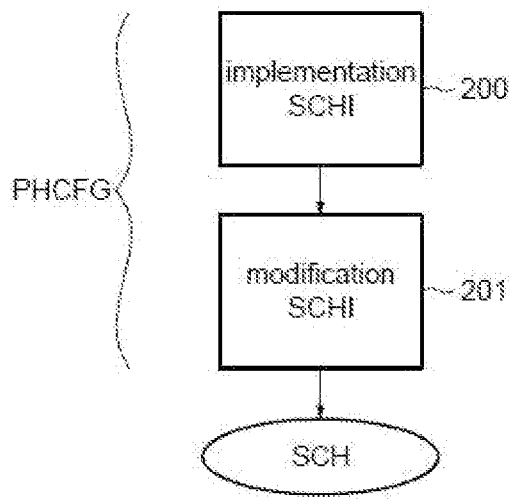

[Fig 5]
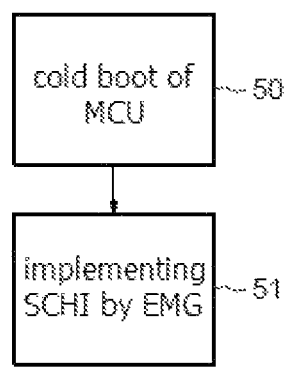
[Fig 6]
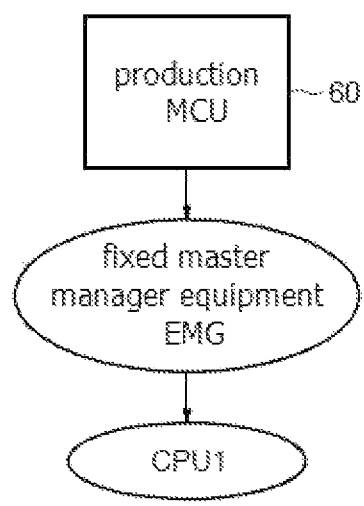

[Fig 7]
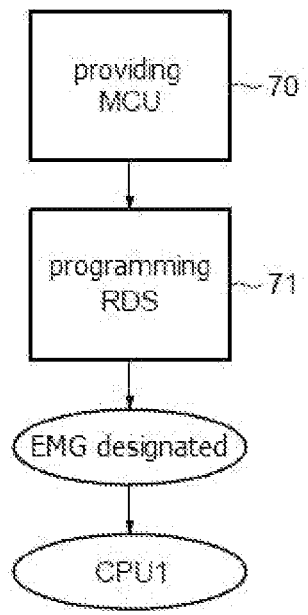
[Fig 8]
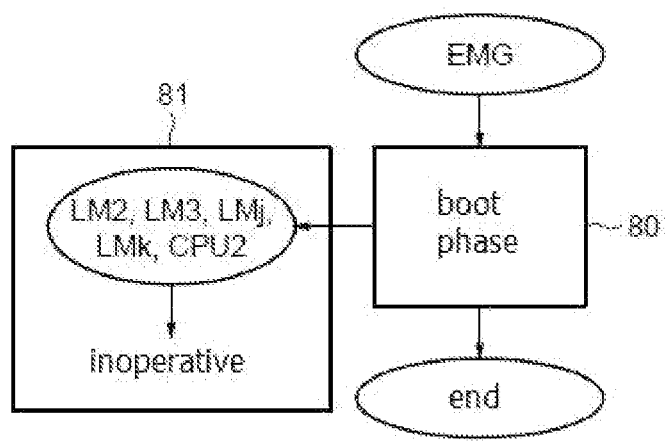

[Fig 9]
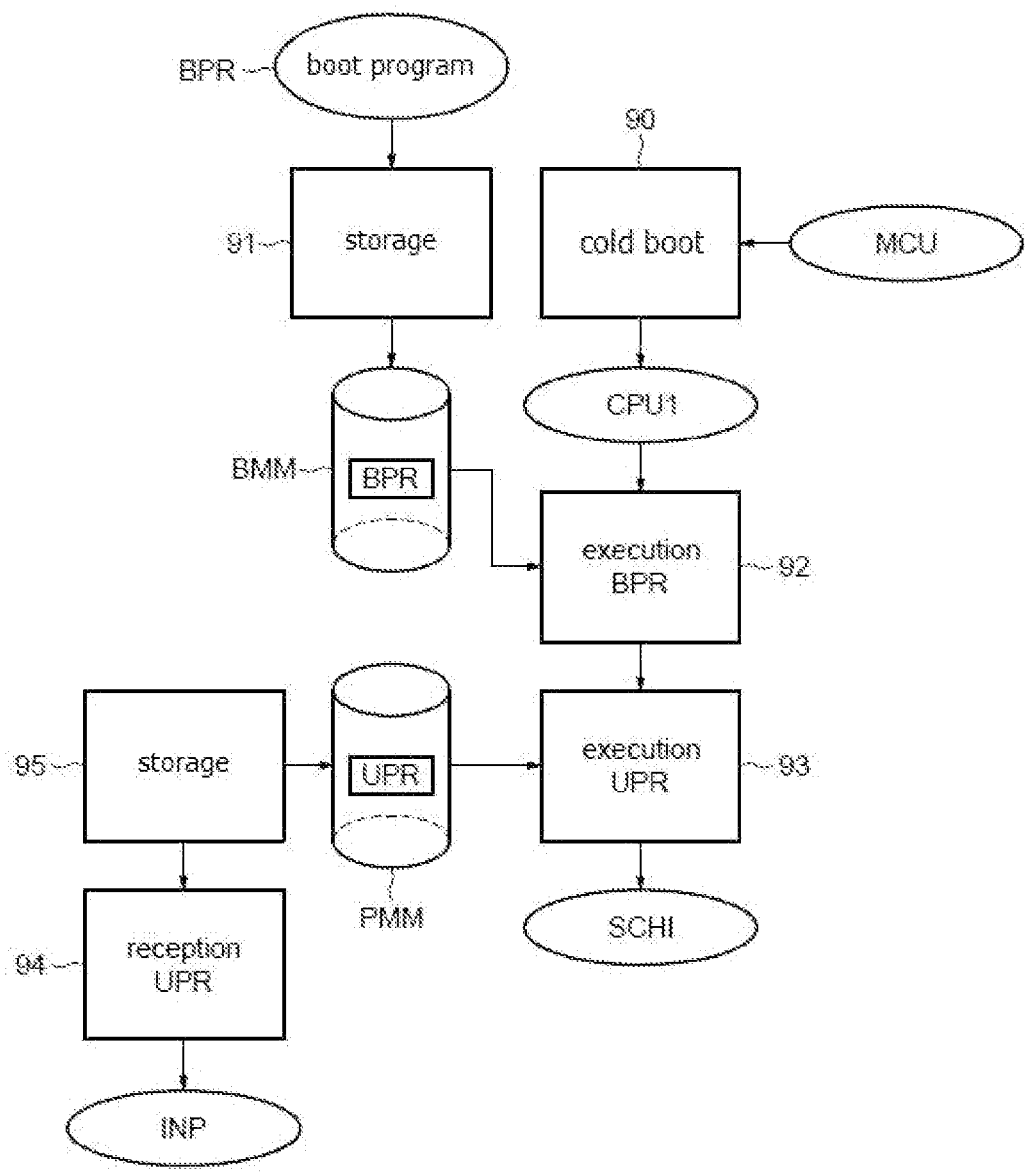

[Fig 10]
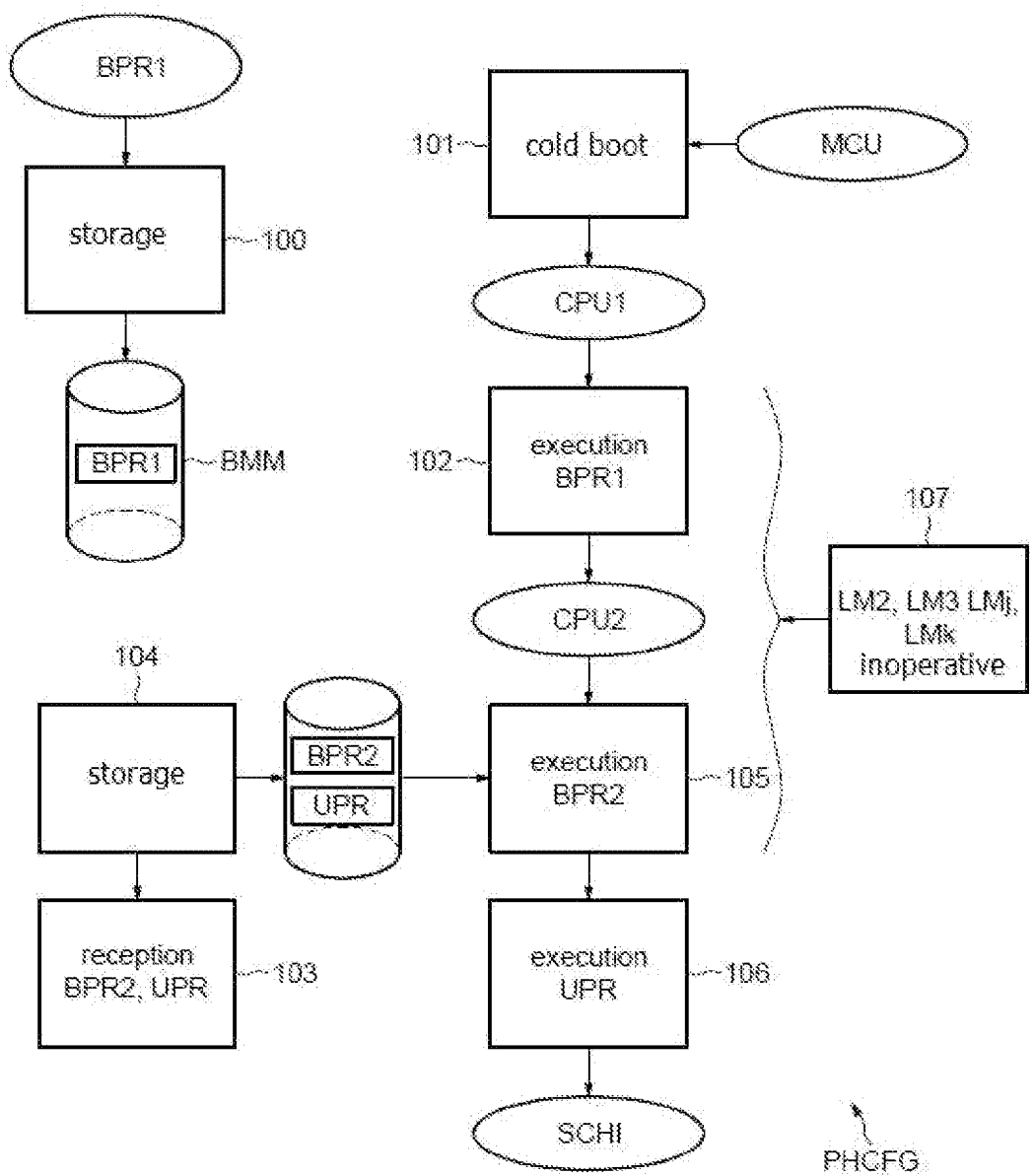

[Fig 11]
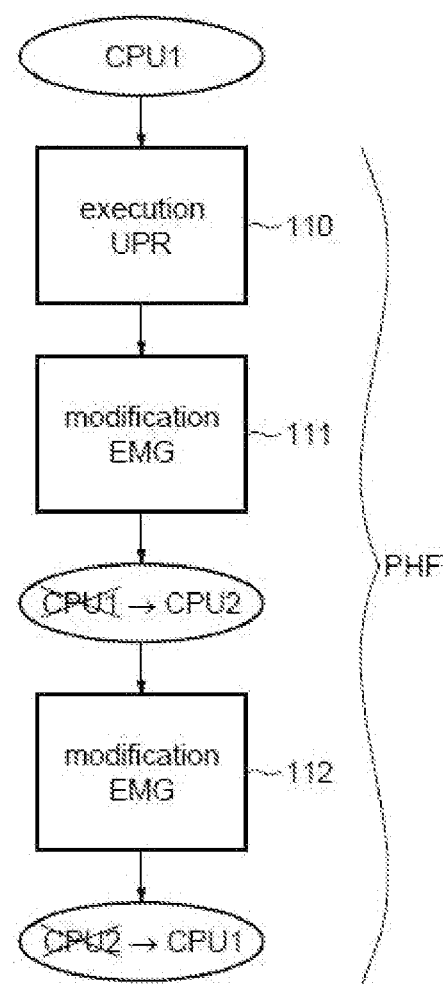

[Fig 12]
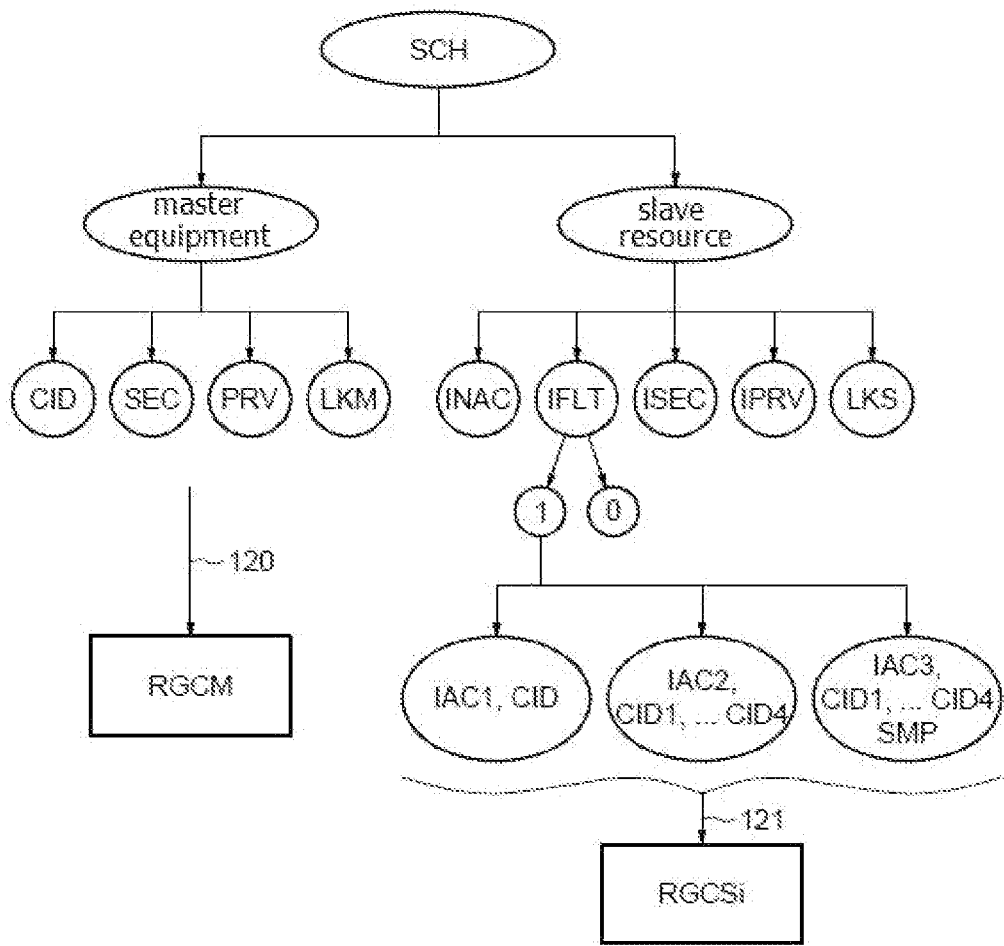
[Fig 13]
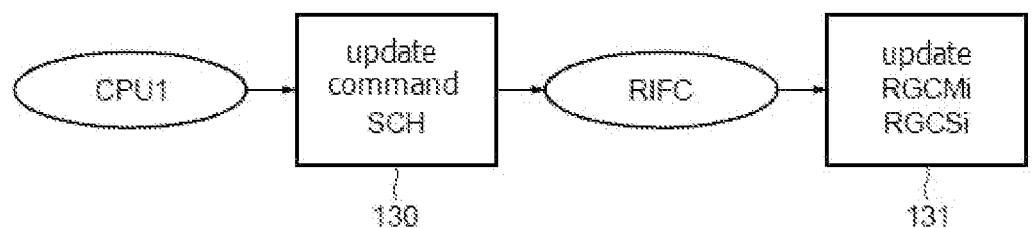

[Fig 14]
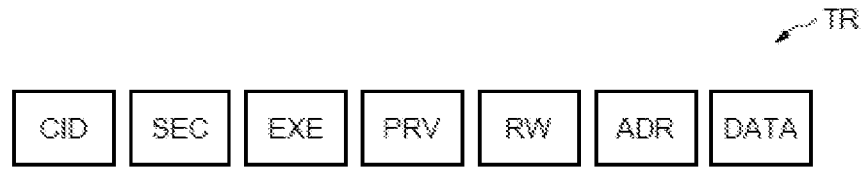
[Fig 15]
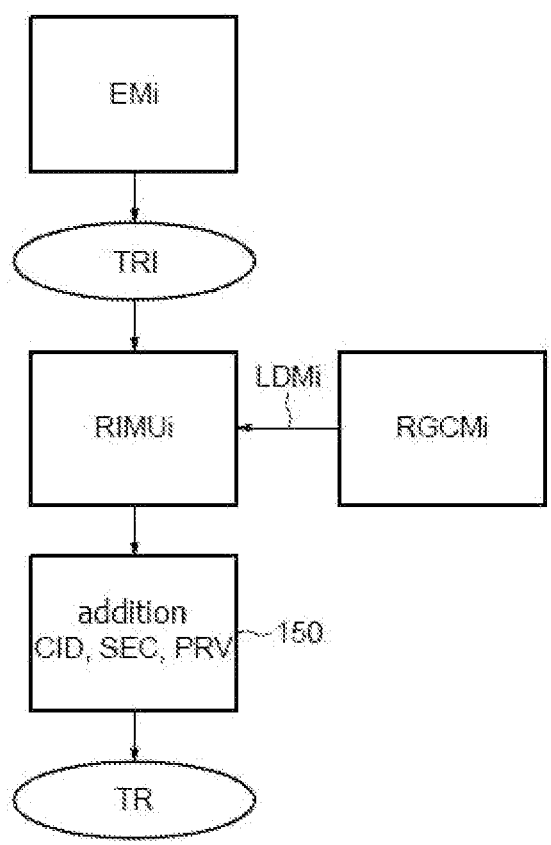

[Fig 16]
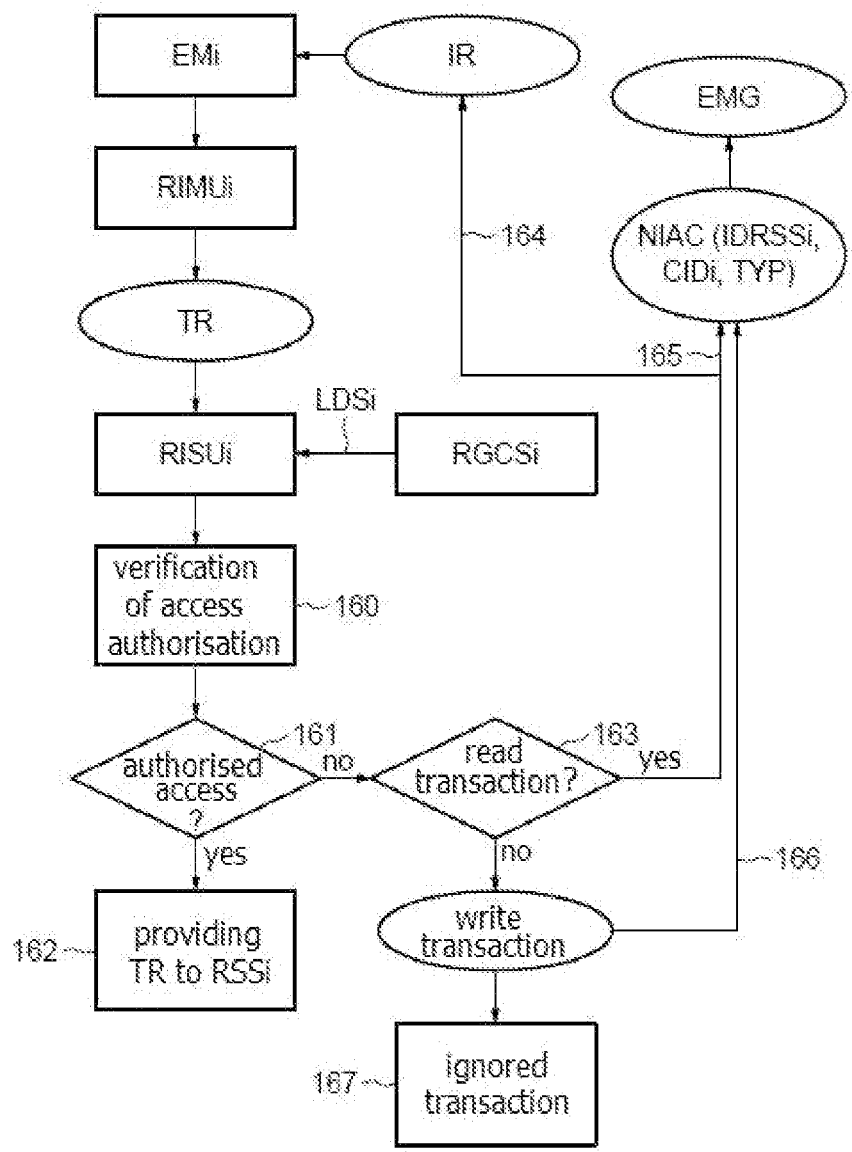

[Fig 17]
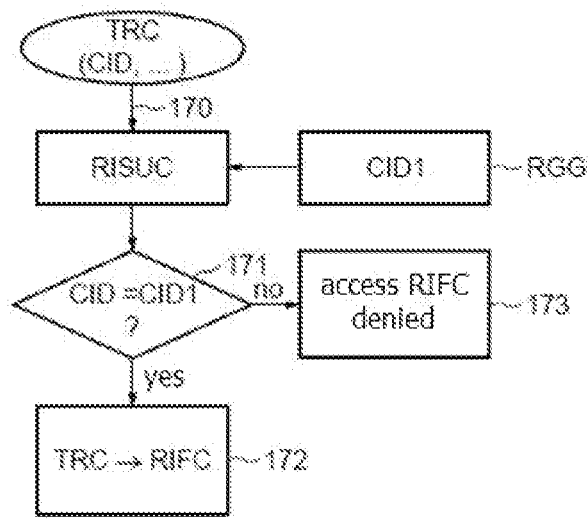
[Fig 18]
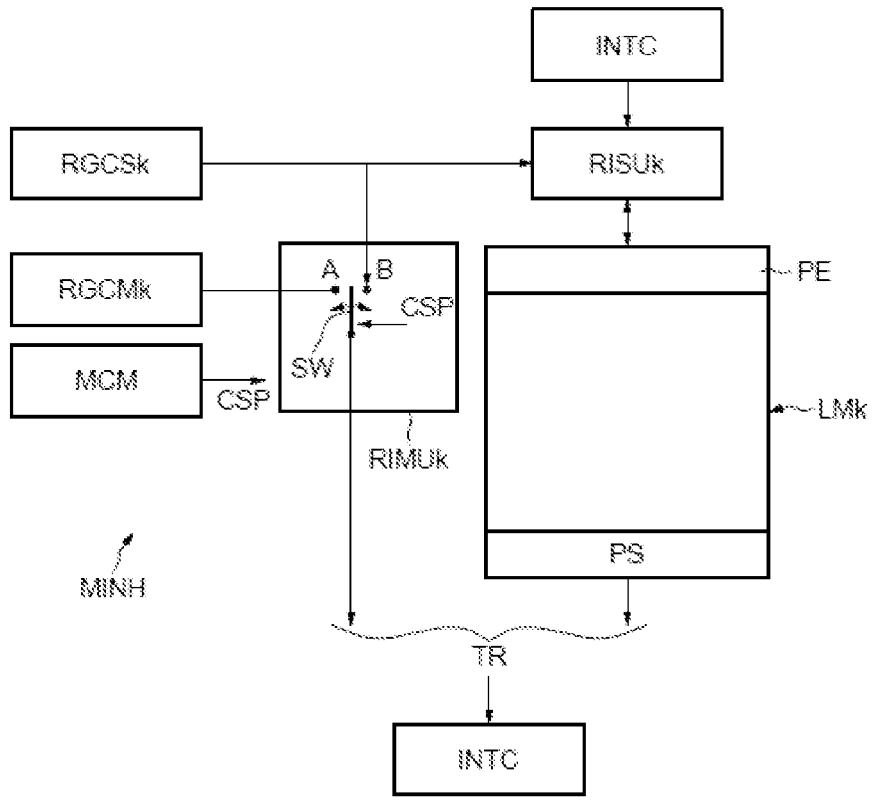

[Fig 19]
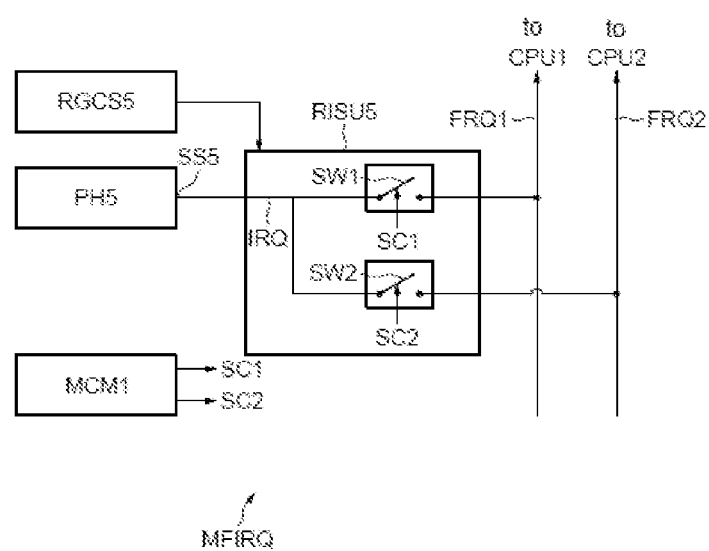

[Fig 20]
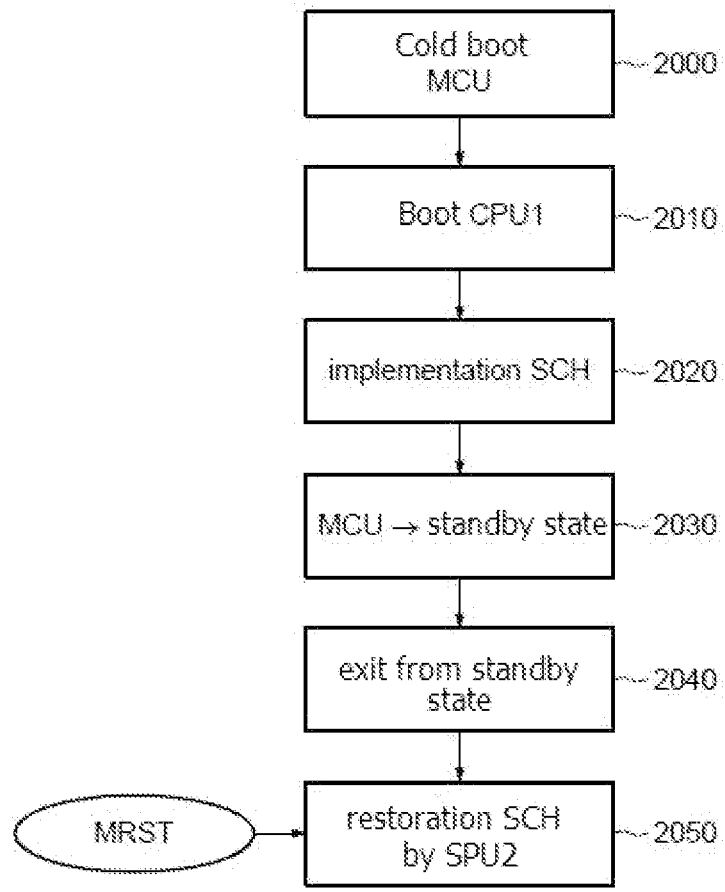
[Fig 21]
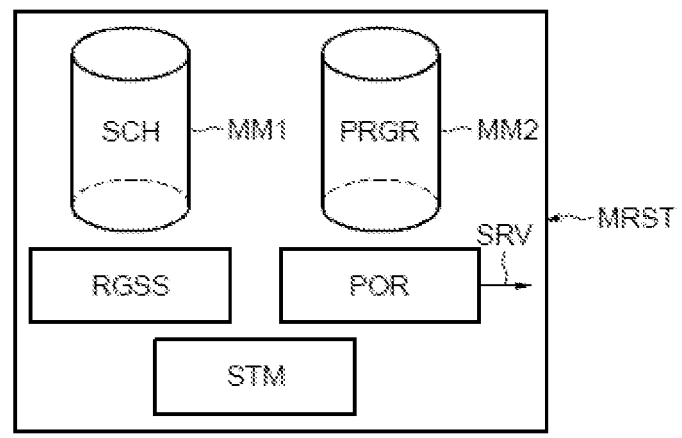

[Fig 22]
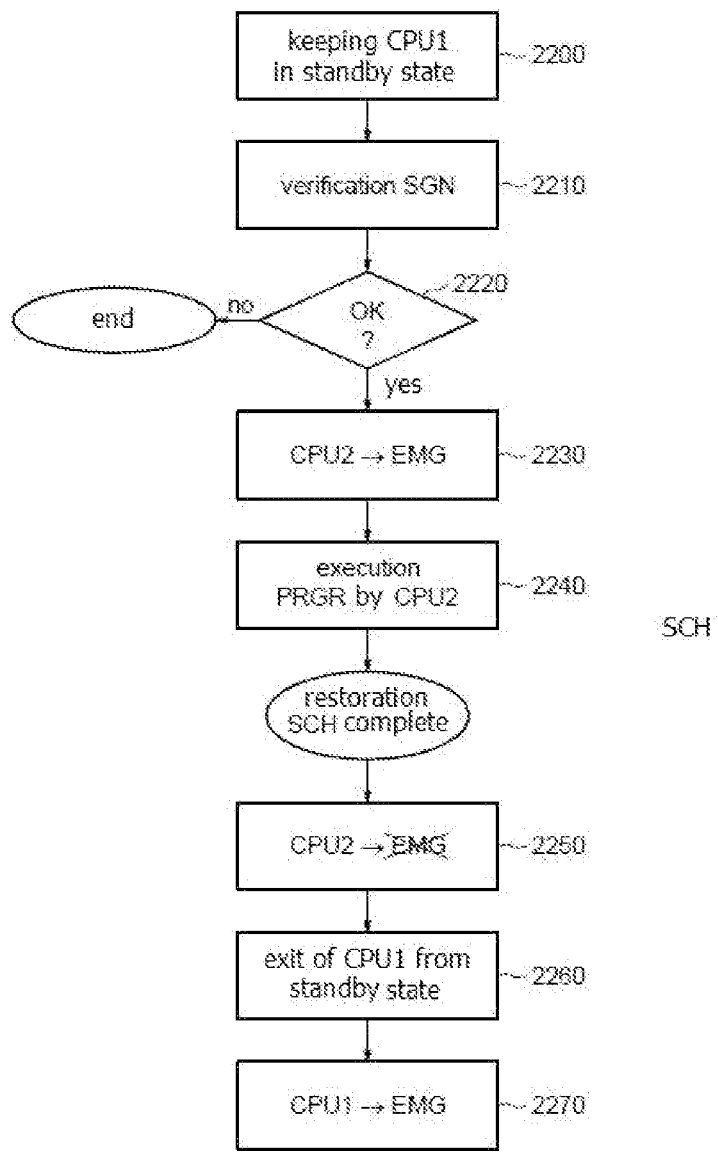

[Fig 23]
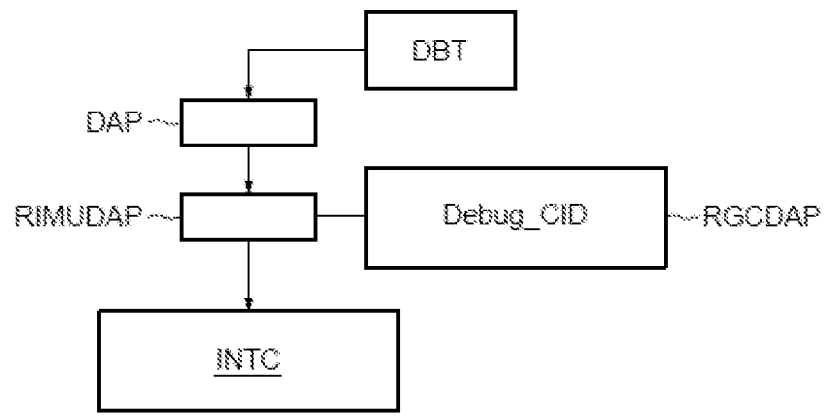
[Fig 24]
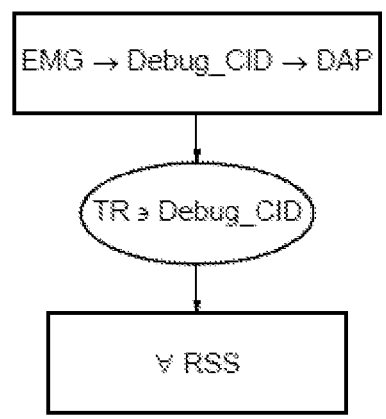

METHOD FOR MANAGING THE OPERATION OF A SYSTEM ON CHIP, AND CORRESPONDING SYSTEM ON CHIP

CROSS-REFERENCE TO RELATED APPLICATIONS

This application is a continuation in part of application of U.S. patent application Ser. No. 16/951,198 filed on Nov. 18, 2020, which claims the benefit of French Application No. 1913124, filed on Nov. 22, 2019. These applications are hereby incorporated herein by reference.

TECHNICAL FIELD

Embodiments of the invention relate to integrated circuits, in particular systems on a chip (SoC), for example a (multi-core or single-core) microcontroller, or a microprocessor, and more particularly the management of the operation of such a system on a chip.

BACKGROUND

In order to help ensure the reliability of a system on a chip, it may be necessary to restrict the access of one or more master pieces of equipment to specific slave resources. Such a feature is designated by the person skilled in the art under the term "isolation."

There is a need to make management of these access restrictions simple to carry out and to implement, particularly in the case where this management is dynamic, for example when it depends on the applications considered for the system on a chip, for example of the applications considered on the multiple cores of the chip.

There is also a need to provide a system on a chip, for example a microcontroller or a microprocessor, allowing all the cases of use emanating from the various users of the system on a chip as well as all the configurations in a flexible manner, and particularly including a low power mode.

SUMMARY

According to one aspect, a system on a chip comprising several master pieces of equipment is proposed, for example, when the system particularly forms a microcontroller, at least one microprocessor and generally several microprocessors, a direct memory access controller (DMA: Direct Memory Access) without these examples being limiting.

The system on a chip moreover includes several slave resources.

By way of non-limiting example, a slave resource can belong to the group formed by at least one peripheral, for example a peripheral of the I2C ("Inter Integrated Circuit") type, of the SPI ("Serial Peripheral Interface) type, of the UART ("Universal Asynchronous Receiver Transmitter) type, or else a Real Time Clock (RTC), a feature of a peripheral, for example an alarm line of the RTC peripheral, a memory means internal to the system on a chip, a memory interface internal to the system on a chip and intended to be coupled to a memory means external to the system on a chip, for example a DDR ("Double Data Rate") type memory.

The system on a chip moreover includes an interconnection system (known by the person skilled in the art under the name "interconnect") coupled between the master pieces of equipment and the slave resources and capable of routing transactions (for example write or read transactions) between the master pieces of equipment and the slave resources.

The system on a chip moreover includes processing means at least configured to allow a user of the system on a chip to implement within the system on a chip at least one configuration diagram of this system on a chip, this configuration diagram being defined by a set of configuration pieces of information including at least one piece of identification information assigned to each master piece of equipment.

These identification pieces of information are intended to be attached to all the transactions emitted by the corresponding master pieces of equipment.

They are particularly used to designate the corresponding master pieces of equipment.

Moreover, the set of these configuration pieces of information, and particularly the identification pieces of information, is not used for addressing the slave resources receiving the transactions but is used to define an assignment of at least one piece of master equipment to at least some of the slave resources, or else an assignment of at least some of the slave resources to at least one piece of master equipment.

Moreover, addressing the slave resources receiving the transactions is performed by means of an addressing field contained in the considered transaction. And not only the set of configuration pieces of information is not used for addressing the slave resources receiving the transactions, but also, the content of the addressing field of a transaction is not used to define the assignment of at least one piece of master equipment to at least some of the slave resources.

Thus, assigning one or more master pieces of equipment to one or more slave resources allows to manage the isolation architecture of the different slave resources and the different master pieces of equipment in a very simple and flexible manner by this set of configuration pieces of information.

It is quite possible, in a very simple case, that the set of configuration pieces of information includes only the identification pieces of information assigned to the master pieces of equipment. And then it can be seen that these identification pieces of information alone allow easily managing and defining the system on a chip isolation architecture.

However, as will be seen in more detail below, the set of configuration pieces of information can generally include other configuration pieces of information than the identification piece of information, which will allow refining the isolation architecture, with greater flexibility.

According to one embodiment, the master pieces of equipment can include several microprocessors and master pieces of equipment controllable by these microprocessors.

Moreover, the same identification pieces of information as the identification piece of information of the microprocessor can be assigned to at least some of the master pieces of equipment controllable by a microprocessor.

This allows to define a group or compartment of master pieces of equipment identified by the same identification piece of information. And, the master pieces of equipment of the same compartment can for example have access to identical memory resources.

However, it is also possible that a master piece of equipment controllable by a microprocessor is assigned an identification piece of information different from the identification piece of information of the microprocessor.

This can for example be the case of a master piece of equipment of the PCI express (PCI-E) type to which one does not wish to give access to some memory areas which can also be accessed by the microprocessor.

It is also possible that at least one piece of master equipment controllable by a microprocessor includes an output port capable of emitting transactions as well as an input port capable of receiving transactions. The input port is then considered as a slave resource and the output port as a master piece of equipment.

Such master piece of equipment having an input port and an output port can be for example a USB controller or else an SD card controller.

The processing means are advantageously configured to allow a user of the system on a chip to implement within the system on a chip an initial configuration diagram forming the configuration diagram.

In such a case, in fact the context of a static configuration is considered, wherein the configuration diagram corresponds to an initial implemented configuration diagram which does not undergo any modification during the operation of the system on a chip.

Alternatively, it is quite possible that the processing means are configured to allow a user of the system on a chip to implement within the system on a chip an initial configuration diagram having an initial set of configuration pieces of information, the processing means then also being configured to modify the value of at least one piece of configuration information of this initial set so as to obtain the set of configuration pieces of information defining the configuration diagram.

In other words, in this "dynamic" case, the user has the possibility, after having implemented the initial configuration diagram, of modifying this initial configuration diagram later.

Whether in a static configuration case or in a dynamic configuration case, the processing means advantageously comprise installation means including, from the master pieces of equipment, a first master piece of equipment called master manager piece of equipment, this first master manager piece of equipment being configured, in response to a first boot or cold boot of the system on a chip, to perform a boot phase at the end of which this first master manager piece of equipment is configured to at least allow the implementation of the initial configuration diagram.

This first master manager piece of equipment may comprise a microprocessor or, alternatively, a hardware logic circuit.

Moreover, the designation of the first master manager piece of equipment can be fixed during the production of the system on a chip.

In other words, the system on a chip once produced, will impose by construction a first master manager piece of equipment from the master pieces of equipment of the system on a chip.

Alternatively, to allow greater flexibility, it is possible that the installation means include a programmable designation register, allowing to designate the first master manager piece of equipment.

This programmable register can be formed for example of several OTP ("One Time Programmable") memories allowing the user of the system on a chip, according to its application, to designate by programming these OTP memories, one of the master pieces of equipment as first master manager piece of equipment.

In particular, so as not to generate a conflict during the configuration phase of the system on a chip, the installation means are further advantageously configured to temporarily make all the other master pieces of equipment inoperative as long as the first master manager piece of equipment has not completed its boot phase.

For example, temporarily making a master piece of equipment such as a microprocessor inoperative can be performed by forcing the reset signal to zero, which allows to keep the microprocessor in standby state.

According to one embodiment, the installation means further include a boot memory configured to store a boot program executable only by the first master manager piece of equipment during the first boot (cold boot) of the system on a chip.

In a general manner, the processing means preferably include configuration means configured to allow a user of the system on a chip to define the initial configuration diagram and allocation means configured to implement the initial configuration diagram.

In this regard, the configuration means for example include an input configured to receive a user program containing at least instructions representative of the initial configuration diagram, as well as a program memory intended for storing the user program.

For example, the allocation means, in turn, include the first master manager piece of equipment which is configured, at the end of its boot phase, to execute the user program in order to implement the initial configuration diagram.

Therefore, the user can very simply software define the initial configuration diagram for the system on a chip and it is the first master manager piece of equipment which, at the end of its boot phase, will execute the user program in order to implement the initial configuration diagram.

The embodiment providing a master manager piece of equipment which is the only one authorized to implement the initial configuration diagram and to modify it, if necessary, can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources, and processing means at least configured to allow a user of the system on a chip to implement within the system on a chip at least one configuration diagram of this system, the processing means comprising installation means including from the master pieces of equipment a first master piece of equipment called master manager piece of equipment, this first master manager piece of equipment being configured to allow the implementation of the configuration diagram.

As indicated above, this configuration diagram can be an initial configuration diagram or else an initial configuration diagram modified by the first master manager piece of equipment.

This first master manager piece of equipment can also be configured to modify the configuration diagram so as to implement a new configuration diagram which may possibly be modified again by the master manager piece of equipment.

In the foregoing, it has been considered that there was only one master manager piece of equipment operating in response to the first boot of the system on a chip.

However, it is possible, alternatively, that there is a handover between an initial master piece of equipment and another master piece of equipment designated as being a new master manager piece of equipment.

More specifically, and according to one embodiment, the installation means then include, from the master pieces of equipment, a master piece of equipment called "initial manager equipment," configured, during the first boot (or cold boot) of the system on a chip, to perform a boot phase at the end of which it is configured to authorize a boot of another master piece of equipment designated as being a new master manager piece of equipment, this new master manager piece of equipment then forming the first master manager piece of equipment, this first master manager piece of equipment being configured, at the end of its boot phase, to allow the implementation of the initial configuration diagram.

Such an embodiment is for example advantageous when the initial master manager piece of equipment is defined by default during the production of the system on a chip and the user wishes during the configuration phase, taking into account its application, to modify the master manager piece of equipment.

In such a variant embodiment (change of master manager piece of equipment), the initial master manager piece of equipment can comprise a microprocessor and the new master manager piece of equipment can comprise another microprocessor.

It is also possible that the initial master manager piece of equipment comprises a hardware logic circuit and that the new master manager piece of equipment comprises a microprocessor.

Again, the installation means are further advantageously configured to temporarily make all the other master pieces of equipment inoperative as long as the boot phase of the initial master manager piece of equipment and that of the new master manager piece of equipment are not completed.

Still in the case of this variant embodiment (change of master manager piece of equipment), the installation means may include a boot memory configured to store a boot program executable only by the initial master manager piece of equipment during the first boot (cold boot) of the system on a chip and a programmable memory configured to store the boot program of the new master manager piece of equipment.

Still in the case of this variant embodiment with change of master manager piece of equipment, the configuration means can again include an input configured to receive a user program containing at least instructions representative of the initial configuration diagram, this program memory also being intended to store the user program and the allocation means again include the first master manager piece of equipment configured, at the end of its boot phase, to execute the user program in order to implement the initial configuration diagram.

Regardless of the variant embodiment which has just been exposed (change or not of the master manager piece of equipment during the configuration phase of the system on a chip), it is also possible for the user to change the master manager piece of equipment during the actual operation phase of the system on a chip (that is to say during the execution of its user program).

More specifically, with this in mind, the first master manager piece of equipment (which is the one which is effectively manager at the end of the configuration phase of the system on a chip) is further configured, after having allowed the initial configuration diagram to be implemented, to designate, during the execution of a user program by the processing means, a second master piece of equipment as new master manager piece of equipment, the first master piece of equipment then being configured to lose its quality as master manager piece of equipment.

As will be seen in more detail below, it is possible to provide a register called manager register, intended to contain the identification piece of information of the current master manager piece of equipment. And, designating another master piece of equipment as master manager piece of equipment by the current master manager piece of equipment, can then advantageously be performed by writing in this manager register, by the current master manager piece of equipment, the identification piece of information of the new master piece of equipment which will then be the master manager piece of equipment. And, since the manager register no longer includes the identification piece of information of the previous master manager piece of equipment, the latter has de facto lost its quality as master manager piece of equipment.

Moreover, it is quite possible, in some cases, to provide that it is possible to change the master manager piece of equipment several times during the execution of the user program.

Such a change can be decided during the operation of the system on a chip, or else be fixed during the manufacture of the system on a chip.

The number of changes can also be fixed.

In other words, and according to one embodiment, any new master manager piece of equipment can be in turn configured to designate a new master manager piece of equipment and then lose its quality as master manager piece of equipment.

The embodiment providing for a handover of master manager piece of equipment can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources, and processing means at least configured to allow a user of the system on a chip to implement within the system on a chip at least one configuration diagram of this system, the processing means comprising installation means including from the master pieces of equipment a master piece of equipment called master manager piece of equipment, this master manager piece of equipment being configured to allow the implementation of the configuration diagram and being capable of designating a new manager equipment thereby losing its quality of master manager piece of equipment.

Now the set of configuration pieces of information defining the configuration diagram will be more detailed.

As previously seen, in a very simple case, it is possible that this set contains only the identification pieces of information of the master pieces of equipment.

However, other configuration pieces of information can complete this set.

Thus, according to one embodiment, the set of configuration pieces of information defining the configuration diagram may further comprise for at least one slave resource, an inaccessibility piece of information intended to indicate that this slave resource is inaccessible by any master piece of equipment.

It is indeed quite possible that in some applications, the user decides that a slave resource should absolutely not be used by any master piece of equipment.

According to yet another embodiment, the set of configuration pieces of information defining the configuration diagram may further comprise for each non-inaccessible slave resource, a filtering piece of information intended to indicate, based only on the identification pieces of information of the master pieces of equipment, whether this slave resource can be accessed by any master piece of equipment or by only one or more master pieces of equipment.

In other words, with this filtering piece of information, it is possible to enable or disable the filtering on the identification pieces of information of the master pieces of equipment. Thus, if filtering is enabled, then this means that the slave resource can be accessed by only one or more master pieces of equipment.

If filtering is disabled, this means that the slave resource can be accessed by any master piece of equipment, therefore, regardless of the identification piece of information attached to the transaction, but of course provided that other access restrictions will not be applied as will be seen in more detail below.

In other words, if no other access restriction is applied and filtering is disabled, then the slave resource can be accessed by any master piece of equipment.

In the event that this filtering is enabled, several other configuration pieces of information are then advantageously provided.

Thus, the set of configuration pieces of information defining a configuration diagram can thereby comprise, for each non-inaccessible slave resource,
a first access piece of information, intended to indicate, in the case where the filtering piece of information indicates that the slave resource can be accessed by only one or more master pieces of equipment, that this slave resource can be accessed by one or more master pieces of equipment having the same identification piece of information.

In other words, in this case, the slave resource can only be accessed by a transaction including only this identification piece of information.

And of course, the set of configuration pieces of information includes these corresponding identification pieces of information.

Still in the case where the filtering piece of information indicates that the slave resource can be accessed by only one or more master pieces of equipment, the set of configuration pieces of information defining the configuration diagram can then further comprise, for each non-inaccessible slave resource,
a second access piece of information intended to indicate that this slave resource can be accessed by master pieces of equipment having different identification pieces of information.

This can be the case for example for an internal memory means or for the memory interface intended to be coupled to an external memory means for example.

And, in this case, the set of configuration pieces of information comprises of course the list of identification pieces of information of the corresponding master pieces of equipment.

However, even if some slave resources can be accessed by master pieces of equipment having different identification pieces of information, it is also possible that, from these slave resources, at least one of them cannot be accessed simultaneously by several master pieces of equipment, particularly in order to avoid conflicts.

Therefore, it is advantageously provided that the set of configuration pieces of information defining the configuration diagram further comprises for at least one of the slave resources that can be accessed by the master pieces of equipment of the list,
a third piece of information intended to indicate that the at least one of the slave resources can only be accessed by one master piece of equipment at a time,
the master piece of equipment wishing to access this slave resource then being configured to use a semaphore.

In other words, the master piece of equipment of the list that wishes to access this slave resource must first "take" the semaphore before being able to access it. If the semaphore is not available, the master piece of equipment will not be able to access this slave resource and will have to wait for the semaphore to become available.

It is moreover particularly advantageous to define a secure mode and/or a privileged mode for the master pieces of equipment and the slave resources.

The concept of secure mode or privileged mode is well known to the person skilled in the art.

For example, for a processor in secure mode, dedicated Operating System (OS) can be used with resources that are not accessible in an unsecured mode.

In a privileged mode, the equipment can benefit from privileged rights for access to resources that will not have other equipment which are not in privileged mode.

Thus, according to one embodiment, the set of configuration pieces of information defining the configuration diagram may further comprise for each non-inaccessible slave resource, a security piece of information intended to indicate whether this slave resource is accessible by a master piece of equipment in secure mode or not.

The set of configuration pieces of information defining the configuration diagram may further comprise, for each non-inaccessible slave resource, a privileged piece of information intended to indicate whether this slave resource is accessible by a master piece of equipment in privileged mode or not.

In all of the above, the filtering concept and the set of configuration pieces of information apply to any slave resource, regardless of its nature.

Consequently, this applies particularly to peripherals.

It is therefore particularly possible to isolate a peripheral in a particular execution context for example for security and/or safety reasons.

But this also particularly applies to peripheral features.

As a result, it is therefore advantageously possible to particularly perform a filtering by peripheral feature.

And here again it is therefore particularly possible to isolate a feature within a peripheral in a particular execution context for example for security and/or safety reasons.

Moreover, the set of configuration pieces of information defining a configuration diagram may further comprise this time for each master piece of equipment, in addition to its identification piece of information, a security piece of information intended to indicate whether this master piece of equipment is configured in secure mode or not.

Likewise, the set of configuration pieces of information defining the configuration diagram may further comprise, for each master piece of equipment, in addition to its identification piece of information, a privileged piece of information intended to indicate whether this master piece of equipment is configured in privileged mode or not.

The first master manager piece of equipment is in turn preferably configured to be in secure mode and in privileged mode at the end of its boot phase.

Any slave resource can be read or write accessible.

However, this read or write access can be restricted according to the various configuration pieces of information set out above.

However, it is possible to define, for at least some of the slave resources, a piece of information called public access ("public read enable") piece of information allowing any master piece of equipment to have read access to this slave resource.

As seen above, it is possible to modify a configuration diagram by modifying at least one piece of configuration information. However, it is also possible that the set of configuration pieces of information defining the configuration diagram further comprises, for at least some of the slave resources and at least some of the master pieces of equipment, a locking piece of information intended to indicate whether their configuration pieces of information can be modified or not.

As indicated above, the allocation means comprise the first master manager piece of equipment.

However, the allocation means also comprise, according to one embodiment,
- a set of configuration registers assigned to each slave resource and to each master piece of equipment, and
- a configuration controller configured to update the contents of the sets of configuration registers with the set of configuration pieces of information under the control of the first master manager piece of equipment.

And, a set of configuration registers assigned to a slave resource is advantageously intended to store the various configuration pieces of information defined above and assigned to this slave resource.

Moreover, a set of configuration registers assigned to each master piece of equipment is intended to store the identification piece of information assigned to this master piece of equipment and the security and/or privileged type configuration piece of information defined above.

As indicated above, the processing means can be configured to use a user program to modify the initial configuration diagram after its implementation and to implement the configuration diagram accordingly and possibly modify again any old configuration diagram.

And, in this regard, only the master piece of equipment which has the quality of master manager piece of equipment is advantageously configured to modify a configuration diagram.

More specifically, and according to one embodiment, in order to modify a configuration diagram, the master manager piece of equipment is configured to control the configuration controller so that it updates the contents of the configuration registers with the set of configuration pieces of information defining the new configuration diagram to be implemented.

As regards now the transactions conveyed between the master pieces of equipment and the slave resources, each transaction emitted by a master piece of equipment comprises, according to one embodiment, an addressing field whose content is intended to address the slave resource receiving this transaction and the content of the addressing field does not belong to the set of configuration pieces of information.

Indeed, as indicated above, the content of the addressing field does not intervene in the definition of the configuration diagram.

According to one embodiment, the processing means further include addition means configured to add to each transaction emitted by a master piece of equipment, at least the identification piece of information of this master piece of equipment, this identification piece of information not belonging to the addressing field of the transaction.

The addition means are further advantageously configured to add to each transaction emitted by a master piece of equipment, the security piece of information and/or the privileged piece of information if these two pieces of information or one of the two pieces of information do not already appear in the transaction emitted by the master piece of equipment.

Indeed, some master pieces of equipment can already emit a transaction containing bits representative of their secure and/or privileged mode. And in this case, it is obviously not necessary for the addition means to carry out such an addition.

According to one embodiment, the addition means include, for each master piece of equipment, an elementary management unit configured to access the identification piece of information assigned to this master piece of equipment and optionally the security piece of information and/or the privileged piece of information, and to add to any transaction emitted by the master piece of equipment, this identification piece of information and optionally the security piece of information and/or the privileged piece of information.

Such a "decentralization" of the addition means into local units assigned to each master piece of equipment, allows greater homogeneity of implementation of the system on a chip and allows easily adding a master piece of equipment if necessary without having to modify the other elementary management units.

Each elementary management unit assigned to a master piece of equipment is preferably connected by a dedicated link at least to the set of configuration registers assigned to this master piece of equipment.

In other words, one does not use the communication buses of the interconnection circuit but uses a dedicated link, for example metal tracks of the integrated circuit.

This simplifies the production and programming of the system on a chip.

According to one embodiment, at least one piece of configuration information is intended to be attached to each transaction and the processing means include verification means configured to verify whether a transaction emanating from a master piece of equipment and intended for a slave resource is authorized to access this slave resource using the at least one piece of configuration information attached to the transaction.

Particularly, the verification means are configured to verify whether a transaction emanating from a master piece of equipment and intended for a slave resource is authorized to access this slave resource, using the at least one piece of configuration information attached to the transaction.

In this regard, the term "using" should be understood in a very broad sense. Indeed, even if the filtering piece of information is disabled (meaning that any master piece of equipment can access a slave resource, subject to other access restrictions) this filtering piece of information is based on the identification pieces of information and consequently the latter are used.

According to another embodiment, it is possible that the verification means are configured to verify whether a transaction emanating from a master piece of equipment and intended for a slave resource is authorized to access this slave resource using at least the security piece of information and the privileged piece information attached to the transaction.

Thus, it is possible, if for example the filtering piece of information is disabled, that the access to a slave resource is conditioned in secure/or privileged mode.

According to another embodiment, the verification means are configured to verify whether a transaction emanating from the master pieces of equipment and intended for a slave resource is authorized to access this slave resource using the configuration piece(s) of information attached to the transaction as well as at least some of the other configuration pieces of information of the set of configuration pieces of information, assigned to this slave resource.

The verification means are advantageously configured to perform the verification downstream of the interconnection circuit.

Indeed, performing a verification downstream of the interconnection circuit and not upstream again allows homogeneity of implementation and easily allows to add a slave resource in an easier manner or even to have a register or bit-exact granularity.

To complete this homogeneity of implementation and this ease of adding a slave resource if necessary, the verification means advantageously include, for each slave resource, an elementary verification module configured to access the set of configuration pieces of information assigned to this slave resource.

Here again, therefore, there is a decentralization of the verification means into localized modules.

Each elementary verification module assigned to a slave resource is again advantageously connected by a dedicated link to the set of configuration registers assigned to this other slave resource, for example by metal tracks.

As indicated above, the current manager equipment is identified by its identification piece of information contained in a manager register.

Therefore, according to one embodiment, the processing means also include an auxiliary verification module assigned to the controller, and configured to prohibit access to the controller to any master piece of equipment having an identification piece of information different from that contained in the manager register.

In the event that a read transaction emitted by a master piece of equipment and intended for a slave resource is not authorized to access this slave resource, the verification means are further configured to return to the master piece of equipment an indication of access denial (for example a bit having the logical value "o") and return to the master manager piece of equipment an illegal access notification containing an identifier of the slave resource, an indication of the type of access (here a read access) and the identification piece of information of the master piece of equipment at the origin of this denied transaction.

Moreover, in the event that a write transaction emitted by a master piece of equipment and intended for a slave resource is not authorized to access this slave resource, the verification means are configured to ignore this transaction and return to the master manager piece of equipment, also an illegal access notification containing an identifier of this slave resource, an indication of the type of access (here a write access) and the identification piece of information of the master piece of equipment at the origin of this denied transaction.

As seen above, it is possible that from the master pieces of equipment, there is at least one piece of master equipment having a slave port and a master port, for example a USB controller, with configuration pieces of information assigned to the slave port and configuration pieces of information assigned to the master port.

It is also possible that this master piece of equipment having a slave port and a master port is firstly controlled by a first microprocessor then secondly by a second microprocessor, the two microprocessors having different configuration pieces of information. And, it is advantageous that when a processor controls such a master piece of equipment, the configuration pieces of information of the input port are duplicated at the output port.

Thus, according to an advantageous embodiment, the processing means include inheritance means configured, upon control and by taking into account inheritance rules, to replace at least some of the configuration pieces of information assigned to the master port with the homologous configuration pieces of information assigned to the slave port or else to keep the configuration pieces of information assigned to the master port.

Thus, when another microprocessor takes control of such a master piece of equipment, the inheritance means can allow by a simple switching, and if the inheritance rules allow it, to confer to the master port the configuration pieces of information of the slave port which correspond to those of the other microprocessor.

However, the inheritance rules prohibit, for example, defining a port for a peripheral in secure mode if the master piece of equipment which controls it is not itself in secure mode.

The embodiment providing inheritance means can be considered independently or else in combination with at least one of the preceding or following embodiments.

Thus when this embodiment is considered independently, according to another aspect a system on a chip is proposed, comprising several master pieces of equipment comprising from the master pieces of equipment, at least one piece of master equipment having a slave port and a master port, several slave resources, an interconnection circuit coupled between the master pieces of equipment and the slave resources and capable of routing transactions between master pieces of equipment and slave resources, and processing means at least configured to allow a user of the system on a chip to implement within the system on a chip at least one configuration diagram of this system including configuration pieces of information.

According to this aspect, configuration pieces of information are assigned to the slave port and configuration pieces of information are assigned to the master port and the processing means include inheritance means configured, upon control and by taking into account inheritance rules, to replace at least some of the configuration pieces of information assigned to the master port with the homologous configuration pieces of information assigned to the slave port or else to keep the configuration pieces of information assigned to the master port.

Thus, in more detail and according to a possible embodiment, the inheritance means include, within the elementary management unit assigned to the master port, a set of controllable switches connected to at least some of the configuration registers assigned to the slave port and to the homologous configuration registers assigned to the master port, and control means configured to control the set of switches so as to select either the corresponding configuration registers assigned to the master port or the corresponding configuration registers assigned to the slave port.

According to another embodiment, it is possible that the system on a chip comprises:

from the master pieces of equipment, several microprocessors, from the slave resources, at least one slave resource configured to generate at least one interrupt signal intended for one of the microprocessors which is assigned to this slave resource, several interrupt wires respectively connected to the microprocessors and to the at least one slave resource and capable of conveying interrupt signals (these interrupt wires can of course be metal tracks).

In this case, the processing means advantageously comprise interrupt filtering means configured to route the interrupt signal emitted by the slave resource only on the interrupt wire connected to the microprocessor which is assigned thereto.

This advantageously allows to avoid to spy on the activity of the considered microprocessor by observing the interrupt signal.

The embodiment providing interrupt filtering means can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources.

According to this other aspect, the system on a chip comprises:
from the master pieces of equipment, several microprocessors,
from the slave resources, at least one slave resource configured to generate at least one interrupt signal intended for one of the microprocessors which is assigned to this slave resource,
several interrupt wires respectively connected to the microprocessors and to the at least one slave resource and capable of conveying interrupt signals (these interrupt wires can of course be metal tracks), and
interrupt filtering means configured to route the interrupt signal emitted by the slave resource only on the interrupt wire connected to the microprocessor which is assigned thereto.

The interrupt filtering means are advantageously incorporated at least in part into the elementary verification module assigned to the slave resource.

And, according to one embodiment, the interrupt filtering means include
in the elementary verification module, several controllable switches connected between the output of the slave resource configured to provide the interrupt signal, and respectively the interrupt wires connected to the microprocessor, and
control means configured to close the switch connected between the output and the interrupt wire connected to the microprocessor assigned to the slave resource, and to open the other switch/switches.

According to another embodiment, the system on a chip may comprise
from the master pieces of equipment a first microprocessor configured to boot during a first boot of the system on a chip (cold boot) so as to allow the implementation of the configuration diagram, and a second master piece of equipment, for example a second microprocessor or a hardware state machine, and
restore means configured to allow the second master piece of equipment to restore the configuration diagram instead of the first microprocessor in the event of an exit from a standby mode of the system on a chip.

Such an embodiment advantageously allows to restore the configuration diagram by, for example a microprocessor having a lower consumption, instead of using the first microprocessor which can be slower and/or have a higher consumption.

The embodiment providing restore means can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources and processing means at least configured to allow a user of the system on a chip to implement within the system on a chip at least one configuration diagram of this system.

According to this other aspect the system on a chip comprises
from the master pieces of equipment, a first microprocessor configured to boot during a first boot of the system on a chip (cold boot) so as to allow the implementation of the configuration diagram, and a second master piece of equipment, for example a second microprocessor or a hardware state machine, and
restore means configured to allow the second master piece of equipment to restore the configuration diagram instead of the first microprocessor in the event of an exit from a standby mode of the system on a chip.

More specifically, according to one embodiment, the first microprocessor is configured as a master manager piece of equipment before the system on a chip goes into standby mode, and the restore means comprise
a first backup memory intended to back up the configuration diagram to be restored,
a second program memory configured to store, upon control of the first microprocessor, a restore program executable by the second master piece of equipment,
a secure storage means, for example one or more hardware registers, configured to store a signature of the restore program as well as the start address of the restore program in the second program memory,
a wake-up source intended to generate a wake-up signal to the second master piece of equipment when the system on a chip exits from the standby mode, and
a state machine configured, in the presence of the wake-up signal, to keep the first microprocessor in standby state, verify the signature, and in the event of successful verification, temporarily confer to the second master piece of equipment the quality of master manager piece of equipment and authorize the execution of the restore program by the second master piece of equipment, then when the restoration is complete, withdraw the quality of master manager piece of equipment from the second master piece of equipment and allow the first microprocessor to exit the standby mode and return to the first microprocessor its quality of master manager piece of equipment.

According to yet another embodiment, the system on a chip can comprise, from the master pieces of equipment, a test access port intended to be coupled to an external debugging tool, this test access port being assigned to a test identification piece of information and any slave resource is configured to accept receiving a transaction including this test identification piece of information, after verifying the security piece of information and the privileged piece of information attached to the transaction.

The embodiment providing an external debugging tool can be considered independently or else in combination with at least one of the preceding or following embodiments.

Thus when this embodiment is considered independently, according to another aspect a system on a chip is proposed, comprising several master pieces of equipment, several slave resources, an interconnection circuit coupled between the master pieces of equipment and the slave resources and capable of routing transactions between master pieces of equipment and slave resources.

According to this other aspect, the system on a chip comprises, from the master pieces of equipment, a test access port intended to be coupled to an external debugging tool, this test access port being assigned to a test identification piece of information and any slave resource is configured to accept receiving a transaction including this test identification piece of information, after verifying a security piece of information and a privileged piece of information attached to the transaction.

And, only the master manager piece of equipment is preferably configured to assign the test identification piece of information only to the test access port.

According to another aspect, a method for managing the operation of a system on a chip is proposed, the system on a chip comprising several master pieces of equipment, several slave resources, an interconnection circuit coupled between the master pieces of equipment and the slave resources and capable of routing transactions between master pieces of equipment and slave resources, the method comprising a configuration phase including
defining at least one configuration diagram by a set of configuration pieces of information including at least one piece of identification information assigned to each master piece of equipment, this set of configuration pieces of information allowing to define an assignment of at least one piece of master equipment to at least some of the slave resources, and
implementing within the system on a chip the at least one configuration diagram, and
an operating phase including adding at least these identification pieces of information to all the transactions emitted by the corresponding master pieces of equipment, and addressing the slave resources without using the set of these configuration pieces of information.

According to one embodiment, a slave resource belongs to the group formed at least of a peripheral, a feature of a peripheral, a memory means internal to the system on a chip, a memory interface internal to the system on a chip and intended to be coupled to a memory means external to the system on a chip.

According to one embodiment, at least one piece of master equipment comprises a microprocessor.

According to one embodiment, the master pieces of equipment including microprocessors and master pieces of equipment controllable by these microprocessors, the same identification piece of information as the identification piece of information of the microprocessor are assigned to at least some of the master pieces of equipment controllable by a microprocessor.

According to one embodiment, at least one piece of master equipment controllable by a microprocessor is assigned an identification piece of information different from the identification piece of information of the microprocessor.

According to one embodiment, at least one piece of master equipment controllable by a microprocessor includes an output port capable of emitting transactions as well as an input port capable of receiving transactions, and the input port being considered as a slave resource and the output port as a master piece of equipment.

According to one embodiment, the configuration phase comprises implementing within the system on a chip an initial configuration diagram forming the configuration diagram.

According to one embodiment, the configuration phase comprises implementing within the system on a chip an initial configuration diagram having an initial set of configuration pieces of information, and the method comprises modifying the value of at least one piece of configuration information of this initial set so as to obtain the set of configuration pieces of information defining the configuration diagram.

According to one embodiment, the configuration phase comprises designating from the master pieces of equipment, a first master piece of equipment called master manager piece of equipment, this first master manager piece of equipment performing, in response to a first boot of the system on a chip, a boot phase at the end of which this first master manager piece of equipment authorises the implementation of the initial configuration diagram.

According to one embodiment, the designation of the first master manager piece of equipment is fixed and results from the production of the system on a chip.

According to one embodiment, the designation of the first master manager piece of equipment is programmable.

According to one embodiment, all the other master pieces of equipment are temporarily made inoperative as long as the first master manager piece of equipment has not completed its boot phase.

According one embodiment, the configuration phase comprises storing a boot program executable only by the first master manager piece of equipment during the first boot of the system on a chip.

According to one embodiment, the configuration phase comprises receiving a user program containing at least instructions representative of the initial configuration diagram, storing the user program, the first master manager piece of equipment executing, at the end of its boot phase, the user program in order to implement the initial configuration diagram.

According to one embodiment, the configuration phase includes a designation, from the master pieces of equipment, of a master piece of equipment called initial master manager piece of equipment, performing, during the first boot of the system on a chip, a boot phase at the end of which it authorises a boot of another master piece of equipment designated as a new master manager piece of equipment and forming the first master manager piece of equipment allowing at least, at the end of its boot phase, at least the implementation of the initial configuration diagram.

According to one embodiment, all the other master pieces of equipment are temporarily made inoperative as long as the boot phase of the initial master manager piece of equipment and that of the new master manager piece of equipment are not completed.

According to one embodiment, the configuration phase comprises storing a boot program executable only by the initial master manager piece of equipment during the first boot of the system on a chip and storing the boot program of the new master manager piece of equipment.

According to one embodiment, the configuration phase comprises receiving a user program containing at least instructions representative of the initial configuration diagram, storing the user program, the first master manager piece of equipment executing, at the end of its boot phase, the user program in order to implement the initial configuration diagram.

According to one embodiment, the operating phase comprises a designation by the first master manager piece of equipment designates, after it has allowed the implementation of the initial assignment diagram, of a second master piece of equipment as new master manager piece of equipment, the first master piece of equipment then losing its quality as master manager piece of equipment.

According to one embodiment, during the operating phase any new master manager piece of equipment in turn designates a new master manager piece of equipment and then loses its quality as master manager piece of equipment.

According to one embodiment, the set of configuration pieces of information of the configuration diagram further comprises, for at least one slave resource, an inaccessibility piece of information indicating whether this slave resource is inaccessible by any master piece of equipment or not.

According to one embodiment, the set of configuration pieces of information defining the configuration diagram further comprises, for each non-inaccessible slave resource, a filtering piece of information indicating whether this slave resource can be accessed by any master piece of equipment or by only one or more master pieces of equipment.

According to one embodiment, the set of configuration pieces of information defining the configuration diagram further comprises for each non-inaccessible slave resource,
- a first access piece of information indicating, in the case where the filtering piece of information indicates that the slave resource can be accessed by only one or more master pieces of equipment, that this slave resource can be accessed by one or more master pieces of equipment having the same identification piece of information, and
- the corresponding identification piece of information According to one embodiment, the set of configuration pieces of information defining the configuration diagram further comprises for each non-inaccessible slave resource,
- a second access piece of information indicating, in the case where the filtering piece of information indicates that the slave resource can be accessed by only one or more master pieces of equipment, that this slave resource can be accessed by master pieces of equipment having different identification pieces of information, and
- the list of identification pieces of information of the corresponding master pieces of equipment.

According to one embodiment, the set of configuration pieces of information defining the configuration diagram further comprises for at least one of the slave resources that can be accessed by the master pieces of equipment of the list, a third piece of information indicating that the at least one of the slave resources can only be accessed by one master piece of equipment at a time, the master piece of equipment wishing to access this slave resource during the operating phase using a semaphore.

According to one embodiment, the set of configuration pieces of information defining the configuration diagram further comprises for each non-inaccessible slave resource, a security piece of information indicating whether this slave resource is accessible by a master piece of equipment in secure mode or not.

According to one embodiment, the set of configuration pieces of information defining the configuration diagram further comprises for each non-inaccessible slave resource, a privileged piece of information indicating whether this slave resource is accessible by a master piece of equipment in privileged mode or not.

According to one embodiment, the set of configuration pieces of information defining the configuration diagram further comprises for each master piece of equipment, in addition to its identification piece of information, a security piece of information indicating whether this master piece of equipment is configured in secure mode or not.

According to one embodiment, the set of configuration pieces of information defining the configuration diagram further comprises for each master piece of equipment, in addition to its identification piece of information, privileged piece of information indicating whether this master piece of equipment is configured in privileged mode or not.

According to one embodiment, the method comprises a configuration of the first master manager piece of equipment in secure mode and in privileged mode at the end of its boot phase.

According to one embodiment, the set of configuration pieces of information defining the configuration diagram further comprises for at least some of the slave resources and at least some of the master pieces of equipment, a locking piece of information indicating whether their configuration pieces of information can be modified or not.

According to one embodiment, the method comprises updating the configuration pieces of information assigned to each slave resource and to each master piece of equipment, under the control of the first master manager piece of equipment.

According to one embodiment, the operating phase comprises executing a user program to modify the initial configuration diagram after its implementation and implementing the configuration diagram accordingly and possibly modify again any old configuration diagram.

According to one embodiment, only the master piece of equipment which has the quality of master manager piece of equipment is authorized to modify a configuration diagram.

According to one embodiment, each transaction emitted by a master piece of equipment comprises an addressing field whose content addresses the slave resource receiving this transaction, and the content of the addressing field does not belong to the set of configuration pieces of information.

According to one embodiment, each transaction emitted by a master piece of equipment comprises an addressing field whose content addresses the slave resource receiving this transaction, and the operating phase comprises adding to each transaction emitted by a master piece of equipment, at least the identification piece of information of this master piece of equipment, the identification piece of information not belonging to the addressing field of the transaction.

According to one embodiment, the operating phase comprises adding to each transaction emitted by a master piece of equipment, the security piece of information and/or the privileged piece of information if these two pieces of information or one of these two pieces of information do not already appear in the transaction emitted by the master piece of equipment.

According to one embodiment, at least one piece of configuration information is attached to each transaction, and the operating phase comprises verifying whether a transaction emanating from a master piece of equipment and intended for a slave resource is authorized to access this slave resource, the verification including using the at least one piece of configuration information attached to the transaction.

According to one embodiment, the verification includes using at least the identification piece of information attached to the transaction.

According to one embodiment, the verification comprises using at least the security piece of information and the privileged piece of information attached to the transaction.

According to one embodiment, the verification comprises using the configuration piece(s) of information attached to the transaction as well as other configuration pieces of information of the set of configuration pieces of information assigned to this slave resource.

According to one embodiment, the verification is performed downstream of the interconnection circuit.

According to one embodiment, the verification comprises local verifications performed at the slave resources from the configuration pieces of information respectively assigned to these slave resources.

According to one embodiment, the method further comprises, in the event that a read transaction emitted by a master piece of equipment and intended for a slave resource is not authorized to access this slave resource, returning to the master piece of equipment an indication of access denial and returning to the master manager piece of equipment, an illegal access notification containing an identifier of this slave resource, an indication of the type of access and the identification piece of information of the master piece of equipment at the origin of this denied transaction.

According to one embodiment, the method further comprises, in the event that a write transaction emitted by a master piece of equipment and intended for a slave resource is not authorized to access this slave resource, the fact of ignoring this transaction and returning to the master manager piece of equipment, an illegal access notification containing an identifier of this slave resource, an indication of the type of access and the identification piece of information of the master piece of equipment at the origin of this denied transaction.

According to one embodiment, the method comprises a storage of the identification piece of information of the current master manager piece of equipment, and an auxiliary verification including a comparison between the identification piece of information of the current master manager piece of equipment and the identification piece of information of a master piece of equipment wishing to modify at least one piece of configuration information, and a prohibition of a modification of the at least one piece of configuration information to any master piece of equipment having an identification piece of information different from that of the master manager piece of equipment.

According to one embodiment, among the master pieces of equipment at least one piece of master equipment has a slave port and a master port, configuration pieces of information being assigned to the slave port and configuration pieces of information being assigned to the master port, and the method further comprises, upon control, and by taking into account inheritance rules, replacing at least some of the configuration pieces of information assigned to the master port with the homologous configuration pieces of information assigned to the slave port or else keeping the configuration pieces of information assigned to the master port.

According to one embodiment,
several microprocessors are among the master pieces of equipment, and at least one slave resource generates at least one interrupt signal intended for one of the microprocessors which is assigned to this slave resource,
several interrupt wires are respectively connected to the microprocessors and to the at least one slave resource and capable of conveying interrupt signals,
and the method comprises routing the interrupt signal emitted by the slave resource only on the interrupt wire connected to the microprocessor which is assigned thereto.

According to one embodiment,
a first microprocessor is configured to boot during a first boot of the system on a chip so as to allow the implementation of the configuration diagram,
the method comprises restoring the configuration diagram by a second master piece of equipment in the event of an exit from a standby mode of the system on a chip.

According to one embodiment, the first microprocessor being the master manager piece of equipment before entering the standby mode, the restoration comprises
backing up the configuration diagram to be restored,
storing upon control of the first microprocessor, a restore program executable by the second master piece of equipment,
securely storing a signature of the restore program as well as the start address of the restore program,
generating a wake-up signal to the second master piece of equipment when the system on a chip exits from the standby mode, and
in the presence of the wake-up signal, keeping the first microprocessor in standby state, verifying the signature, and in the event of successful verification, temporarily allocating to the second master piece of equipment the quality of master manager piece of equipment and executing the restore program by the second master piece of equipment, then when the restoration is complete, withdrawing the quality of the master manager piece of equipment to the second master piece of equipment, exiting the first microprocessor from the standby mode, and allocating to the first microprocessor its quality of master manager piece of equipment.

According to one embodiment, the method comprises assigning to a test access port forming part of the master pieces of equipment and intended to be coupled to an external debugging tool, a test identification piece of information, and any slave resource accepts to receive a transaction including this test identification piece of information, after verifying the security piece of information and the privileged piece of information attached to the transaction.

According to one embodiment, only the master manager piece of equipment assigns the test identification piece of information only to the test access port.

According to one embodiment, the system on a chip forms a microcontroller or a microprocessor.

In accordance with an embodiment, a system including a first port configured to simultaneously couple with a first device and a second device; and a management circuit configured to route a data signal received from a first controller to the first device in response to receiving a first-device direction from the first controller and route the data signal received from the first controller to the second device in response to receiving a second-device direction from the first controller unless an override condition for the management circuit is satisfied.

In accordance with an embodiment, the management circuit is configured to route the data signal received from the first controller to the second device in response to receiving the first-device direction when the override condition in satisfied.

In accordance with an embodiment, the management circuit is configured to route the data signal received from the first controller to the first device in response to receiving the second-device direction when the override condition in satisfied.

In accordance with an embodiment, the system further includes an elementary verification circuit configured to grant access to a first master piece of equipment to the first controller and a second elementary verification circuit configured to grant access to a second master piece of equipment to a second controller.

In accordance with an embodiment, the management circuit includes: a multiplexer including a first input configured to receive the first-device direction and a second input configured to receive an override-direction and a selection signal to toggle an output of the multiplexer between the first input and the second input depending on the override condition.

In accordance with an embodiment, the system further includes a second port configured to couple with a third device and a fourth device, wherein the management circuit is configured to route a data signal received from a second controller to the third device or the fourth device depending on a direction signal received from the second controller unless the override condition for the management circuit is satisfied.

In accordance with an embodiment, the management circuit further includes a control register and wherein the override condition is met when a memory location is set to an override value.

In accordance with an embodiment, an elementary verification circuit is configured to limit external accessibility to the control register to a chosen master piece of equipment.

In accordance with an embodiment, the management circuit is further configured to route a data signal received from a second controller to the first device in response to receiving a first-device direction from the second controller and route the data signal received from the second controller to the second device in response to receiving a second-device direction from the second controller unless the override condition for the management circuit is satisfied.

In accordance with an embodiment, a system to route data includes: a first port configured to couple with a single device and couple with two devices; a second port configured to couple with a single device and couple with two devices; and a management circuit ring a first mode, the management circuit configured to route a data signal received from a first controller to the single device coupled with the first port and route a data signal received from a second controller to the single device coupled with the second port in the first mode, a second mode, the management circuit configured to route the data signal received from the first controller to the single device coupled with the second port and route the data signal received from the second controller to the single device coupled with the first port in the first mode, and a third mode, the management circuit configured to route the data signal received from the first controller to a first device of two devices coupled with the first port in response to receiving a first-device direction from the first controller and route the data signal received from the first controller to a second device of two devices coupled with the first port in response to receiving a second-device direction from the first controller unless an override condition for the management circuit is satisfied.

In accordance with an embodiment, the management circuit includes a fourth mode, the management circuit configured to route the data signal received from the first controller to the first device of two devices coupled with the second port in response to receiving the first-device direction from the first controller and route the data signal received from the first controller to the second device of two devices coupled with the second port in response to receiving the second-device direction from the first controller unless the override condition for the management circuit is satisfied.

In accordance with an embodiment, the management circuit is further configured to route the data signal received from the first controller to the second device of two devices coupled with the first port in response to receiving the first-device direction when the override condition in satisfied in the third mode.

In accordance with an embodiment, the management circuit is configured to route the data signal received from the first controller to the first device of two devices coupled with the first port in response to receiving the second-device direction when the override condition in satisfied in the third mode.

In accordance with an embodiment, the management circuit being configured to route the data signal received from the second controller to the first device of two devices coupled with the first port in response to receiving a first-device direction from the second controller and route the data signal received from the second controller to the second device of two devices coupled with the first port in response to receiving a second-device direction from the second controller unless the override condition for the management circuit is satisfied.

In accordance with an embodiment, the management circuit further includes a control register and wherein the override condition is met when a memory location is set to an override value.

In accordance with an embodiment, an elementary verification circuit is configured to limit external accessibility to the control register to a chosen master piece of equipment.

In accordance with an embodiment, a method to route data received from a first controller includes: receiving a data signal from the first controller; receiving a direction from the first controller to deliver the data signal to a first of two devices coupled with a port; determining that an override condition has been met; and interrupting delivery of the data signal to the first of two devices coupled with the port.

In accordance with an embodiment, the override condition includes storing an override value in a control register.

In accordance with an embodiment, the method includes receiving the direction from the first controller at a first input for a MUX, receiving an override direction at a second input for the MUX, and routing the data signal to a second of two devices coupled with the port by selecting the second input of the MUX as an output of the MUX.

In accordance with an embodiment, the method further includes wherein interrupting delivery of the data signal to the first of two devices coupled with the port includes blanking the data signal with an OR gate.

BRIEF DESCRIPTION OF THE DRAWINGS

Other advantages and features of the description will appear upon examining the detailed description of non-limiting embodiments and appended drawings:

FIG. 1 illustrates a system on a chip;

FIG. 2 illustrates a processing means of the system on a chip;

FIG. 3 illustrates static implementation of a configuration diagram;

FIG. 4 illustrates dynamic implementation of a configuration diagram;

FIG. 5 illustrates a master manager piece of equipment implementing an initial configuration diagram;

FIG. 6 illustrates a fixed designation of a master manager piece of equipment can be during production of the system on a chip;

FIG. 7 illustrates user programming of a designation register to designate the master manager piece of equipment;

FIG. 8 illustrates all the other master pieces of equipment being rendered inoperative while a first master manager piece of equipment is in its boot phase;

FIG. 9 illustrates installation means for implementing an initial configuration diagram;

FIG. 10 illustrates installation means configured to make all the other master pieces of equipment inoperative during the boot phases of the initial and new master manager pieces of equipment;

FIG. 11 illustrates changing the master manager piece of equipment during the execution of the user program after implementing the configuration diagram;

FIG. 12 illustrates an example of a set of configuration pieces of information defining a configuration diagram;

FIG. 13 illustrates a master manager piece of equipment controlling an update of the configuration diagram by the configuration controller which in turn updates the contents of the sets of registers;

FIG. 14 illustrates an example of the content of a transaction;

FIG. 15 illustrates addition means configured to add to each transaction emitted by a master piece of equipment the identification piece of information of the master piece of equipment;

FIG. 16 illustrates verification means configured to perform the verification downstream of the interconnection circuit;

FIG. 17 illustrates an auxiliary verification module verifying that a transaction arriving at the configuration controller is emitted by the master manager piece of equipment;

FIG. 18 illustrates a master piece of equipment having a slave port and a master port;

FIG. 19 illustrates a slave resource peripheral configured to generate an interrupt signal intended for one of the microprocessors that is assigned to the slave resource;

FIG. 20 illustrates master pieces of equipment including a first microprocessor configured to boot during the cold boot of the system on a chip, so as to allow the implementation of the configuration diagram SCH, and including a second microprocessor;

FIG. 21 illustrates restore means including a first backup memory intended to back up the configuration diagram to be restored, as well as a second program memory configured to store upon control of the first microprocessor a restore program executable by the second microprocessor;

FIG. 22 illustrates a state machine included in the restore means;

FIG. 23 illustrates a test access port of the system on a chip intended to be coupled to an external debugging tool;

FIG. 24 illustrates the master manager piece of equipment configured to assign the test identification piece of information only to the test access port;

FIG. 3o depicts an input/output manager override configuration of an embodiment;

DETAILED DESCRIPTION OF ILLUSTRATIVE EMBODIMENTS

Figure 25:
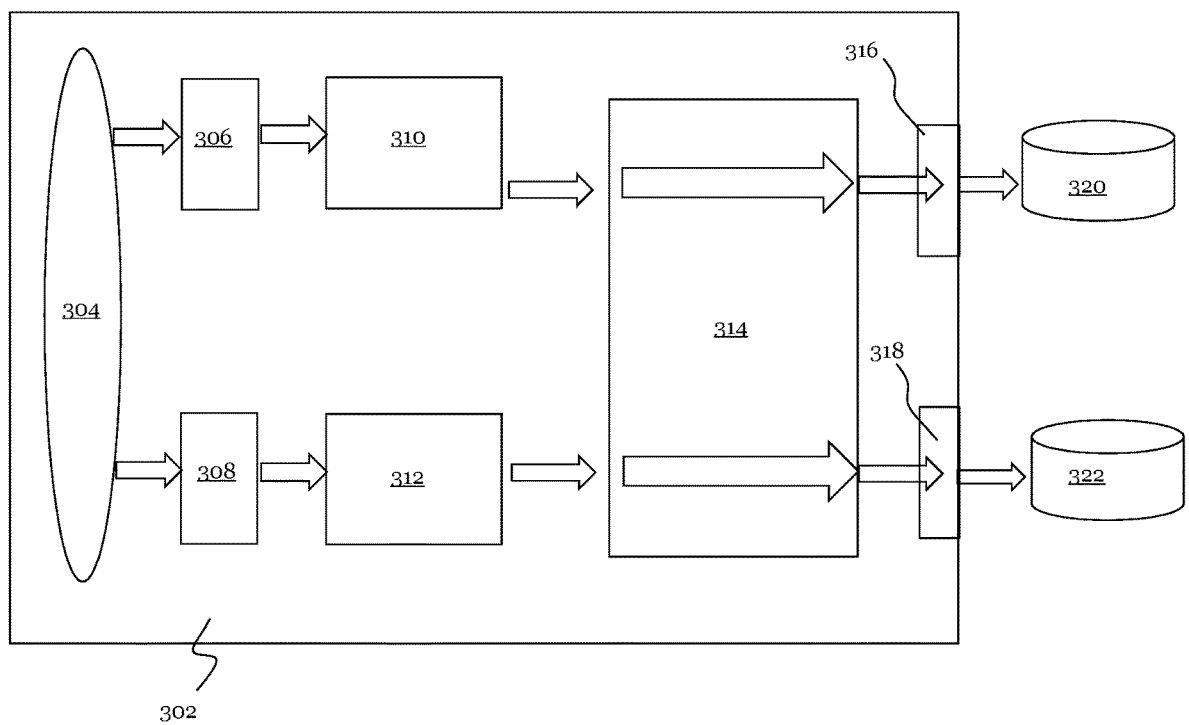
FIG. 25 depicts an example of a multi-port SoC in accordance with an embodiment.

In FIG. 1, the reference MCU designates a system on a chip here forming a microcontroller, although this example is not limiting.

The system on a chip MCU here comprises several master pieces of equipment CPU1, CPU2, LM3 . . . LMj . . . LMk.

In this example, the master pieces of equipment CPU1 and CPU2 are microprocessors and the other master pieces of equipment can be for example master pieces of equipment of Direct Memory Access type (DMA) or else for example USB controllers or even PCI express type master piece of equipment, without this list of examples being exhaustive.

The system on a chip MCU also includes several slave resources IMM1, IMTM2, PH3, PH4, PH5, PH60 and PH61.

Generally, a slave resource belongs to the group formed at least by a peripheral, a feature of a peripheral, a memory means internal to the system on a chip MCU, a memory interface internal to the system on a chip and intended to be coupled to a memory means external to the system on a chip.

Thus, in the example illustrated, the slave resource IMM1 is a memory means for the system on a chip.

The term "memory means" is understood here in a general manner and incorporates for example a complete memory or then one or more memory areas for example.

The slave resource IMTM2 is here an internal memory interface intended to be coupled to an external memory means EXMM, for example a DRAM memory.

The slave resources PH3, PH4 and PH5 are peripherals, for example a UART type peripheral, an I2C controller, an SPI controller.

The reference PH6 here designates a Real Time Clock (RTC) device including for example the module PH60 intended to provide the clock signal and the module PH61 intended for example to provide an alarm.

In this case, the modules PH60 and PH61 which are features of the real time clock device PH6 are considered as slave resources.

The structure of the master pieces of equipment and of the slave resources is conventional and known per se.

The system on a chip MCU moreover includes an interconnection circuit INTC capable of routing transactions between master pieces of equipment and slave resources.

The structure of such an interconnection circuit, which is generally a multilayer interconnection circuit, as well as the protocol allowing the exchange and the routing of the transactions inside the interconnection circuit are well known to the person skilled in the art.

This can for example refer in particular:

to the article by Venkateswara Rao and others entitled "A Frame work on AMBA bus based Communication Architecture to improve the Real Time Computing Performance in MPSoC," International Journal of Computer Applications (0975-8887), Volume 91-N° 5, April 2014, or a general presentation of these interconnection circuits made in 2015 by A. Gerstlauer and available at the internet address http://users.ece.utexas.edu/~gerstl/ee382v_f14/lectures/lecture_12.pdf.

Moreover, in an indicative but non-limiting manner, for example the interconnection circuit marketed by the company ARM under the reference NIC-400 (version Rop3) can be used.

The system on a chip also includes, associated with each master piece of equipment and with each slave resource, a set of configuration registers including several configuration registers intended for storing configuration pieces of information respectively, the meaning of which will be explained in more detail below.

The reference RGCM1 designates the set of configuration registers associated with the master piece of equipment CPU1.

The reference RGCM2 designates the set of configuration registers associated with the master piece of equipment CPU2.

The reference RGCM3 designates the set of configuration registers assigned to the master piece of equipment LM3.

The reference RGCMj designates the set of configuration registers assigned to the master piece of equipment LMj.

Moreover, the system on a chip here includes the master piece of equipment LMk, for example a USB controller controllable by a microprocessor, for example the microprocessor CPU1, and this master piece of equipment LMk includes an output port PS capable of emitting transactions as well as an input port PE capable of receiving transactions.

The input port PE is then considered as a slave resource and the output port PS is then considered as a master piece of equipment.

Therefore, the reference RGCMk designates the set of configuration registers assigned to the master piece of equipment PS.

The reference RGCS1 designates the set of configuration registers assigned to the slave resource IMM1.

The reference RGCS2 designates the set of configuration registers associated with the slave resource IMTM2.

The reference RGSC3 designates the set of configuration registers associated with the peripheral PH3.

The reference RGCS4 designates the set of configuration registers assigned to the peripheral PH4.

The reference RGCS5 designates the set of configuration registers assigned to the peripheral PH5.

The reference RGCS60 designates the set of configuration registers assigned to the feature PH60.

And, the reference RGCS61 designates the set of configuration registers assigned to the feature PH61.

Moreover, in this example, a register RDS, called designation register, is provided, the feature of which will be discussed in more detail but, which, can already be indicated that it is used to designate a master piece of equipment having the quality of a master manager piece of equipment.

Moreover, the register RGG, called manager register, the feature of which will also be discussed below in more detail, is used to designate the current master manager piece of equipment, which, as will be seen in more detail below, may possibly be modified during the operation of the system on a chip MCU, that is to say here during the execution of a user program.

The various sets of configuration registers are shown here within a controller RIFC.

However, they could be located outside the controller.

The system on a chip MCU also includes an elementary management unit RIMU1, RIMU2, RIMU3, RIMUj, RIMUk associated with each master piece of equipment.

The structure and feature of these elementary management units can be discussed in more detail, but it can be said that they are part of addition means intended to add to any transaction emitted by a master piece of equipment, an identification piece of information CID and optionally a security piece of information and/or a privileged piece of information.

The system on a chip also includes, associated with each slave resource, an elementary verification module RISU1, RISU2, RISU3, RISU4, RISU5, RISU60 and RISU61 the structure and feature of which will also be discussed in more detail below.

It can already be said that these elementary verification modules are part of the verification means intended to verify whether a transaction intended for a slave resource is authorized to access this slave resource.

The various elementary management units RIMU and the various elementary verification modules RISU are respectively connected to the sets of corresponding configuration registers by specific links, for example metal tracks.

While the elementary verification modules RISUi have been shown in FIG. 1 outside the corresponding peripherals, it is quite possible to provide one or more peripherals having their corresponding elementary verification module, integrated into the peripheral itself.

Now, if reference is made more particularly to FIG. 2, the system on a chip MCU includes processing means MT, distributed in particular within the various elements which have been described with reference to FIG. 1, and configured to allow a user of the system on a chip to implement within the system on a chip, during a configuration phase PHCFG (step 20), a configuration diagram SCH which is defined by the set of configuration pieces of information which will be stored in the various sets of configuration registers.

Before discussing in more detail the constitution of these configuration pieces of information, it can already be noted that the user has the possibility of implementing a static or dynamic configuration.

More specifically, as illustrated in FIG. 3, the processing means are configured to allow a user of the system on a chip to implement (step 20) an initial configuration diagram SCHI which will form the configuration diagram SCH.

In other words, according to this variant, once the initial configuration diagram has been implemented, it remains valid during the use or operating phase of the system on a chip.

Alternatively, as illustrated in FIG. 4, it is possible for a user, during the configuration phase PHCFG, to have implemented by the processing means MT (step 200) an initial configuration diagram having an initial set of configuration pieces of information then having the initial configuration diagram modified (step 201) by the processing means by modifying the value of at least one piece of configuration information, for example, of this initial set so as to obtain the set of configuration pieces of information defining a new configuration diagram SCH.

The processing means comprise installation means which include, from the master pieces of equipment, a first master piece of equipment called first master manager piece of equipment.

As illustrated in FIG. 5, this first master manager piece of equipment EMG is configured, in response to a first boot 50, or cold boot of the system on a chip, to perform a boot phase at the end of which this first master manager piece of equipment EMG is configured to at least allow the implementation 51 of the initial configuration diagram SCHI.

As schematically illustrated in FIG. 6, the designation of the first master manager piece of equipment EMG can be fixed during the production 60 of the system on a chip MCU, for example by hard-coding.

Alternatively, it is possible for the user to use the programmable designation register RDS allowing to designate the first master manager piece of equipment EMG.

More specifically, as illustrated in FIG. 7, during the provision 70 of the system on a chip MCU, the user can proceed with a programming 71 of the designation register RDS, for example by programming or not series of memories of the OTP type forming the designation register RDS so as to designate the master manager piece of equipment EMG, which is for example in this example the microprocessor CPU1.

In particular, in order to avoid conflicts, the installation means are further configured, as illustrated in FIG. 8, to temporarily make inoperative (step 81) all the other master pieces of equipment LM2, LM3, LMj, LMk, CPU2 as long as the first master manager piece of equipment EMG, here the microprocessor CPU1, has not completed its boot phase 80.

When a master piece of equipment is a microprocessor, it can be made inoperative by for example forcing the reset signal to 0 which keeps it in standby state.

When the other master pieces of equipment are equipment controlled by a microprocessor, they are of course inoperative as long as the processor itself is inoperative.

By way of example, as illustrated in FIG. 9, the installation means include, in addition to the master manager piece of equipment EMG, a boot memory (boot ROM) BMM configured to store, in a storage step 91, a boot program BPR executable only by the first master manager piece of equipment CPU1 during the first boot or cold boot of the system on a chip (steps 90 and 92).

The installation means moreover include an input INP (FIG. 1) configured to receive a user program. This user program can for example be stored on an SD card cooperating with the input INP.

This user program UPR (FIG. 9) is received from the input INP in step 94 and stored (step 95) in a program memory PMM.

This user program UPR contains at least instructions representative of the initial configuration diagram SCHI.

The processing means then include allocation means allowing to implement the initial configuration diagram.

In this example, the allocation means include the first master manager piece of equipment (for example the microprocessor CPU1) configured, at the end of its boot phase, to execute (step 93) the user program UPR in order to implement the initial configuration diagram.

While a microprocessor, for example the microprocessor CPU1, has been described here as the first master manager piece of equipment EMG, it is quite possible, alternatively, that the first master manager piece of equipment comprises a hardware logic circuit.

While a single master manager piece of equipment has just been described during the configuration phase PHCFG, it is possible, as schematically illustrated in FIG. 10, to modify the master manager piece of equipment during this configuration phase.

More specifically, the installation means then include, from the master pieces of equipment, a master piece of equipment called the initial master manager piece of equipment, for example the microprocessor CPU1, configured, during the first boot of the system on a chip, to perform a boot phase at the end of which it is configured to authorize a boot of another master piece of equipment designated as being a new master manager piece of equipment, for example the microprocessor CPU2.

This new master manager piece of equipment then forms the first master manager piece of equipment which is configured, at the end of its boot phase, to at least allow the implementation of the initial configuration diagram.

The initial master manager piece of equipment may comprise a microprocessor and the new master manager piece of equipment may comprise another microprocessor.

Alternatively, the initial master manager piece of equipment may comprise a hardware logic circuit and the new master manager piece of equipment may comprise a microprocessor.

And, here again, the installation means are configured to temporarily make all the other master pieces of equipment inoperative as long as the boot phase of the initial master manager piece of equipment and that of the new master manager piece of equipment are not completed.

As an example illustrated in FIG. 10, the installation means include in this regard a boot memory BMM configured to store (step 100) a boot program BPR1 executable only by the initial master manager piece of equipment CPU1 during the first boot or cold boot 101 of the system on a chip MCU.

The installation means also include a program memory PMM configured to store the boot program BPR2 of the new master manager piece of equipment CPU2.

A reception is then provided, for example via the input INP, of the boot program BPR2 and the user program UPR, these two programs being stored (step 104) in the program memory PMM.

During cold boot 101, the initial master manager piece of equipment CPU1 executes its boot program BPR1 (step 102) and then authorises the boot of the microprocessor CPU2 which is the new master manager piece of equipment.

The latter executes in step 105 its boot program PBR2 then the user program UPR (step 106) in order to implement the initial configuration diagram SCHI.

Of course, as indicated above, in step 107, the other master pieces of equipment LM2, LM3, LMj and LMk are inoperative.

While it has been seen previously that it was possible to change master manager piece of equipment during the configuration phase, it is also possible, as illustrated in FIG. 11, to change master manager piece of equipment during the operating phase PHF of the system on a chip, that is to say during the execution of the user program after implementing the configuration diagram.

More specifically, in FIG. 11, the microprocessor CPU1 is a first master manager piece of equipment. And, during the execution no of the user program UPR, the processing means MT modify (step iii) the master manager piece of equipment EMG which, in this case, becomes a new master manager piece of equipment CPU2.

It is of course possible that this new master manager piece of equipment CPU2 can in turn designate (step 112) a new master manager piece of equipment and then lose its quality as master manager piece of equipment. As an example, this new master manager piece of equipment may again be the microprocessor CPU1.

In this regard, only the master manager piece of equipment can designate a new master manager piece of equipment. And for example this is done by writing in the manager register RGG by the current master manager piece of equipment, the identification piece of information of the new master manager piece of equipment.

From that moment, the old master manager piece of equipment then has lost its quality as master manager piece of equipment.

Reference is now made more particularly to FIG. 12 to illustrate an example of a set of configuration pieces of information defining a configuration diagram SCH.

The set of configuration pieces of information includes, for each piece of equipment, an identification piece of information CID. This identification piece of information allows to identify the master piece of equipment from the list of master pieces of equipment.

This identification piece of information CID can for example be a digital word.

The set of configuration pieces of information of a master piece of equipment can also include security piece of information SEC, for example a bit, indicating, depending on the logical value of the bit, whether this master piece of equipment is configured in secure mode or not.

The set of configuration pieces of information for a master piece of equipment may also include a privileged piece of information PRV, for example a bit, indicating according to the logical value of the bit whether this master piece of equipment is configured in privileged mode or not.

This privileged piece of information may include several bits if several levels of privileged modes are provided. Finally, provision can be made for a locking piece of information LKM, for example one or more bits, which, depending on the logical value of the bit(s), indicate whether at least one of the configuration pieces of information, for example the configuration pieces of information SEC and PRV, or else the identification piece of information CID, can be modified or not.

It is also possible to provide one or more locking bits allowing to lock the content of the manager register RGG designating the identification piece of information of the master manager piece of equipment.

These configuration pieces of information associated with the master pieces of equipment are stored (step 120) in the corresponding set of configuration register RGCMi.

With regard to a slave resource, the set of configuration pieces of information associated therewith can comprise, for example, an inaccessibility piece of information INAC, for example a bit, intended to indicate, according to the logical value of the bit, that this slave resource is inaccessible by any master piece of equipment.

The configuration diagram SCH further comprises, for a non-inaccessible slave resource, a filtering piece of information IFLT, for example a bit, intended to indicate, based only on the identification pieces of information CID of the master pieces of equipment, whether this slave resource can be accessed by any master piece of equipment or by only one or more master pieces of equipment.

Thus, for example, if the filtering piece of information has the logical value "o", this means that there is no filtering applied to the identification pieces of information and that consequently, a slave resource can be accessed by any master piece of equipment, subject to any other access restrictions that will be seen in more detail below.

In fact, these sets of configuration pieces of information allow assigning at least one piece of master equipment to a slave resource.

It should be noted that several master pieces of equipment can have the same identification piece of information CID.

This is the case, for example, when these master pieces of equipment include a microprocessor and one or more master pieces of equipment controllable by this microprocessor. In this case, a compartment designated by the identification piece of information CID is formed.

All the master pieces of equipment of this compartment can then have for example access to the same memory resources.

It is also possible that a master piece of equipment controlled by a microprocessor, for security reasons, does not have the same identification piece of information as the microprocessor. This is for example the case for an equipment of the PCI-E type. In this case, this allows to limit access to some memory resources of this PCI-E type master piece of equipment.

The set of configuration pieces of information defining the configuration diagram may further comprise, for the non-accessible slave resource, a first access piece of information IACs intended to indicate, in the case where the filtering piece of information IFLT (IFLT=1 for example) indicates that the considered slave resource can be accessed by only one or more master pieces of equipment, that this slave resource can be accessed by one or more master pieces of equipment having the same identification piece of information CID.

In this case, of course, the set of configuration pieces of information includes this corresponding identification piece of information CID.

As indicated above, this identification piece of information CID can relate to a single master piece of equipment or to several master pieces of equipment in the same compartment.

The set of configuration pieces of information defining the configuration diagram SHC can further comprise for this non-accessible slave resource, a second access piece of information IAC2 intended to indicate, in the case where the filtering piece of information IFLT (IFLT=1) indicates that the slave resource can be accessed by only one or more master pieces of equipment, that this slave resource can be accessed by master pieces of equipment having different identification pieces of information CID. And, in this case, the set of configuration pieces of information of this slave resource includes the list CID1 . . . CID4, for example, of identification pieces of information of the corresponding master pieces of equipment.

Such a slave resource which can be accessed by several master pieces of equipment sequentially or simultaneously, can for example be a memory means.

On the other hand, it is possible for this slave resource which can be accessed by the master pieces of equipment of the list, that the set of configuration pieces of information comprises a third piece of information IAC3 intended to indicate that this slave resource can only be accessed by one master piece of equipment at a time, the master piece of equipment wishing to access this slave resource being configured to use a semaphore SMP.

This is the case, for example, when a slave resource can be accessed by two microprocessors. Only the microprocessor that takes the semaphore can access this slave resource and until the microprocessor has released the semaphore, the other microprocessor cannot access it. It will only be able to access it when it has taken in turn the semaphore SMP.

The set of configuration pieces of information defining the configuration diagram SCH for this slave resource can also comprise security piece of information ISEC, for example a bit, intended to indicate whether this slave resource is accessible by a secure master piece of equipment or not.

Likewise, the set of configuration pieces of information may include a privileged piece of information for this slave resource, for example a bit, IPRV, intended to indicate whether this slave resource is accessible by a master piece of equipment in privileged mode or not.

And, here again, it is also possible to use a locking piece of information LKS intended to indicate whether the configuration pieces of information of this slave resource can be modified or not.

All these configuration pieces of information assigned to a slave resource are stored (step 121) in the set of corresponding configuration registers RGCSi.

It should be noted here that the first master manager piece of equipment, for example the microprocessor CPU1, is configured to be in secure mode and in privileged mode at the end of its boot phase.

As indicated above, the allocation means allowing to implement the configuration diagram, particularly the initial configuration diagram, include the sets of configuration registers assigned to each slave resource and to each master piece of equipment as well as the configuration controller RIFC configured to update the contents of the sets of configuration registers with the set of configuration pieces of information under the control of the first master manager piece of equipment.

This is schematically illustrated in FIG. 13.

More specifically, the master manager piece of equipment CPU1 controls (step 130) an update of the configuration diagram SCH which is performed by the configuration controller RIFC which updates the contents of the sets of registers RGCMi and RGCSi (step 131).

And, only the master piece of equipment which has the quality of master manager piece of equipment is configured to modify a configuration diagram.

Reference is now made more particularly to FIG. 14 to describe an example of the content of a transaction TR.

Generally, here, each transaction TR emitted by a master piece of equipment comprises an addressing field ADR whose content is intended to address the slave resource receiving this transaction.

But the content of the addressing field ADR does not belong to the set of configuration pieces of information.

In other words, the content of the addressing field is not used alone or in combination, to define the assignments of the master pieces of equipment to the slave resources.

More specifically, as illustrated in FIG. 14, each transaction TR includes the identification piece of information CID of the master piece of equipment emitting this transaction, the security piece of information SEC, an indication EXE intended to indicate whether or not this transaction contains an execution instruction, the privileged piece of information PRV, a piece of information RW indicating whether it is a read or write transaction, the addressing field ADR and a data field DATA.

The processing means of the system on a chip include addition means configured to add to each transaction emitted by a master piece of equipment at least the identification piece of information of this master piece of equipment CID, this identification piece of information not belonging to the addressing field ADR of the transaction.

The addition means are further configured to add the security piece of information SEC and/or the privileged piece of information to each transaction emitted by a master piece of equipment if these two pieces of information do not already appear in the transaction emitted by the master piece of equipment.

As illustrated in FIG. 15, these addition means include for each master piece of equipment EMi, the associated elementary management unit RIMUi which is linked to the set of corresponding configuration registers RGCMi by the specific link LDMi.

Thus, the elementary management unit RIMUi completes the initial transaction TRI emitted by the master piece of equipment EMi by adding (step 150) the identification piece of information CID and optionally the pieces of information SEC and PRV thereto, the complete transaction TR then being supplied on the bus linked to the interconnection circuit INTC.

Materially, this elementary management unit RIMUi can comprise a logic circuit.

The processing means MT can also include verification means configured to verify whether a transaction TR emanating from a master piece of equipment and intended for a slave resource is authorized to access this slave resource using at least the configuration piece of information attached to the transaction, and in general at least some of the other configuration pieces of information of the set of configuration pieces of information assigned to this slave resource.

More specifically, as illustrated in FIG. 16, the verification means are configured to perform the verification downstream of the interconnection circuit INTC and these verification means include for each slave resource the elementary verification module RISUi which is configured to access the set of configuration pieces of information assigned to this slave resource and stored in the set of corresponding configuration registers RGCSi, via the specific link LDSi.

The access authorization verification is performed in step 160.

This verification allows to define whether in step 161 the access to the transaction TR intended for the slave resource RSSi is authorized or not.

This is for example the case if the filtering indication IFLT is enabled and the slave resource can only be accessed by one or more master pieces of equipment having the same identification piece of information, and the identification piece of information contained in the transaction TR does not correspond to the identification piece of information stored in the set of registers RGCSi.

The verification means then determine whether the denied transaction is a read transaction (step 163).

If this is the case, the elementary management unit RISUi returns to the master piece of equipment EMi emitting the denied transaction (step 164) an indication of access denial IR, for example a 0.

In parallel, the elementary verification module RISUi returns (step 165) to the master manager piece of equipment EMG an illegal access notification NIAC containing an identifier IDRSSi of the slave resource RSSi, the identification piece of information CIDi of the master piece of equipment EMI at the origin of this denied transaction, as well as the transaction type (here the read type).

If the denied transaction is a write transaction, then this transaction is purely and simply ignored (step 167) but the elementary verification module RISUi still returns to the master manager piece of equipment EMG the illegal access notification containing here again the identifier IDRSSi, the identification piece of information CIDi of the master piece equipment EMI at the origin of the denied transaction and the type of the denied transaction, here the write type.

Structurally, an elementary verification module RISU can include a logic circuit.

It was seen previously that only the master manager piece of equipment can send a transaction to the configuration controller, for example to update configuration registers.

In this regard, it is therefore necessary to verify that a transaction arriving at the configuration controller is indeed emitted by the master manager piece of equipment.

This is the role of an auxiliary verification module RISUC assigned to the configuration controller RIFC (FIG. 17).

In this regard, when a transaction TRC, in particular containing the identification piece of information CID of the master piece of equipment at the origin of this transaction TRC, is provided (step 170) to the auxiliary verification module RISUC, the latter, connected to the manager register RGG containing the identification piece of information CID of the current manager equipment, for example the microprocessor CPU1, verifies that the identification piece of information CID contained in the transaction TRC indeed corresponds to the identification piece of information CIDi (step 171).

If this is not the case, the access to the controller RIFC is denied (step 173).

On the other hand, if there is a match between the two identification pieces of information, then the transaction TRC is indeed provided to the configuration controller RIFC (step 172).

It was seen previously that from the master pieces of equipment, it is possible that there is at least one piece of master equipment having a slave port and a master port.

This is the case for example for the master piece of equipment LMk (FIG. 18) having an input port PE (slave port) and an output port PS (master port).

Such a master piece of equipment can for example be a USB controller which is controllable by a microprocessor but which can also be controllable during the execution of the user program, by another microprocessor.

The slave port PE is associated with an elementary verification module RISUk connected to the corresponding set of configuration registers RGCSk and the master port PS is associated with an elementary management unit RIMUk connected to the corresponding set of configuration registers RGCMk but also to the set of configuration registers RGCSk.

It is initially assumed that this master piece of equipment LMk is controlled by the microprocessor CPU1.

In this case, the set of configuration registers RGCSk to which the elementary verification module RISUk is linked contains the identification piece of information CIDi of the microprocessor 1 as well as the privileged and security piece of information corresponding to those of the microprocessor CPU1.

The set of registers RGCMk also includes the identification piece of information CIDi of the microprocessor CPU1 as well as the corresponding security and privileged pieces of information.

The processing means then include inheritance means MINH (FIG. 18) configured, upon control and by taking into account inheritance rules, to replace at least some of the configuration pieces of information assigned to the master port with the homologous configuration pieces of information assigned to the slave port or else to keep the configuration pieces of information assigned to the master port.

More specifically, these inheritance means MINH include a set of controllable switches SW, produced for example in hardware form, selectively connected to the set of registers RGMk and to the set of registers RGCSk.

The inheritance means MINH also include MCM control means, for example produced in software form within the microprocessor CPU1, and capable of emitting a control signal CSP intended to control the switch set SW taking into account the inheritance rules.

As long as the master piece of equipment LMk is controlled by the microprocessor CPU1, the control means MCM place the switch SW in position A so as to add to the transaction emitted by the master port PS, the identification piece of information CIDi as well as the corresponding privileged and security pieces of information.

On the other hand, if at a given instant there is a modification of the configuration diagram so that it is for example the microprocessor CPU2 which must take control of the master piece of equipment LMk, then, there is on the one hand, an update of the set of configuration registers RGCSk with the new identification piece of information CID2 of the microprocessor CPU2 and with the corresponding privileged and security pieces of information and, on the other hand, a switching of the switch SW to position B so that, automatically, the identification piece of information CID2 of the microprocessor CPU2 and the corresponding security and privileged pieces of information are attached to the transaction emitted by the master port PS on the interconnection circuit INTC.

In other words, without it being necessary to perform a complete reprogramming of the system on a chip, there is an automatic inheritance by a simple switching, of the new pieces of information assigned to the slave port towards the master port.

It is also possible that not only several microprocessors, for example the microprocessors CPU1 and CPU2, appear among the master pieces of equipment, but also at least one slave resource, for example the peripheral PH5, configured to generate at least one interrupt signal intended for one of the microprocessors which is assigned to this slave resource, appears among the slave resources.

This is schematically illustrated in FIG. 19.

In this regard, several interrupt wires FRQ1, FRQ2 are respectively connected to the microprocessors CPU1 and CPU2 and to the at least one slave resource PH5.

These interrupt wires are capable of conveying IRQ interrupt signals.

The processing means then comprise interrupt filtering means MFIRQ configured to route the interrupt signal IRQ emitted by the slave resource PH5 only on the interrupt wire connected to the microprocessor which is assigned thereto, for example here only on the interrupt wire FRQ1 connected to the microprocessor CPU1 which is assigned to the peripheral PH5.

As illustrated in FIG. 19, these filtering means MFIRQ are incorporated at least in part into the elementary verification module RISU5 assigned to the slave resource PH5.

More specifically, in the elementary verification module RISU5 are provided several controllable switches SW1, SW2 connected between the output of the slave resource configured to provide the interrupt signal IRQ, and respectively the interrupt wires FRQ1 and FRQ2 connected to the microprocessors CPU1 and CPU2.

The interrupt filtering means also include control means MCMI, incorporated in the elementary verification module RISU5 or not, and configured to close the switch, (here the switch SW1) connected between the output SS5 and the interrupt wire FRQ1 connected to the microprocessor CPU1 assigned to the slave resource, and to open the other switch SW2.

Thus, it will not be possible to spy on the activity of the microprocessor CPU1 by means of the interrupt signals.

It is also possible, according to one embodiment, that the master pieces of equipment comprise a first microprocessor, for example the microprocessor CPU1, configured to boot during the first boot or cold boot of the system on a chip (steps 2000 and 2010, FIG. 20) so as to allow the implementation 2020 of the configuration diagram SCH, and a second microprocessor CPU2.

At some point, the system on a chip MCU can enter a standby state (step 2030).

Restore means MRST configured to allow the second processor CPU2 to restore (step 2050) the configuration diagram instead of the first microprocessor CPU1 are then provided in the event of an exit from the standby state of the system on a chip (step 2040).

This is particularly advantageous when the second microprocessor is for example faster and/or has a lower consumption than that of the first microprocessor CPU1.

In this regard, the restore means MRST comprise (FIG. 21) a first backup memory MM1 intended to back up the configuration diagram SCH to be restored, as well as a second program memory MM2 configured to store upon control of the first microprocessor (which is configured as master manager piece of equipment before entering the standby mode of the system on a chip MCU), a restore program PRGR executable by the second microprocessor CPU2.

The restore means MRST also include a secure storage means RGSS, for example a protected hardware register system, configured to store a signature of the restore program, as well as the start address of the restore program in the second program memory MM2.

The restore means MRST also include a wake-up source POR, of conventional structure, intended to generate a signal SRV for waking up the second microprocessor CPU2 when the system on a chip exits from the standby mode.

The restore means MRST also include a state machine STM.

As illustrated in FIG. 22, this state machine STM is configured, in the presence of the wake-up signal SRV, to
 keep the first microprocessor CPU1 in standby state (step 2200) for example by forcing the reset signal (reset) to 0,
 verify the signature SGN (step 2210) then,
 in the event of successful verification (step 2220), temporarily confer to the second microprocessor CPU2 (step 2230) the quality of master manager piece of equipment (by storing in the manager register RGG the identification piece of information CID2 of this second microprocessor) and authorize the execution (step 2240) of the restore program PRGR by the second microprocessor CPU2.

Then, when the restoration of the configuration diagram SCH is complete, the state machine is configured to
 remove the quality of master manager piece of equipment to the second microprocessor CPU2 (step 2250),
 allow the first microprocessor CPU1 to exit the standby mode (step 2260) by releasing for example the reset signal and by returning the quality of master manager piece of equipment to the first microprocessor CPU1 (step 2270) by entering the identification piece of information CIDi of this first microprocessor CPU1 in the manager register.

According to yet another embodiment, it is possible that the system on a chip comprises, as illustrated in FIG. 23, from the master pieces of equipment, a test access port DAP, conforming for example to the standard JTAG, intended to be coupled to an external debugging tool DBT.

This test access port DAP is assigned to a test identification piece of information Debug_CID stored in a test register RGCDAP connected to the elementary management unit RIMUDAP assigned to this test access port.

And, as illustrated in FIG. 24, only the master manager piece of equipment EMG is configured to assign the test identification piece of information Debug_CID only to the test access port DAP. Indeed, any RSS slave resource is configured to accept to receive a transaction TR including this test identification piece of information Debug_CID, after verifying the security piece of information (SEC) and the privileged piece information (PRV) attached to the transaction.

Indeed, the access emanating from the test access port comply with the privilege and security concepts.

Thus, even if such a transaction is intended to be provided to a slave resource regardless of its identification piece of information CID, the security and privileged pieces of information attached to this transaction must advantageously correspond to those assigned to this slave resource.

In some cases, it may be beneficial to provide multiple ports on a SoC. For example, an external interface of a SoC may comprise more than one port to couple with more than one serial memory device. For security reasons, it may be beneficial to have multiple controllers in place on the SoC for different execution contexts. The controllers may be behind separate firewalls, such as elementary verification modules RISU as discussed at least with reference to FIG. 1 and FIG. 16. to keep execution contexts separate from each other. Identification information may be used to define assignments of master pieces of equipment to slave resources. And, access for different master piece of equipment (such as a CPU or software process) may be kept distinct. One advantage provided by such an arrangement is an ability to provide different types of access to different master pieces of equipment, which can help segregate higher security applications from lower security applications.

For example, a first controller may be used for operations on a first device requiring a higher security level than a second device. A second controller may be approved for lower security tasks. To maintain the security integrity of the higher-security device it may be beneficial to prevent the second controller (with a lower security level) from accessing a first device (with a higher security requirement).

With multiple ports for coupling with multiple devices, the controllers may be kept distinct from each other by linking the controllers with a port. However, it may also be advantageous to rearrange which ports are linked to which controllers. This may be helpful to provide flexibility to a SoC. For example, different devices may be coupled with different ports.

FIG. 25 depicts an example of a multi-port SoC in accordance with an embodiment.

The multiport SoC 302 may comprise an interconnect circuit 304. The interconnect circuit may provide communication with other parts of the multiport SoC 302 The multiport SoC 302 may further comprise a first elementary verification module 306 (such as for a first controller and a second elementary verification module 308 for a second controller. The first elementary verification module 306 may be configured to be assigned to a first master piece of equipment and the second elementary verification module 308 may be configured to be assigned to a second master piece of equipment. The first master piece of equipment may comprise a CPU or non-CPU master (for example, a software application). Likewise, a second master piece of equipment may comprise a CPU or non-CPU master (such as a software application).

A first controller 310 may be behind the first elementary verification module. 306 And, a second controller 312 may be behind the second elementary verification module 308. The multiport SoC 302 may further comprise an input/output manager circuit 314, a first port 316 and a second port 318. The first controller 310 may provide a data signal to the input/output manager circuit 314. The second controller 312 may also provide a data signal to the input/output manager circuit 314.

The input/output manager circuit 314 may transmit data from the first controller 310 to the first port 316 and data from the second controller 312 may be transmitted to the second port 318. A first device 320 coupled with the first port 316 may receive data from the first controller 310 and a second device 322 may receive data from the second controller 312 through the second port 318. The data received by the devices may initiate tasks on the devices (such as erasures or other tasks in the case of serial memory devices). As depicted in FIG. 25, both the first port 316 and the second port 318 provide access to a device from one controller. The pathways from the master pieces of equipment through the firewalls, controllers, and input/output manager circuit 314 to the ports are separated. As will be appreciated, communication between components may be accomplished by various means such as a bus or busses as represented by arrows.

Figure 26:
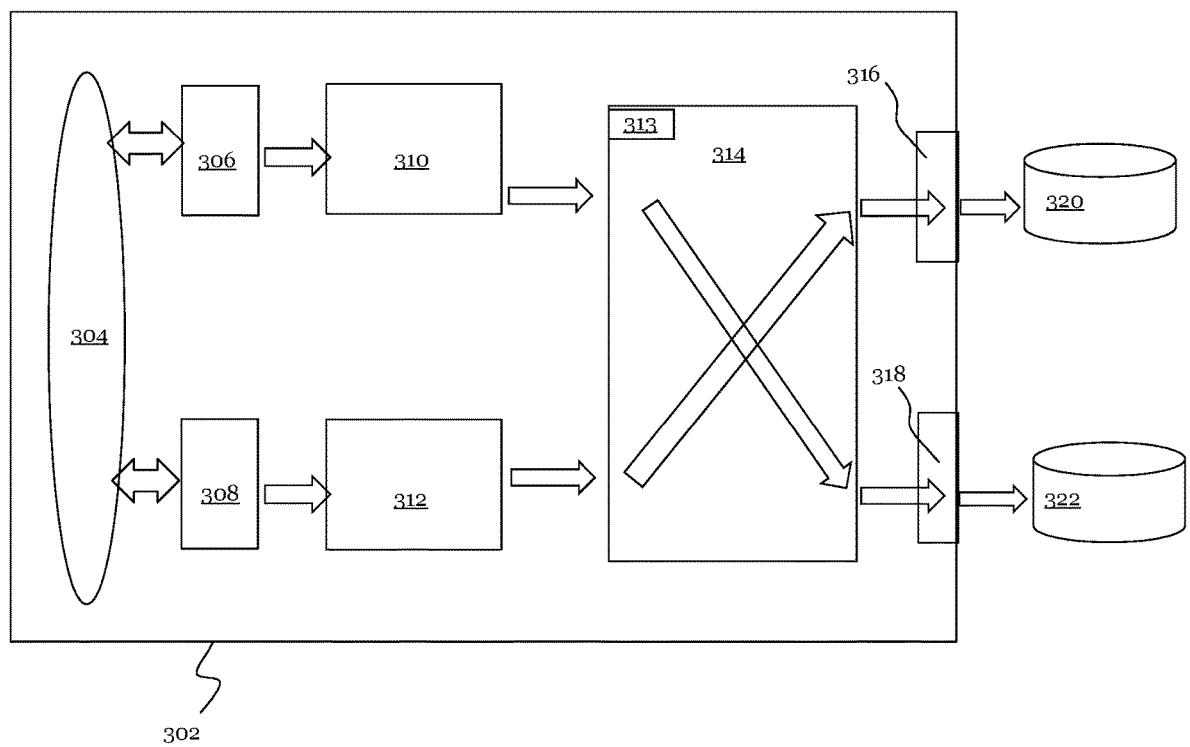
FIG. 26 depicts an example of a multi-port SoC in accordance with an embodiment.

FIG. 26 depicts an example of a multi-port SoC in accordance with an embodiment.

The input/output manager circuit 314 may direct data from the first controller 310 to the second port 318 and data from the second controller 312 may be provided to the first port 316. Each controller has a corresponding port. However, the arrangement in FIG. 25 has been swapped with the first port 316 being linked with the second controller 312 and the second port 318 being linked with the first controller. In various embodiments, the input/output manager circuit 314 may be configured to operate in modes. In one mode, links between controllers and the ports may be rearranged. For example, in one mode (a direct mode), data may be routed by the input/output manager circuit 314 as depicted in FIG. 25 and, in another mode (a swap mode), the routing may be rearranged to link the controllers with the ports as shown in FIG. 26. As will be appreciated, this may be implemented in a variety of ways. In various embodiments, the input/output manager circuit 314 may comprise a control register 313 for storing values that select the mode. In each of these example modes described so far, separate pathways may be maintained from the controllers to the ports and varying security levels maintained for separate controllers. But, some security issues may arise when controllers share pathways to a port. For example, this may compromise the security advantage created by decentralization of the verification means into localized modules.

It may be advantageous to use a single port to couple with multiple devices (such as serial memory devices). This may be beneficial to limit the number of pads on a System on a Chip. Two (or more) devices paired at a single port may share some pins thereby reducing the architecture needed to couple with multiple devices. This also may allow a SoC to couple with more devices than otherwise. However, multi-device ports can introduce security threats because, by sharing pins, an unsecure master piece of equipment (or master piece of equipment with a lower security approval) may attempt to utilize the shared pathway to gain access to a device that requires more security.

Figure 27:
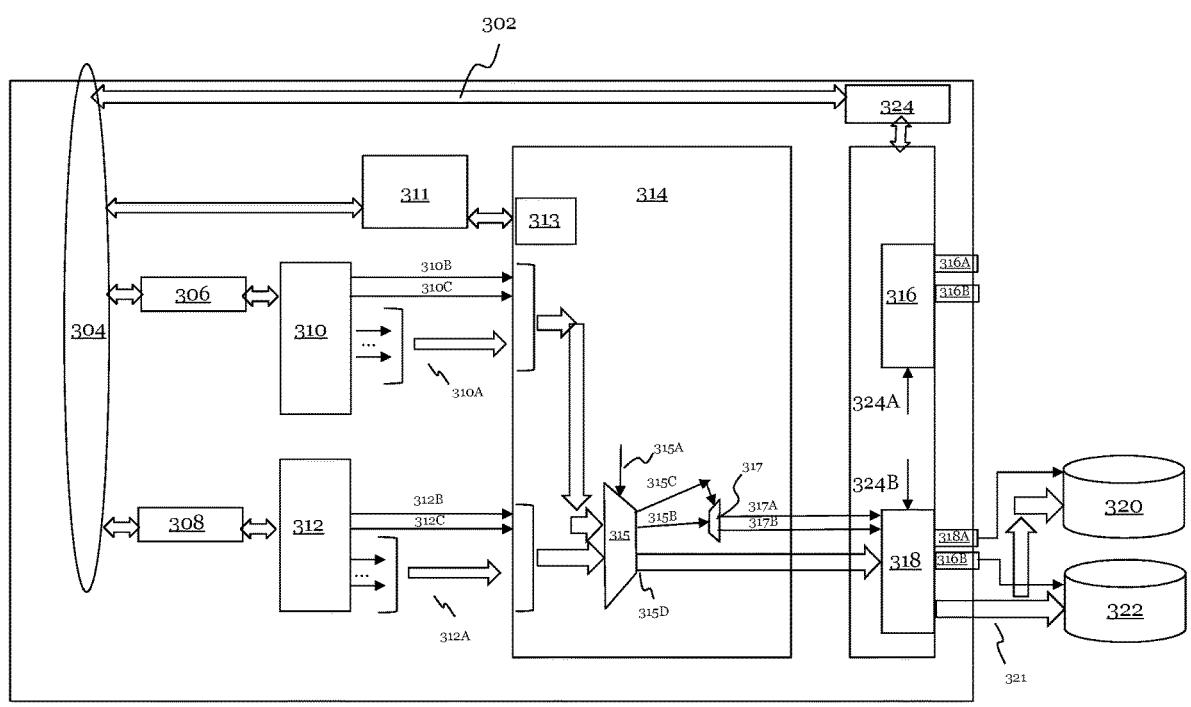
FIG. 27 depicts a multiport SoC with a multi-device port in accordance with an embodiment.

FIG. 27 depicts a multiport SoC with a multi-device port in accordance with an embodiment.

A multiport SoC 302 can be configured to simultaneously couple with more than one device at a single port. FIG. 27 depicts a multiport SoC 302 with a first device 320 and a second device 322 simultaneously coupled with the second port 318. As will be appreciated, the first port 316 (and any additional ports on a multiport SoC 302) may also be configured to be coupled with two (or more) devices simultaneously in various embodiments. The second port 318 is discussed herein as an example, but the same may be implemented for any or all of the ports for a multiport SoC 302. A shared bussing system may couple the second port 318 with the first device 320 and the second device 322.

As will be appreciated, the controllers may produce multiple data signals that are transmitted to the input/output manager circuit 314. For example the first controller 310 may produce data signals 310A and the second controller 312 may produce data signals 312A. The data signals may be received by the input/output manager circuit 314 and be provided to a MUX 315. The MUX 315 may receive a selection signal 315A produced, for example, by a control means or control circuit. The selection signal can determine which of the inputs received by the MUX 315 is provided to the output of the MUX 315. For the purposes of simplicity, the multiport SoC 302 of FIG. 27 is depicted with a single MUX, but it will be appreciated that the multiport SoC 302 may comprise additional MUX circuits for routing signals. For example, a MUX may be provided for each port of the multiport SoC 302.

The selection signal 315A may depend on the mode of the input/output manager circuit 314. For example, while in one mode where only one device is coupled in the second port 318, like depicted in FIG. 25, the selection signal 315A may be set so that the MUX 315 always outputs the signals received from the second controller 312 to route them to the second port 318. In various embodiments, another MUX (not depicted) may be set to route all signals from the first controller 310 to the first port 316 while in the first mode.

In a second mode, where a single device is coupled with a second port 318, the arrangement may be swapped and the selection signal may be set so that the MUX 315 always outputs data received from the first controller 310 to route it the second port 318. Again, another MUX (not depicted) may be set to route signals from the second controller 312 to the first port 316.

In various embodiments, there may be circumstances where the MUX 315 may not output either input signal. This may occur in a mode of the input/output manager circuit 314 when no devices are coupled with the second port 318. In such a situation, two devices may be coupled with another port (such as the first port 316).

In various embodiments, the MUX 315 may toggle the output from the first controller 310 to the second controller 312. This may occur when two devices are simultaneously coupled with the second port 318, which may be in a fourth mode (MUX Mode) of the input/output manager circuit 314. While in the MUX mode, the output of the MUX may be switched between the controllers in variety of ways. For example, the controllers may request access to the output coupled with the MUX 315. If the bus is available, the requesting controller may be provided access through the MUX 315 (via selection signal 315A). If the bus is unavailable, which may be true if another controller has access, the requesting controller may have to wait until the bus becomes available. When the bus becomes free, the output of the MUX 315 may be toggled to the requesting controller (via selection signal 315A). In various cases, access for any given request may be limited to a limited duration to prevent one controller from monopolizing access to the bus. In various embodiments, bus requests may be arbitrated as disclosed in U.S. Pat. No. 10,983,937, which is incorporated by reference herein.

When two devices are coupled with the second port 318 (for example during a MUX mode) much of the data output by the MUX 315 may be provided via shared pins for both the first device 320 and the second device 322 using shared bussing 321. However, some data may be delivered on individual busses for each device. For this purpose, the second port 318 may have first-device bussing 318A and second-device bussing 318B. This may allow data to be targeted for the intended device and provide the device with means to direct data received on the shared bussing 321.

The controllers may transmit the individual data (data that is not transmitted from the port on a shared pin). The first controller 310 may produce an individual data 310B and the second controller 312 may produce individual data 312B. The individual data from each controller may be provided to the MUX 315 along other data from the respective controller, and depending on the selection signal 315A, may be output from the MUX 315 along with the other data. For example, when the MUX 315 is selected to output data from the first controller 310, the individual data 310B from the first controller 310 may be provided at output 315B of the MUX 315. Data for the shared pins may be provided at output 315D and bussed to the second port 318. When the MUX 315 is selected to output data from second controller 312, individual data 312B may be provided to output 315B of the MUX.

To determine, whether to direct data from output 315B to the first-device bussing 318A or second-device bussing 318B the controllers may provide a direction to the input/output manager circuit 314. As will be appreciated, there are various ways to implement routing directions and this is but one example. This may comprise a direction signal that is also passed on to the MUX 315 from the respective controller. For example, a direction signal 310C may be provided from the first controller 310 and a direction signal 312C may be provided from the second controller 312. Depending on the selection signal 315A, the MUX 315 may provide either the direction signal 310C or the direction signal 312C to output 315C of the MUX 315. The output 315C may then be used as a selection signal for a DEMUX 317. The DEMUX may then output the signal to the desired bussing (first-device bussing 318A or second-device bussing 318B) depending on the selection signal for the DEMUX, which has been determined by the controller that provides the data (via a direction signal) output from the MUX 315 which itself depends on the selection signal 315A.

While such an arrangement provides the advantages of shared bussing, it also opens the door to a possible security risk. For example, the first device 320 may require a higher level of security than the second device 322. A master piece of equipment assigned to the first elementary verification module 306 may meet this higher security level, but not a master piece of equipment assigned to second elementary verification module 308. However, the second controller might direct a task to the first device by using direction signal 312C to misdirect the task to the first device 320 essentially bypassing the protection of the first elementary verification module 306. A malicious application may exploit such a loophole. It, thus, would be advantageous to close this security gap while maintaining the ability to couple more than one device at a single port.

This issue may be relieved by adding an override configuration to the input/output manager circuit 314 for the direction indicators that determine which device receives data among those sharing a port. The override can limit which devices a controller may access. For example, when an override condition is met, the first controller 310 may be limited to providing the individual data 310B only to one of the devices coupled with the second poll 318. An override condition may be met depending on a value or values stored in a control register that is protected by a different elementary verification module 311 so that it may only be set from the trusted domain (such as an authorized user). In various embodiments, this override condition may not be changed in run time by the controllers. As will be appreciated, this may be accomplished in a variety of implementations.

In various embodiments, the SoC may also comprise an alternate function circuit configured to switch the function of a port. For example, in one mode a port may be configured for coupling with serial mass storage devices. In another mode it may be configured for I2C compatibility. In various embodiments, a firewall (for example, an elementary verification module) may be located in front of an alternate function configuration register that is filtering master access may allow access to selected masters. For example, in various embodiments only a master with the highest security may have access. Alternate function signal 324A may be provided to the first port 316 and alternate function signal 324B may be provided to the second port 318. In various embodiments an elementary verification module (not shown in FIG. 27) may be assigned to the alternate function circuit 324 to verify transactions for the alternate function circuit. In various embodiments the alternate function circuit 324 may be embedded in an Input/Output port.

Figure 28:
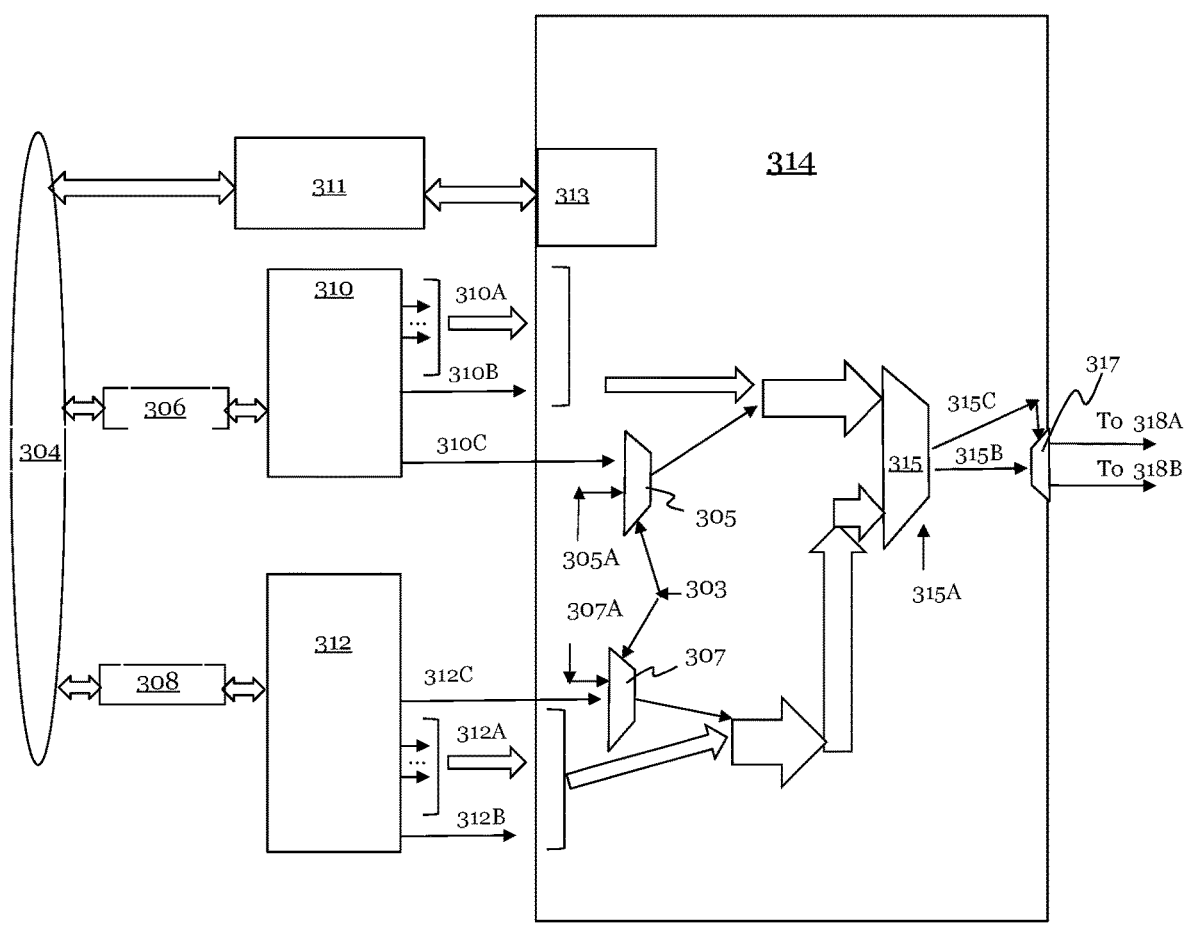
FIG. 28 depicts an input/output manager with an override condition of an embodiment.

FIG. 28 depicts an input/output manager with an override condition of an embodiment.

In various embodiments, the input/output manager circuit 314 may comprise a MUX 305 that receives the direction signal 310C from the first controller 310 and a MUX 307 that receives the direction signal 312C from the second controller 312. The MUX 305 may receive an override-direction signal 305A. The MUX 307 may also receive an override-direction signal 307A. The MUX 305 may receive a selection signal 303. In various embodiments, the MUX 305 and the MUX 307 may receive the same selection signal 303. However, in various embodiments, each may receive an independent signal. Depending on the value of the selection signal, the MUX 305 may output the direction signal 310C or the override-direction signal 305A. And, depending on the value of the selection signal, the MUX 307 may output the direction signal 312C or the override-direction signal 307A. This allows the input/output manager circuit 314 to swap an override direction-signal for the direction signal provided by the controllers. This can prevent the controllers from being able to select which bus (for example, first-device bussing 318A or second-device bussing 318B) carries its individual data. It provides a way to stop a lower-security master from accessing a higher-security device.

The value of the selection signal 303 (or selection signals) may depend on a value stored in the control register 313. The selection signal 303 may thus be provided from the control register 313. Internal bussing between the control register 313 may couple the MUX 305 and MUX 307 with the control register 313. In various embodiments, the MUX 305 may pass input from the first controller 310 unless an override condition is met. When the override condition is met the MUX 305 may pass the override-direction signal 305A. In various embodiments, the MUX 307 may pass input from the first controller 310 unless an override condition is met. When the override condition in met the MUX 307 may pass the override-direction signal 307A.

The override condition may comprise a value stored in the control register 313 in one or memory locations. For example, the override condition may be met when a pre-defined value (an override value) is stored in a location in the control register. In various embodiments, the control register 313 may only be accessible by a chosen master such as the first master manager piece of equipment tasked with implementing the initial assignment diagram. The multiport SoC 302 may comprise an elementary verification module 311 assigned to the input/output manager circuit 314 that limits access to the control register 313 to secure users or applications. This protects the selection signal 303 from manipulation by unauthorized operations. In various embodiments, there may be an independent override condition for each controller (such as first controller 310 and the second controller 312).

Once selected for output from the MUX 305 or MUX 307, the override-direction signal may determine where the individual data 310B and individual data 312B are transmitted as the override direction signals will replace the direction signal 310C and direction signal 312C. The override-direction signals may be selected to fix a controller's access so it only may access the first-device bussing 318A or the second-device bussing 320A once the override condition is met and the override direction signals are output. In various embodiments this may be set by a value (or values) stored in the control register 313. In this way, an authorized user may assign a controller (or controllers) to a desired device when multiple devices are simultaneously coupled with a port. For example, using the override-direction signals 305A and override-direction signal 307A the first controller 310 may be assigned to the first device 320 and the second controller 312 may be assigned to the second device 322 (or vice versa) irrespective of the direction signal 312C and direction signal 310C. As will be appreciated, the modes of the input/output manager circuit 314 may also depend on the values of the control register 313.

As will be appreciated, the number of ports, modes, controllers and configurations for rearranging connections between these components may vary in different cases. For the sake of simplicity FIG. 27 has been depicted with one MUX 315 and one DEMUX 317. However, the input/output manager circuit 314 may include additional MUX and DEMUX circuits. In various embodiments, the input/output manager circuit 314 may include one MUX and DEMUX for each port. Similarly, for simplicity, FIG. 28, only depicts a MUX 305 and a MUX 307. But in various embodiments, additional MUX circuits may be used for overriding signals. For example, in various embodiments, there may be an override MUX for each controller. The input/output manager circuit 314 may also comprise different modes, additional modes, or both linking controllers with different ports that may depend on the number of ports, the number of ports configured to couple with multiple devices, the number of devices coupled with the ports and other factors.

Figure 29:
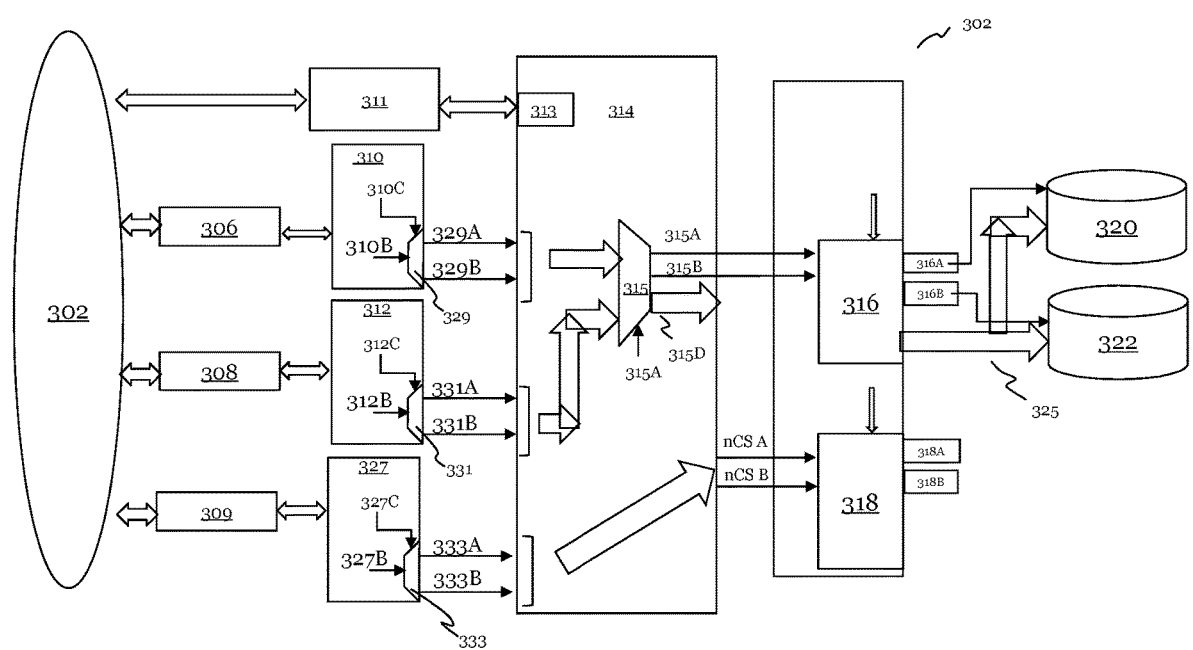
FIG. 29 depicts an input/output manager override configuration of an embodiment.

FIG. 29 depicts an input/output manager override configuration of an embodiment

The multiport SoC 302 of FIG. 29 depicts an implementation of a multiport SoC. To preserve space in FIG. 29, some data signals have been omitted such as data signals 310A and data signal 312A. A data signal 327A from third controller 327 is also omitted.

In addition to the first controller 310 and second controller 312 the multiport SoC 302 of FIG. 29 comprises an additional controller 327 and additional firewall 309. As will be appreciated, FIG. 29 depicts but one additional implementation and the scope of this disclosure should not be construed to be limited to FIG. 29.

Modes of the input/output manager circuit 314 may be configured to route data from the controllers to the ports in any number of modes. In one mode, which may be referred to as a direct mode, data from the first controller 310 may be routed to a single device coupled with the first port 316 and data from the second controller 312 may be routed to a single device coupled with the second port 318. In one mode, which may be referred to as a swap mode, data from the first controller 310 may be routed to a single device coupled with the second port 318 and data from the second controller 312 may be routed to a single device coupled with the first port 316. In one mode, as shown in FIG. 29, data from the first controller 310 and the second controller 312 may be routed to two different devices coupled with the first port 316. Data from the third controller 327 may be routed to a single device coupled to the second port 318. In another mode, data from the first controller 310 and the second controller 312 may be routed to two different devices coupled with the second port 318 and data from the third controller 327 may be routed to a single device coupled to the first port 316. As will be appreciated, additional modes are also possible. And, various embodiments may include more controllers and ports, which further expands the possibilities.

In various embodiments, as depicted in FIG. 29, controllers may output individual data signals on different busses depending on the target destination for the bus. For example, the individual data may be provided by one bus if the data is targeted for a certain device coupled with a given port and provided on another bus if it is targeted for another device. In this way, the controller determines the device direction by selecting which bus upon which to carry the individual data. In various embodiments, the first controller 310 may comprise a DEMUX 329 for determining where the individual data is output. In such embodiments, controllers may comprise a MUX instead of the input/output manager circuit 314 The DEMUX 329 may receive the individual data 310B signal and the direction signal 310C may be provided for selection of the DEMUX 329. The direction signal may be determined from software programming, which may specify which device to couple with the controller. The direction signal may also be determined by the controllers based on addressing data. For example, a given space in memory may correspond to a first device and another space in a memory correspond to another device. The direction signals may depend on the input received from a master assigned to the controller. The input may comprise a software programming by a master to whom access has been granted by an elementary verification module. Depending on the direction signal 310C, the DEMUX 329 may output the individual data 310B at an output 329A or output 329B. Similarly, the second controller 312 may comprise a DEMUX 331. The DEMUX 331 may receive the individual data 312B signal, and the direction signal 312C may be provided for selection of the DEMUX 331. Depending on the direction signal 312C, the DEMUX 331 may output the individual data 312B at an output 331A or output 331B. The third controller 327 may comprise a DEMUX 333. The DEMUX 333 may receive the individual data 327B signal, and the direction signal 327C may be provided for selection of the DEMUX 333. Depending on the direction signal 327C, the DEMUX 333 may output the individual data 327B at an output 333A or output 333B. Note that the controllers may also supply additional data signals that are not depicted in FIG. 29 for clarity and simplicity.

The data from the first controller 310 and the second controller 312 may be provided to the MUX 315. Data signal 310A is omitted in FIG. 29, but it may also be provided to MUX 315 (likewise data signal 312A, although omitted from FIG. 29, may be provided to MUX 315). The selection signal 315A may determine which data is output from by the MUX 315. The output from the DEMUX circuits of the controllers provides a means for the controllers to select the destination of the individual data. For example, depending on the direction signal, the DEMUX will output the individual data on one of the outputs. This choice will carry through to the input/output manager circuit 314 and determine where the individual data is provided.

By way of example, the first controller 310 may output the individual data 310B at the output 329A depending on the direction signal 310C. This will be carried to the MUX 315 and provided to output 315B (assuming selection signal 315A is set for the MUX 315 to output from the first controller 310) and on to a first-device bussing 315A. If the direction signal 310C is set so the DEMUX 329 outputs the individual data 310B from output 329B, it is carried to the MUX 315 and on to a second-device bussing 315B. This gives the first controller 310 ability to control where the individual data 310B is delivered (depending on where it is output from the DEMUX), which creates a risk that a controller misdirects the providing individual data.

The second controller 312 and the third controller 327 may also operate in the same way with the DEMUX 331 and DEMUX 333. The output of the DEMUX 331 may be selected depending on direction signal 312C between output 331A and output 331B. The output of the DEMUX 333 may be selected depending on direction signal 327C to carry individual data 327B between output 333A and output 333B. It should also be noted that FIG. 29 only depicts a single MUX 315 of the input/output manager circuit 314. However, it will be appreciated that the multiport SoC 302 may comprise additional MUX circuits. For example, the output from the third controller 327 may be linked to the second port 318 by way of a MUX that is selected to output only data received from the third controller 327. Such an arrangement may depend on the mode of the multiport SoC 302 (for example, FIG. 29 may depicts a SoC with the first port 316 in a MUX mode and the second port in a mode that directly links the third controller with the second port 318).

As with embodiments consistent with FIG. 27, when more than one device is coupled with a single port, a controller may attempt to inappropriately direct data to one of the devices because the controller may dictate where data is delivered. Different override configurations may be used in different embodiments to prevent potential security breaches.

Figure 30:
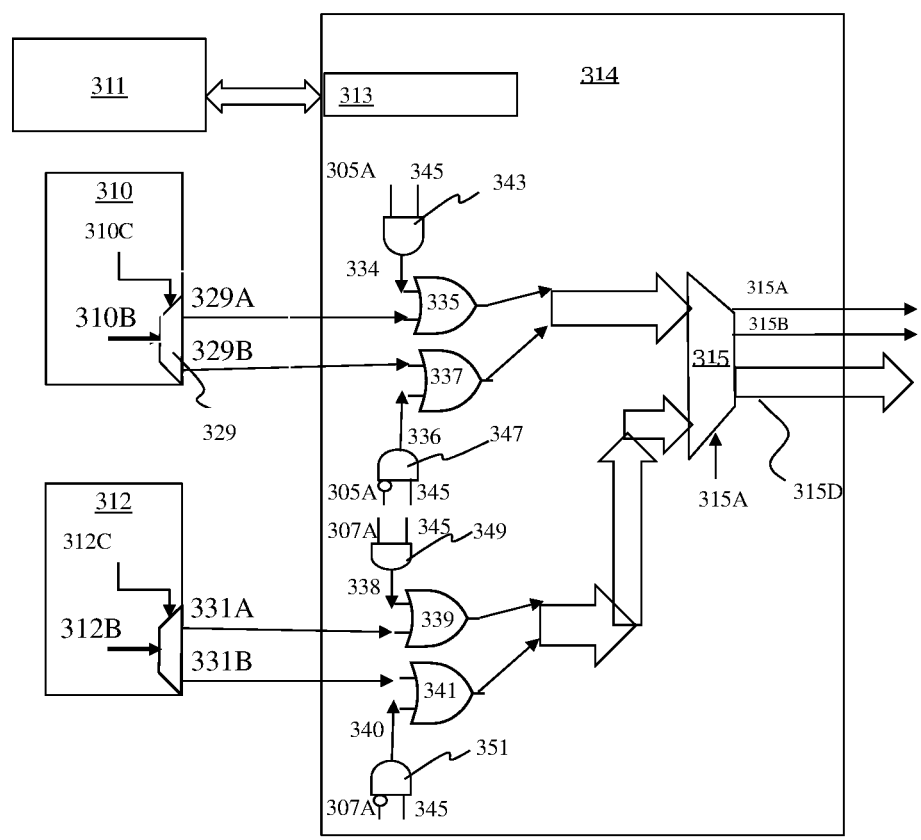

FIG. 30 depicts an input/output manager override configuration of an embodiment.

The input/output manager circuit 14 may comprise logic circuitry to override the routing direction from the controller. The logic used may vary in different embodiments. Different gating arrangements may be utilized depending on whether various signals (such as signals provided to outputs 329A, 329B, etc) are active high or low. The logic circuitry may receive the FIG. 30 depicts but one embodiment.

For example, the input/output manager circuit 314 may comprise an OR gate 335 and an OR gate 337. OR gates may be utilized in various embodiments to blank active low signals. As will be appreciated, AND gates may be used to blank active high signals. The OR gate 335 may receive the output 329A from the DEMUX 329. The OR gate 337 may receive the output 329B from the DEMUX 329. The OR gate 335 may also receive an override signal 334. The override signal 334 may be asserted when an override condition is met and it is desired to block the individual data 310B from reaching the first-device bussing 315A. The active low signal may be blanked by assertion of another signal to the OR gate 335. The override signal 336 for the OR gate 337 may be asserted when an override condition is met and it is desired to block the individual data 310B from reaching the second-device bussing 315B. The OR gate 339 may receive the output 331A from the DEMUX 331. The OR gate 339 may receive the output 331B from the DEMUX 331. The OR gate 339 may also receive an override signal 338. The override signal 338 may be asserted when an override condition is met and it is desired to block the individual data 312B from reaching the first-device bussing 315A. The override signal 340 for the OR gate 341 may be asserted when an override condition is met, and it is desired to block the individual data 312B from reaching the second-device bussing 315B. The override condition, as well as the routing assignments for the controllers may be from values stored in control register 313. As will be appreciated, the input/output manager circuit 314 may comprise additional logic gates for overriding other controllers.

In various embodiments, the input/output manager circuit 314 may also comprise an AND gate 343 that outputs override signal 334. The AND gate 343 may receive an override enable signal 345. The override enable signal 345 may be communicated from the control register 313 by internal bussing. The AND gate 343 may also input the override-direction signal 305a. The input/output manager circuit 314 may also comprise an AND gate 347 that outputs override signal 336. AND gate 347 may receive override enable signal 345 and override-direction signal 305a that is inverted. This may allow the values of the control register 313 to determine which device coupled to a port may be accessible to the first controller 310 after an override is enabled (which also may be determined by the values of the control register).

The input/output manager circuit 314 may also comprise an AND gate 349 that outputs override signal 338 and an AND gate 351 that outputs override signal 340. AND gate 347 may receive override enable signal 345 and override-direction signal 307a while AND gate 349 may receive override enable signal 345 and an override-direction signal 307a that has been inverted. This may allow the values of the control register 313 to determine which device coupled to a port may be accessible to the second controller 312 after an override is enabled (which also may be determined by the values of the control register)

In various embodiments, the access granted to a controller in a MUX mode may be rearranged as operations are performed. This may be accomplished by writing to the control register 313 to change values stored in the control register.

Figure 31:
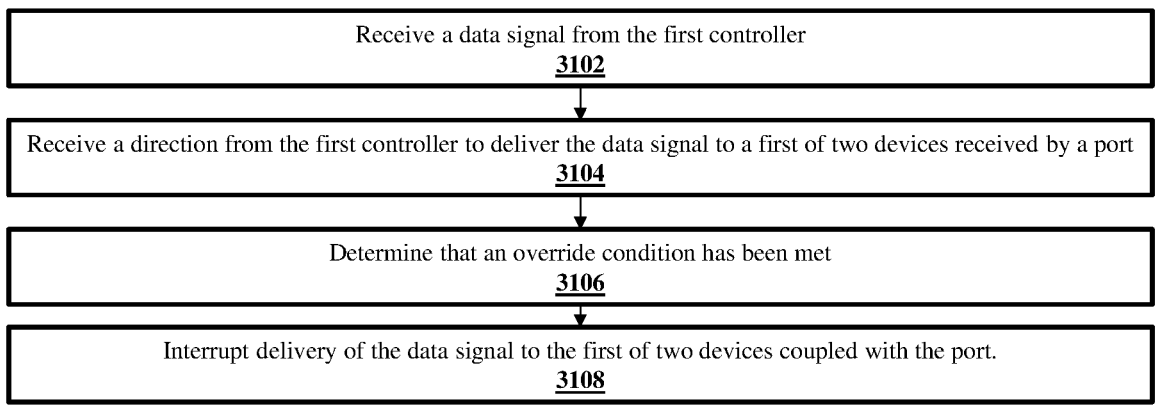
FIG. 31 depicts a flow chart for a method of an embodiment.

FIG. 31 depicts a flowchart for a method of an embodiment.

In various embodiments, a method 3100 to route data received from a first controller may comprise at a step 3102, receiving a data signal from the first controller; at a step 3104, receiving a direction from the first controller to deliver the data signal to a first of two devices coupled with a port; at a step, 3106 determining that an override condition has been met; and at a step 3108, interrupting delivery of the data signal to the first of two devices coupled with the port.

In various embodiments, the method 3100 may further comprise, wherein the override condition comprises storing an override value in a control register.

In various embodiments, the method 3100 may further comprise receiving the direction from the first controller at a first input for a MUX and receiving an override direction at a second input for the MUX.

In various embodiments, the method 300 may further comprise, wherein routing the data signal to the second of two devices comprises providing the second input of the MUX to an output of the MUX.

In various embodiments, the method 300 may further comprise wherein interrupting delivery of the data signal to the first of two devices coupled with the port comprises blanking the data signal with an OR gate.

It should be appreciated that once access to a device has been established, data may also be transmitted to and from a device to the multiport SoC 302. In other words, the input/output manager circuit 314 may be used as described in this disclosure to block requests for access to a device from a potentially unsecure master whether that access is being sought to deliver data to the device or take data from the device.

In various embodiments, the mode of the input/output manager circuit 314 may be switched during a boot sequence. For example, the mode may begin in a direct mode (such as depicted in FIG. 25), then proceed to a swap mode (such as depicted in FIG. 26), then to a MUX mode. Switching between modes may be accomplished by writing to the control register 313.

Figure 32:
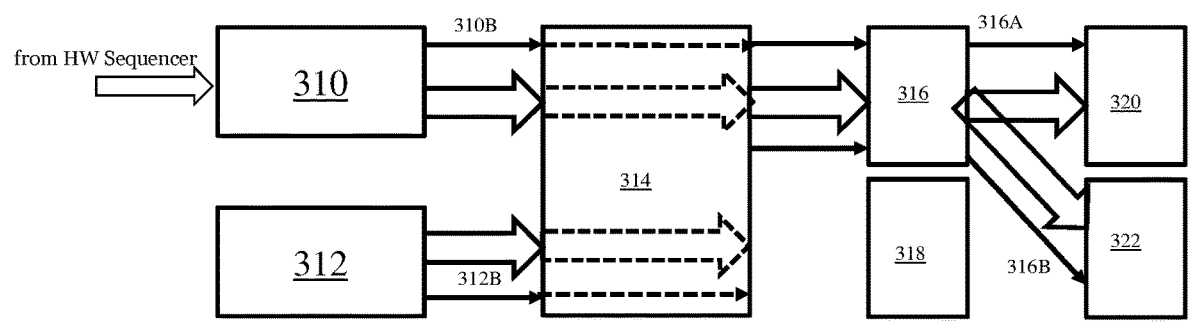
FIG. 32 illustrates a first part of a sequence of a multiport SoC in accordance with an embodiment.

FIG. 32 illustrates a first part of a sequence of a multiport SoC in accordance with an embodiment.

During the first step of the boot sequence, the boot may be performed from a hardware sequencer such as a hardware state machine or ROM code. The hardware sequencer may be provided access to first port 316 through first controller 310. The input/output manager circuit 314 may be in a direct mode where the first controller 310 has access to the first port 316 and first device 320, which in this case may comprise a first boot device. A first master manager piece of equipment may control the configuration of the mode of the input/output manager circuit 314 (by writing to control register 313) during execution of the boot sequence. During execution of the hardware sequencer, there is no concurrent access to the first port 316. The hardware sequencer may load, authenticate, and decrypt in internal RAM a first firmware (First Stage Boot Loader).

Figure 33:
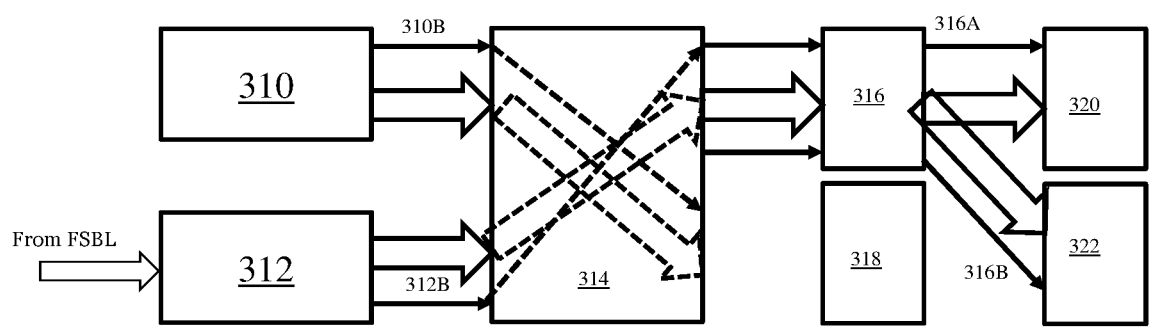
FIG. 33 illustrates a second part of a sequence of a multiport SoC in accordance with an embodiment.

FIG. 33 illustrates a second part of a sequence of a multiport SoC in accordance with an embodiment.

Once transitioned to a second step for the boot process, master CPU running a First Stage Bootloader ("FSBL") with access to second controller 312. As will be appreciated, the master CPU may comprise the first master manager and may have access to control register 313. The input/output manager circuit 314 may be switched a swap mode to allow the second controller 312 to access the first port 316. The first master manager may control the mode of the input/output manager circuit 314 by writing to control register 313. For some Firmware Over the Air ("FOTA"), the FSBL may be considered immutable so it may be beneficial for it to own only configurations that it needs to realize its role (load/authenticate application). Being run on the first master manager, the FSBL may, itself, configure the mode of the mode input/output manager circuit 314 to be in the swap mode by writing control register 313. Again, at this stage the FSBL may have access to the first port 316 alone so there may not be an override consideration.

Figure 34:
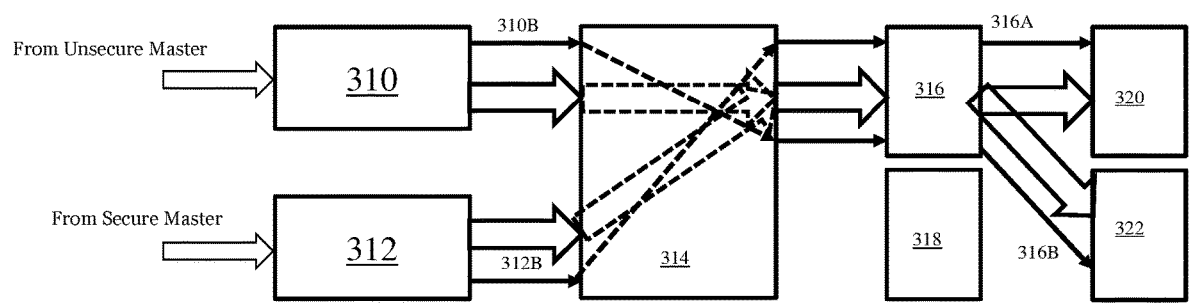
FIG. 34 illustrates a third part of a sequence of a multiport SoC in accordance with an embodiment.

FIG. 34 illustrates a third part of a sequence of a multiport SoC in accordance with an embodiment.

However, additional application may begin to be executed. These may on the directive of another master. For example, the second controller 312 may continue under the direction of a secure master (such as the first master manager) for the first device 320. A second unsecure (or less secure) master may be assigned the first controller 310 for accessing a second device 322 simultaneously coupled with the first port 316. Again, assignments may be determined based on the configuration diagram, which itself may be controlled by the first master manager piece of equipment. The input/output manager circuit 314 may be configured to be in the MUX mode with desired override configurations to prevent the unsecure master from accessing the first device.

Example 1. A system on a chip, including several master pieces of equipment, several slave resources, an interconnection circuit (INTC) coupled between the master pieces of equipment and the slave resources and capable of routing transactions between master pieces of equipment and slave resources, and processing means (MT) at least configured to allow a user of the system on a chip to implement within the system on a chip (MCU) at least one configuration diagram (SCH) of this system defined by a set of configuration pieces of information including at least one piece of identification information (CID) assigned to each master piece of equipment, these identification pieces of information being intended to be attached to all the transactions (TR) emitted by the corresponding master pieces of equipment, the set of these configuration pieces of information not being used for addressing the slave resources receiving said transactions and being used to define an assignment of at least one piece of master equipment to at least some of the slave resources.

Example 2. The system on a chip according to example 1, where a slave resource belongs to the group formed at least by a peripheral (PH3), a feature (PH60) of a peripheral (PH6), a memory means (IMM1) internal to the system on a chip, a memory interface (INTM2) internal to the system on a chip and intended to be coupled to a memory means (EXMM) external to the system on a chip.

Example 3. The system on a chip according to one of the preceding examples, where at least one piece of master equipment (CPU1) includes a microprocessor.

Example 4. The system on a chip according to example 3, where the master pieces of equipment include microprocessors (CPU1, CPU2) and master pieces of equipment controllable by these microprocessors, and at least some of the master pieces of equipment controllable by a microprocessor are assigned the same identification piece of information (CID) as the identification piece of information (CID) of the microprocessor.

Example 5. The system on a chip according to example 4, where at least one piece of master equipment controllable by a microprocessor (CPU1) is assigned an identification piece of information (CID) different from the identification piece of information (CID) of said microprocessor.

Example 6. The system on a chip according to one of examples 4 or 5 as combined with example 2, where at least one piece of master equipment (LMk) controllable by a microprocessor includes an output port (PS) capable of emitting transactions as well as an input port (PE) capable of receiving transactions, said input port being considered as a slave resource and the output port as a master piece of equipment.

Example 7. The system on a chip according to one of the preceding examples, where the processing means (MT) are configured to allow a user of the system on a chip to implement within the system on a chip an initial configuration diagram (SCHI) forming said configuration diagram (SCH).

Example 8. The system on a chip according to one of examples 1 to 6, where the processing means (MT) are configured to allow a user of the system on a chip to implement within the system on a chip an initial configuration diagram (SCHI) having an initial set of configuration pieces of information and to modify the value of at least one piece of configuration information of this initial set so as to obtain said set of configuration pieces of information defining said configuration diagram (SCH).

Example 9. The system on a chip, according to one of examples 7 or 8, where the processing means (MT) include configuration means configured to allow a user of the system on a chip to define said initial configuration diagram and allocation means configured to implement the initial configuration diagram.

Example 10. The system on a chip according to one of the preceding examples as combined with one of examples 7 or 8, where the processing means (MT) include installation means including, from the master pieces of equipment, a first master piece of equipment called master manager piece of equipment (EMG), this first master manager piece of equipment being configured, in response to a first boot of the system on a chip, to perform a boot phase at the end of which this first master manager piece of equipment is configured to at least allow the implementation of said initial configuration diagram.

Example 11. The system on a chip according to example 10, where the designation of the first master manager piece of equipment (EMG) is fixed during the production of the system on a chip.

Example 12. The system on a chip according to example 10, where the installation means include a programmable designation register (RDS) allowing to designate the first master manager piece of equipment.

Example 13. The system on a chip according to example 10, where the installation means are further configured to temporarily make all the other master pieces of equipment inoperative as long as the first master manager piece of equipment (EMG) has not completed its boot phase.

Example 14. The system on a chip according to example 10, where the installation means further include a boot memory (BMM) configured to store a boot program (BPR) executable only by the first master manager piece of equipment (EMG) during said first boot of the system on a chip.

Example 15. The system on a chip according to examples 9 and 14, where the configuration means include an input (INP) configured to receive a user program (UPR) containing at least instructions representative of said initial configuration diagram and a program memory intended for storing the user program, and the allocation means include said first master manager piece of equipment configured, at the end of its boot phase, to execute said user program in order to implement said initial configuration diagram.

Example 16. The system on a chip according to example 10, where the first master manager piece of equipment (EMG) includes a microprocessor.

Example 17. The system on a chip according to example 10, where the first master manager piece of equipment (EMG) includes a hardware logic circuit.

Example 18. The system on a chip according to example 10, where the installation means include, from the master pieces of equipment, a master piece of equipment called the initial master manager piece of equipment (CPU1), configured, during the first boot of the system on a chip, to perform a boot phase at the end of which it is configured to authorize a boot of another master piece of equipment (CPU2) designated as a new master manager piece of equipment and forming said first master manager piece of equipment configured, at the end of its boot phase, to at least allow the implementation of said initial configuration diagram.

Example 19. The system on a chip according to example 18, where the initial master manager piece of equipment includes a microprocessor (CPU1) and the new master manager piece of equipment includes another microprocessor (CPU2).

Example 20. The system on a chip according to example 18, where the initial master manager piece of equipment includes a hardware logic circuit and the new master manager piece of equipment includes a microprocessor (CPU2).

Example 21. The system on a chip according to example 18, where the installation means are further configured to temporarily make all the other master pieces of equipment inoperative as long as the boot phase of the initial master manager piece of equipment (CPU1) and that of the new master manager piece of equipment (CPU2) are not completed.

Example 22. The system on a chip according to example 18, where the installation means further include a boot memory (BMM) configured to store a boot program executable only by the initial master manager piece of equipment (CPU1) during said first boot and a program memory (PMM) configured to store the boot program (BPR2) of the new master manager piece of equipment.

Example 23. The system on a chip according to examples 9 and 22, where the configuration means include an input (INP) configured to receive a user program containing at least instructions representative of said initial configuration diagram, said program memory also being intended for storing the user program, and the allocation means include said first master manager piece of equipment configured, at the end of its boot phase, to execute said user program in order to implement said initial configuration diagram.

Example 24. The system according to example 10, where the first master manager piece of equipment (CPU1) is further configured, after having allowed the initial assignment diagram to be implemented, to designate, during the execution of a user program by the processing means, a second master piece of equipment (CPU2) as new master manager piece of equipment, the first master piece of equipment then being configured to lose its quality as master manager piece of equipment.

Example 25. The system according to example 24, where any new master manager piece of equipment (CPU2) is in turn configured to designate a new master manager piece of equipment (CPU1) and then lose its quality as master manager piece of equipment.

Example 26. The system on a chip according to example 1, where the set of configuration pieces of information of the configuration diagram further includes, for at least one slave resource, an inaccessibility piece of information (INAC) intended to indicate that this slave resource is inaccessible by any master piece of equipment.

Example 27. The system on a chip according to example 1, where the set of configuration pieces of information defining the configuration diagram further includes for each non-inaccessible slave resource, a filtering piece of information (IFLT) intended to indicate whether this slave resource can be accessed by any master piece of equipment or by only one or more master pieces of equipment.

Example 28. The system on a chip according to example 27, where the set of configuration pieces of information defining the configuration diagram further includes for each non-inaccessible slave resource, —a first access piece of information (IACs) intended to indicate, in the case where the filtering piece of information indicates that the slave resource can be accessed by only one or more master pieces of equipment, that this slave resource can be accessed by one or more master pieces of equipment having the same identification piece of information, and—the corresponding identification piece of information (CID).

Example 29. The system on a chip according to example 27, where the set of configuration pieces of information defining the configuration diagram further includes for each non-inaccessible slave resource, —a second access piece of information (IAC2) intended to indicate, in the case where the filtering piece of information indicates that the slave resource can be accessed by only one or more master pieces of equipment, that this slave resource can be accessed by master pieces of equipment having different identification pieces of information, and—the list (CID1 . . . CID4) of identification pieces of information of the corresponding master pieces of equipment.

Example 30. The system on a chip according to example 29, where the set of configuration pieces of information defining the configuration diagram further includes for at least one of the slave resources that can be accessed by the master pieces of equipment of said list, a third piece of information (IAC3) intended to indicate the at least one of said slave resources can only be accessed by one master piece of equipment at a time, the master piece of equipment wishing to access this slave resource being configured to use a semaphore.

Example 31. The system on a chip according to example 1, where the set of configuration pieces of information defining the configuration diagram further includes for each non-inaccessible slave resource, a security piece of information (ISEC) intended to indicate whether this slave resource is accessible by a master piece of equipment in secure mode or not.

Example 32. The system on a chip according to example 1, where the set of configuration pieces of information defining the configuration diagram further includes, for each non-inaccessible slave resource, a privileged piece of information (IPRV) intended to indicate whether this slave resource is accessible by a master piece of equipment in privileged mode or not.

Example 33. The system on a chip according to example 1, where the set of configuration pieces of information defining the configuration diagram further includes for each master piece of equipment, in addition to its identification piece of information (CID), a security piece of information (SEC) intended to indicate whether this master piece of equipment is configured in secure mode or not.

Example 34. The system on a chip according to example 1, where the set of configuration pieces of information defining the configuration diagram further includes for each master piece of equipment, in addition to its identification piece of information, a privileged piece of information (PRV) intended to indicate whether this master piece of equipment is configured in privileged mode or not.

Example 35. The system on a chip according to examples 10, 33 and 34, where the first master manager piece of equipment (EMG) is configured to be in secure mode and in privileged mode at the end of its boot phase.

Example 36. The system on a chip according to example 1, where the set of configuration pieces of information defining the configuration diagram further includes, for at least some of the slave resources and at least some of the master pieces of equipment, a locking piece of information (LKM, LKS) intended to indicate whether their configuration pieces of information can be modified or not.

Example 37. The system on a chip according to examples 9 and 10, where the allocation means include, in addition to the first master manager piece of equipment (EMG), —a set of configuration registers assigned to each slave resource and to each master piece of equipment, and—a configuration controller (RIFC) configured to update the contents of the sets of configuration registers with said set of configuration pieces of information under the control of the first master manager piece of equipment.

Example 38. The system on a chip according to example 37, where a set of configuration registers assigned to a slave resource is intended to store the various configuration pieces of information defined in examples 26 to 32 and 36 and assigned to this slave resource and a set of configuration registers assigned to each master piece of equipment is intended to store the identification piece of information assigned to this master piece of equipment and the configuration pieces of information assigned to this master piece of equipment defined in examples 33, 34 and 36.

Example 39. The system on a chip according to example 8, where the processing means (MT) are configured to execute a user program to modify the initial configuration diagram after its implementation and to implement said configuration diagram accordingly and possibly modify again any old configuration diagram.

Example 40. The system on a chip according to examples 10 and 39, where only the master piece of equipment which has the quality of master manager piece of equipment is configured to modify a configuration diagram (SCH).

Example 41. The system on a chip according to examples 38 and 40, where in order to modify a configuration diagram, the master manager piece of equipment is configured to control the configuration controller (RIFC) so that it updates the contents of the configuration registers with the set of configuration pieces of information defining the new configuration diagram to be implemented.

Example 42. The system on a chip according to example 1, where each transaction (TR) emitted by a master piece of equipment includes an addressing field (ADR) whose content is intended to address the slave resource receiving this transaction, and the content of the addressing field does not belong to said set of configuration pieces of information.

Example 43. The system on a chip according to example 1, where each transaction (TR) emitted by a master piece of equipment includes an addressing field whose content is intended to address the slave resource receiving this transaction, and the processing means (MT) further include addition means configured to add to each transaction emitted by a master piece of equipment, at least the identification piece of information (CID) of this master piece of equipment, said identification piece of information not belonging to the addressing field of the transaction.

Example 44. The system on a chip according to examples 34 and 43, where the addition means are further configured to add to each transaction emitted by a master piece of equipment, the security piece of information (SEC) and/or the privileged piece of information (PRV) if these two pieces of information do not already appear in the transaction emitted by the master piece of equipment.

Example 45. The system on a chip according to example 43, where the addition means include for each master piece of equipment, an elementary management unit (RIMUi) configured to access the identification piece of information assigned to this master piece of equipment and optionally the security piece of information and/or the privileged piece of information, and to add to any transaction emitted by the master piece of equipment, this identification piece of information and optionally the security piece of information and/or the privileged piece of information.

Example 46. The system on a chip according to examples 38 and 45, where each elementary management unit (RIMUi) assigned to a master piece of equipment is connected by a dedicated link (LDMi) at least to the set of configuration registers (RGCMi) assigned to this master piece of equipment.

Example 47. The system on a chip according to example 1, where at least one piece of configuration information is intended to be attached to each transaction, and the processing means (MT) include verification means configured to verify whether a transaction emanating from a master piece of equipment and intended for a slave resource is authorized to access this slave resource, using said at least one piece of configuration information attached to said transaction.

Example 48. The system on a chip according to example 47, where the verification means are configured to verify whether a transaction emanating from a master piece of equipment and intended for a slave resource is authorized to access this slave resource, using at least said identification piece of information (CID) attached to said transaction.

Example 49. The system on a chip according to examples 33 and 47, where the verification means are configured to verify whether a transaction emanating from a master piece of equipment and intended for a slave resource is authorized to access this slave resource, using at least said security piece of information (SEC) and said privileged piece of information (PRV) attached to said transaction.

Example 50. The system on a chip according to examples 24 and 47, where the verification means are configured to verify whether a transaction emanating from a master piece of equipment and intended for a slave resource is authorized to access this slave resource, using the configuration piece(s) of information attached to said transaction (TR) as well as the other configuration pieces of information of the set of configuration pieces of information assigned to this slave resource.

Example 51. The system on a chip according to example 47, where the verification means are configured to perform said verification downstream of the interconnection circuit (INTC).

Example 52. The system on a chip according to example 47, where the verification means include for each slave resource, an elementary verification module (RISUi) configured to access the set of configuration pieces of information assigned to this slave resource.

Example 53. The system on a chip according to examples 37 and 52, where each elementary verification module (RISUi) assigned to a slave resource is connected by a dedicated link (LDSi) to the set of configuration registers (RGCSi) assigned to this slave resource.

Example 54. The system on a chip according to example 52, where the processing means include a manager register (RGG) intended to contain the identification piece of information of the current master manager piece of equipment, and an auxiliary verification module (RISUC) assigned to said controller and configured to prohibit access to said controller to any master piece of equipment having an identification piece of information different from that contained in said manager register.

Example 55. The system on a chip according to examples 10 and 47, where the verification means are further configured, in the event that a read transaction emitted by a master piece of equipment and intended for a slave resource is not authorized to access this slave resource, to return to the master piece of equipment an indication of access denial (IR) and return to the master manager piece of equipment, an illegal access notification (NIAC) containing an identifier of this slave resource, an indication of the type of access and the identification piece of information of the master piece of equipment at the origin of this denied transaction.

Example 56. The system on a chip according to examples 10 and 47, where the verification means are further configured, in the event that a write transaction emitted by a master piece of equipment and intended for a slave resource is not authorized to access this slave resource, to ignore this transaction and to return to the master manager piece of equipment, an illegal access notification (NIAC) containing an identifier of this slave resource, an indication of the type of access and the identification piece of information of the master piece of equipment at the origin of this denied transaction.

Example 57. The system on a chip according to example 1, including among the master pieces of equipment at least one piece of master equipment having a slave port and a master port, configuration pieces of information being assigned to the slave port and configuration pieces of information being assigned to the master port, and where the processing means include inheritance means (MINH) configured, upon control and by taking into account inheritance rules, to replace at least some of the configuration pieces of information assigned to the master port with the homologous configuration pieces of information assigned to the slave port or else to keep the configuration pieces of information assigned to the master poll.

Example 58. The system on a chip according to examples 37, 45 and 57, where the inheritance means (MINH) include—within the elementary management unit (RIMUk) assigned to the master port, a set of controllable switches connected to at least some of the configuration registers assigned to the slave port and to the homologous configuration registers assigned to the master port, and—control means (MCM) configured to control the set of switches so as to select either the corresponding configuration registers assigned to the master port or the corresponding configuration registers assigned to the slave port.

Example 59. The system on a chip according to example 1, including—from the master pieces of equipment, several microprocessors, —from the slave resources at least one slave resource configured to generate at least one interrupt signal intended for one of the microprocessors which is assigned to this slave resource, —several interrupt wires respectively connected to the microprocessors and to said at least one slave resource and capable of conveying interrupt signals, and—system on a chip where the processing means include interrupt filtering means (MFIRQ) configured to route the interrupt signal emitted by said slave resource only on the interrupt wire connected to the microprocessor which is assigned thereto.

Example 60. The system on a chip according to examples 52 and 59, where the interrupt filtering means (MFIRQ) are incorporated at least in part into the elementary verification module (RISU5) assigned to said slave resource.

Example 61. The system on a chip according to example 60, where the interrupt filtering means (MFIRQ) include—in the elementary verification module, several controllable switches connected between the output of the slave resource configured to provide the interrupt signal and respectively the interrupt wires connected to the microprocessors, and—control means configured to close the switch connected between said output and the interrupt wire connected to the microprocessor assigned to said slave resource, and to open the other switch/switches.

Example 62. The system on a chip according to example 1, including—from the master pieces of equipment a first microprocessor configured to boot during a first boot of the system on a chip so as to allow the implementation of the configuration diagram, and a second master piece of equipment, for example a second microprocessor, and—restore means (MRST) configured to allow the second master piece of equipment to restore the configuration diagram instead of the first microprocessor in the event of an exit from a standby mode of the system on a chip.

Example 63. The system on a chip according to examples 10 and 62, where the first microprocessor is configured as master manager piece of equipment before entering the standby mode, and the restore means (MRST) include—a first backup memory intended to back up the configuration diagram to be restored, —a second program memory configured to store, upon control of the first microprocessor, a restore program executable by the second master piece of equipment, —a secure storage means configured to store a signature of said restore program as well as the start address of the restore program in said second program memory, —a wake-up source intended to generate a wake-up signal to the second master piece of equipment when the system on a chip exits from the standby mode, and—a state machine (STM) configured, in the presence of said wake-up signal, to keep the first microprocessor in standby state, verify said signature, and in the event of successful verification, temporarily confer to the second master piece of equipment the quality of master manager piece of equipment and authorize the execution of the restore program by the second master piece of equipment, then when the restoration is complete, withdraw the quality of master manager piece of equipment from the second master piece of equipment, allow the first microprocessor to exit the standby mode, and return to the first microprocessor its quality of master manager piece of equipment.

Example 64. The system on a chip according to example 49, including from the master pieces of equipment a test access port (DAP), intended to be coupled to an external debugging tool, this test access port being assigned to a test identification piece of information (Debug_CID), and any slave resource is configured to accept receiving a transaction including this test identification piece of information, after verifying said security piece of information (SEC) and said privileged piece of information (PRV) attached to said transaction.

Example 65. The system on a chip according to examples 10 and 64, where only the master manager piece of equipment is configured to assign the test identification piece of information only to the test access port (DAP).

Example 66. The system on a chip according to example 1, forming a microcontroller (MCU) or a microprocessor.

Example 67. A method for managing the operation of a system on a chip, the system on a chip including several master pieces of equipment, several slave resources, an interconnection circuit coupled between the master pieces of equipment and the slave resources and capable of routing transactions between master pieces of equipment and slave resources, the method including—a configuration phase (PHCFG) including defining at least one configuration diagram by a set of configuration pieces of information including at least one piece of identification information (CID) assigned to each master piece of equipment, this set of configuration pieces of information allowing to define an assignment of at least one piece of master equipment to at least some of the slave resources, and implementing within the system on a chip said at least one configuration diagram, and—an operating phase (PHF) including adding at least These identification pieces of information to all the transactions emitted by the corresponding master pieces of equipment, and addressing the slave resources without using the set of these configuration pieces of information.

Example 68. The method according to example 67, where a slave resource belongs to the group formed at least of a peripheral (PH3), a feature (PH60, PH61) of a peripheral (PH6), a memory means internal to the system on a chip, a memory interface internal to the system on a chip and intended to be coupled to a memory means external to the system on a chip.

Example 69. The method according to one of examples 67 or 68, where at least one piece of master equipment includes a microprocessor (CPU1).

Example 70. The method according to example 69, where, the master pieces of equipment including microprocessors and master pieces of equipment controllable by these microprocessors, at least some master pieces of equipment controllable by a microprocessor are assigned the same identification piece of information as the identification piece of information (CID) of the microprocessor.

Example 71. The method according to example 70, where at least one piece of master equipment controllable by a microprocessor is assigned an identification piece of information different from the identification piece of information (CID) of said microprocessor.

Example 72. The method according to example 70 or 71 as combined with example 68, where at least one piece of master equipment controllable by a microprocessor includes an output port (PS) capable of emitting transactions as well as an input port (PE) capable of receiving transactions, and said input port is considered as a slave resource and the output port as a master piece of equipment.

Example 73. The method according to one of examples 67 to 72, where said configuration phase (PHCFG) includes implementing within the system on a chip an initial configuration diagram forming said configuration diagram.

Example 74. The method according to one of examples 67 to 72, where said configuration phase (PHCFG) includes implementing within the system on a chip an initial configuration diagram having an initial set of configuration pieces of information, and the method includes modifying the value of at least one piece of configuration information of this initial set so as to obtain said set of configuration pieces of information defining said configuration diagram.

Example 75. The method according to one of examples 73 or 74, where the configuration phase (PHCFG) includes designating from the master pieces of equipment, a first master piece of equipment called master manager piece of equipment, this first master manager piece of equipment performing, in response to a first boot of the system on a chip, a boot phase at the end of which this first master manager piece of equipment authorizes the implementation of said initial configuration diagram.

Example 76. The method according to example 75, where the designation of the first master manager piece of equipment (CPU1) is fixed and results from the production of the system on a chip.

Example 77. The method according to example 75, where the designation of the first master manager piece of equipment (CPU1) is programmable.

Example 78. The method according to one of examples 75 to 77, where all the other master pieces of equipment are temporarily made inoperative as long as the first master manager piece of equipment (EMG) has not completed its boot phase.

Example 79. The method according to one of examples 75 to 78, where the configuration phase (PHCFG) includes storing a boot program executable only by the first master manager piece of equipment during said first boot of the system on a chip.

Example 80. The method according to example 79, where the configuration phase (PHCFG) includes receiving a user program containing at least instructions representative of said initial configuration diagram, storing the user program, said first master manager piece of equipment executing, at the end of its boot phase, said user program in order to implement said initial configuration diagram.

Example 81. The method according to example 75, where the configuration phase (PHCFG) includes a designation from the master pieces of equipment, of a master piece of equipment called initial master manager piece of equipment, performing, during the first boot of the system on a chip, a boot phase at the end of which it authorizes a boot of another master piece of equipment designated as a new master manager piece of equipment and forming said first master manager piece of equipment allowing at least, at the end of its boot phase, at least the implementation of said initial configuration diagram.

Example 82. The method according to example 81, where all the other master pieces of equipment are temporarily made inoperative as long as the boot phase of the initial master manager piece of equipment (CPU1) and that of the new master manager piece of equipment (CPU2) are not completed.

Example 83. The method according to one of examples 81 or 82, where the configuration phase (PHCFG) includes storing a boot program executable only by the initial master manager piece of equipment during said first boot of the system on a chip and storing the boot program of the new master manager piece of equipment.

Example 84. The method according to example 83, where the configuration phase (PHCFG) includes receiving a user program containing at least instructions representative of said initial configuration diagram, storing the user program, said first master manager piece of equipment executing, at the end of its boot phase, said user program in order to implement said initial configuration diagram.

Example 85. The method according to one of examples 75 to 84, where the operating phase (PHF) includes a designation by the first master manager piece of equipment designates, after it has allowed implementing the initial assignment diagram, of a second master piece of equipment as new master manager piece of equipment, the first master piece of equipment then losing its quality as master manager piece of equipment.

Example 86. The method according to example 85, where during the operating phase (PHF) any new master manager piece of equipment in turn designates a new master manager piece of equipment and then loses its quality as master manager piece of equipment.

Example 87. The method according to example 67, where the set of configuration pieces of information of the configuration diagram further includes, for at least one slave resource, an inaccessibility piece of information (INAC) indicating whether this slave resource is inaccessible by any master piece of equipment or not.

Example 88. The method according to one of examples 67 to 87, where the set of configuration pieces of information defining the configuration diagram further includes for each non-inaccessible slave resource, a filtering piece of information (IFLT) indicating whether this slave resource can be accessed by any master piece of equipment or by only one or more master pieces of equipment.

Example 89. The method according to example 88, where the set of configuration pieces of information defining the configuration diagram further includes for each non-inaccessible slave resource, —a first access piece of information (IACs) indicating, in the case where the filtering piece of information indicates that the slave resource can be accessed by only one or more master pieces of equipment, that this slave resource can be accessed by one or more master pieces of equipment having the same identification piece of information, and—the corresponding identification piece of information.

Example 90. The method according to example 88, where the set of configuration pieces of information defining the configuration diagram further includes for each non-inaccessible slave resource, —a second access piece of information (IAC2) indicating, in the case where the filtering piece of information indicates that the slave resource can be accessed by only one or more master pieces of equipment, that this slave resource can be accessed by master pieces of equipment having different identification pieces of information, and—the list of identification pieces of information of the corresponding master pieces of equipment.

Example 91. The method according to example 90, where the set of configuration pieces of information defining the configuration diagram further includes for at least one of the slave resources that can be accessed by the master pieces of equipment of said list, a third piece of information (IAC3) indicating that at least one of said slave resources can only be accessed by one master piece of equipment at a time, the master piece of equipment wishing to access this slave resource during the operating phase using a semaphore (SMP).

Example 92. The method according to one of examples 67 to 91, where the set of configuration pieces of information defining the configuration diagram further includes for each non-inaccessible slave resource, a security piece of information (ISEC) indicating whether this slave resource is accessible by a master piece of equipment in secure mode or not.

Example 93. The method according to one of examples 67 to 92, where the set of configuration pieces of information defining the configuration diagram further includes for each non-inaccessible slave resource, a privileged piece of information (IPRV) indicating whether this slave resource is accessible by a master piece of equipment in privileged mode or not.

Example 94. The method according to one of examples 67 to 93, where the set of configuration pieces of information defining the configuration diagram further includes for each master piece of equipment, in addition to its identification piece of information, a security piece of information (SEC)

indicating whether this master piece of equipment is configured in secure mode or not.

Example 95. The method according to one of examples 67 to 94, where the set of configuration pieces of information defining the configuration diagram further includes for each master piece of equipment, in addition to its identification piece of information, a privileged piece of information (PRV) indicating whether this master piece of equipment is configured in privileged mode or not.

Example 96. The method according to examples 75, 94 and 95, including a configuration of the first master manager piece of equipment (CPU1) in secure mode and in privileged mode at the end of its boot phase.

Example 97. The method according to one of examples 67 to 96, where the set of configuration pieces of information defining the configuration diagram further includes, for at least some of the slave resources and at least some of the master pieces of equipment, a locking piece of information (LKM, LKS) indicating whether their configuration pieces of information can be modified or not.

Example 98. The method according to one of examples 67 to 97 as combined with example 75, including updating the configuration pieces of information assigned to each slave resource and to each master piece of equipment, under the control of the first master manager piece of equipment (EMG).

Example 99. The method according to one of examples 67 to 98 as combined with example 74, where the operating phase (PHF) includes executing a user program to modify the initial configuration diagram after its implementation and to implement said configuration diagram accordingly and possibly modify again any old configuration diagram.

Example 100. The method according to example 99 as combined with one of examples 75 to 82, where only the master piece of equipment which has the quality of master manager piece of equipment (EMG) is authorized to modify a configuration diagram.

Example 101. The method according to one of examples 67 to 100, where each transaction (TR) emitted by a master piece of equipment includes an addressing field whose content addresses the slave resource receiving this transaction, and the content of the addressing field does not belong to said set of configuration pieces of information.

Example 102. The method according to one of examples 67 to 100, where each transaction (TR) emitted by a master piece of equipment includes an addressing field whose content addresses the slave resource receiving this transaction, and the operating phase includes adding to each transaction emitted by a master piece of equipment, at least the identification piece of information of this master piece of equipment, said identification piece of information not belonging to the addressing field of the transaction.

Example 103. The method according to example 102 as combined with example 94 or 95, where the operating phase (PHF) includes adding to each transaction emitted by a master piece of equipment, the security piece of information and/or the privileged piece of information if these two pieces of information or one of these two pieces of information do not already appear in the transaction emitted by the master piece of equipment.

Example 104. The method according to one of examples 67 to 103, where at least one piece of configuration information is attached to each transaction, and the operating phase (PHF) includes verifying whether a transaction emanating from a master piece of equipment and intended for a slave resource is authorized to access this slave resource, said verification including using said at least one piece of configuration information attached to said transaction.

Example 105. The method according to example 104, where said verification includes using at least said identification piece of information (CID) attached to said transaction.

Example 106. The method according to example 104 or 105 as combined with examples 94 and 95, where said verification includes using at least said security piece of information (SEC) and said privileged piece of information (PRV) attached to said transaction.

Example 107. The method according to one of examples 104 to 106 as combined with examples 87 to 93 and 97, where said verification includes using the configuration piece(s) of information attached to said transaction (TR) as well as other configuration pieces of information of the set of configuration pieces of information assigned to this slave resource.

Example 108. The method according to one of examples 104 to 107, where said verification is performed downstream of the interconnection circuit (INTC).

Example 109. The method according to one of examples 104 to 108, where said verification includes local verifications (RISUi) performed at the slave resources from the configuration pieces of information respectively assigned to these slave resources.

Example 110. The method according to one of examples 104 to 109 as combined with one of examples 75 to 82, further including in the event that a read transaction emitted by a master piece of equipment and intended for a slave resource is not authorized to access this slave resource, returning to the master piece of equipment an indication of access denial (IR) and returning to the master manager piece of equipment, an illegal access notification (NIAC) containing an identifier of this slave resource, an indication of the type of access and the identification piece of information of the master piece of equipment at the origin of this denied transaction.

Example 111. The method according to one of examples 104 to no as combined with one of examples 75 to 82, further including, in the event that a write transaction emitted by a master piece of equipment and intended for a slave resource is not authorized to access this slave resource, the fact of ignoring this transaction and returning to the master manager piece of equipment, an illegal access notification (NIAC) containing an identifier of this slave resource, an indication of the type of access and the identification piece of information of the master piece of equipment at the origin of this denied transaction.

Example 112. The method according to one of examples 67 to 111 as combined with one of examples 75 to 82, including a storage of the identification piece of information of the current master manager piece of equipment, and an auxiliary verification including a comparison (171) between the identification piece of information of the current master manager piece of equipment and the identification piece of information of a master piece of equipment wishing to modify at least one piece of configuration information, and a prohibition of a modification of said at least one piece of configuration information to any master piece of equipment having an identification piece of information different from that of the master manager piece of equipment.

Example 113. The method according to one of examples 67 to 112, including among the master pieces of equipment at least one piece of master equipment having a slave port (PS) and a master port (PE), configuration pieces of information assigned to the slave port and configuration pieces of information assigned to the master port, the method further including, upon control and by taking into account inheritance rules, replacing at least some of the configuration pieces of information assigned to the master port with the homologous configuration pieces of information assigned to the slave port or else keeping the configuration pieces of information assigned to the master port.

Example 114. The method according to one of examples 67 to 113, including, —several microprocessors being among the master pieces of equipment, and at least one slave resource generating at least one interrupt signal (IRQ) intended for one of the microprocessors which is assigned to this slave resource, —several interrupt wires (FRQ1, FRQ2) being respectively connected to the microprocessors and to said at least one slave resource and capable of conveying interrupt signals, —routing the interrupt signal emitted by said slave resource only on the interrupt wire connected to the microprocessor which is assigned thereto.

Example 115. The method according to one of examples 67 to 114, including—a first microprocessor (CPU1) configured to boot during a first booted of the system on a chip so as to allow the implementation of the configuration diagram, —restoring the configuration diagram by a second master piece of equipment (CPU2) in the event of an exit from a standby mode of the system on a chip.

Example 116. The method according to example 115 as combined with one of examples 75 to 82, where the first microprocessor being the master manager piece of equipment before entering the standby mode, the restoration (205) includes—backing up the configuration diagram to be restored, —storing upon control of the first microprocessor, a restore program executable by the second master piece of equipment, —securely storing a signature of said restore program as well as the start address of the restore program, —generating a wake-up signal to the second master piece of equipment when the system on a chip exits from the standby mode, and—in the presence of said wake-up signal, keeping the first microprocessor in standby state, verifying said signature, and in the event of successful verification, temporarily allocating to the second master piece of equipment the quality of master manager piece of equipment and executing the restore program by the second master piece of equipment, then when the restoration is complete, withdrawing the quality of the master manager piece of equipment to the second master piece of equipment, exiting the first microprocessor from the standby mode, and allocating to the first microprocessor its quality of master manager piece of equipment.

Example 117. The method according to one of examples 67 to 116 as combined with example 116, including assigning to a test access port (DAP) forming part of the master pieces of equipment and intended to be coupled to an external debugging tool, a test identification piece of information (Debug_CID), and any slave resource accepts to receive a transaction including this test identification piece of information, after verifying said security piece of information (SEC) and said privileged piece of information (PRV) attached to said transaction.

Example 118. The method according to example 117, as combined with any of examples 75 to 82, where only the master manager piece of equipment assigns the test identification piece of information only to the test access port (DAP).

Example 119. The method according to one of the preceding examples, where the system on a chip forms a microcontroller (MCU) or a microprocessor.

Example 120. A system including a first port configured to simultaneously couple with a first device and a second device; and a management circuit configured to route a data signal received from a first controller to the first device in response to receiving a first-device direction from the first controller and route the data signal received from the first controller to the second device in response to receiving a second-device direction from the first controller unless an override condition for the management circuit is satisfied.

Example 121. The system of Example 120, wherein the management circuit is configured to route the data signal received from the first controller to the second device in response to receiving the first-device direction when the override condition in satisfied.

Example 122. The system of Example 121 or Example 120, wherein the management circuit is configured to route the data signal received from the first controller to the first device in response to receiving the second-device direction when the override condition in satisfied.

Example 123. The system of Example 120 through Example 122, further including an elementary verification circuit configured to grant access to a first master piece of equipment to the first controller and a second elementary verification circuit configured to grant access to a second master piece of equipment to a second controller.

Example 124. The system of Example 120 through Example 123, wherein the management circuit includes: a multiplexer including a first input configured to receive the first-device direction and a second input configured to receive an override-direction and a selection signal to toggle an output of the multiplexer between the first input and the second input depending on the override condition.

Example 125. The system of Example 120 through Example 124, further including a second port configured to couple with a third device and a fourth device, wherein the management circuit is configured to route a data signal received from a second controller to the third device or the fourth device depending on a direction signal received from the second controller unless the override condition for the management circuit is satisfied.

Example 126. The system of Example 120 through Example 125, through, wherein the management circuit further includes a control register and wherein the override condition is met when a memory location is set to an override value.

Example 127. The system of Example 120 through Example 126, wherein an elementary verification circuit is configured to limit external accessibility to the control register to a chosen master piece of equipment.

Example 128. The system of Example 120 through Example 127, wherein the management circuit is further configured to route a data signal received from a second controller to the first device in response to receiving a first-device direction from the second controller and route the data signal received from the second controller to the second device in response to receiving a second-device direction from the second controller unless the override condition for the management circuit is satisfied.

Example 129. A system to route data including: a first port configured to couple with a single device and couple with two devices; a second port configured to couple with a single device and couple with two devices; and a management circuit ring a first mode, the management circuit configured to route a data signal received from a first controller to the single device coupled with the first port and route a data signal received from a second controller to the single device coupled with the second port in the first mode, a second mode, the management circuit configured to route the data signal received from the first controller to the single device coupled with the second port and route the data signal received from the second controller to the single device coupled with the first port in the first mode, and a third mode, the management circuit configured to route the data signal received from the first controller to a first device of two devices coupled with the first port in response to receiving a first-device direction from the first controller and route the data signal received from the first controller to a second device of two devices coupled with the first port in response to receiving a second-device direction from the first controller unless an override condition for the management circuit is satisfied.

Example 130. The system of Example 129, wherein the management circuit includes a fourth mode, the management circuit configured to route the data signal received from the first controller to the first device of two devices coupled with the second port in response to receiving the first-device direction from the first controller and route the data signal received from the first controller to the second device of two devices coupled with the second port in response to receiving the second-device direction from the first controller unless the override condition for the management circuit is satisfied.

Example 131. The system of Example 129 through Example 130, wherein the management circuit is further configured to route the data signal received from the first controller to the second device of two devices coupled with the first port in response to receiving the first-device direction when the override condition in satisfied in the third mode.

Example 132. The system of Example 129 through Example 131, wherein the management circuit is configured to route the data signal received from the first controller to the first device of two devices coupled with the first port in response to receiving the second-device direction when the override condition in satisfied in the third mode.

Example 133. The system of Example 129 through Example 133, the management circuit being configured to route the data signal received from the second controller to the first device of two devices coupled with the first port in response to receiving a first-device direction from the second controller and route the data signal received from the second controller to the second device of two devices coupled with the first port in response to receiving a second-device direction from the second controller unless the override condition for the management circuit is satisfied.

Example 134. The system of Example 129 through Example 133, wherein the management circuit further includes a control register and wherein the override condition is met when a memory location is set to an override value.

Example 135. The system of Example 129 through Example 134, wherein an elementary verification circuit is configured to limit external accessibility to the control register to a chosen master piece of equipment.

Example 136. A method to route data received from a first controller, the method including: receiving a data signal from the first controller; receiving a direction from the first controller to deliver the data signal to a first of two devices coupled with a port; determining that an override condition has been met; and interrupting delivery of the data signal to the first of two devices coupled with the port.

Example 137. The method of Example 136, wherein the override condition includes storing an override value in a control register.

Example 138. The method of Example 136 through 137, further including receiving the direction from the first controller at a first input for a MUX, receiving an override direction at a second input for the MUX, and routing the data signal to a second of two devices coupled with the port by selecting the second input of the MUX as an output of the MUX.

Example 139. The method of Example 136 through 138, wherein interrupting delivery of the data signal to the first of two devices coupled with the port includes blanking the data signal with an OR gate.

What is claimed is:

1. A system on chip (SoC) comprising:
   a first external port of the SoC, configured to simultaneously couple with first and second devices external to the SoC; and
   a management circuit on the SoC, configured to route a first data signal received from a first controller on the SoC to the first device via first inter-device data bussing in response to receiving a first-device direction from the first controller, and route the first data signal received from the first controller to the second device via second inter-device data bussing in response to receiving a second-device direction from the first controller, in accordance with an override condition for the management circuit not being satisfied, wherein the first inter-device data bussing and the second inter-device data bussing each has at least one individual data pin of the SoC not shared with the other inter-device data bussing.

2. The system of claim 1, wherein the management circuit is configured to route the first data signal received from the first controller to the second device via the second inter-device data bussing in response to receiving the first-device direction in accordance with the override condition being satisfied.

3. The system of claim 1, wherein the management circuit is configured to route the first data signal received from the first controller to the first device via the first inter-device data bussing in response to receiving the second-device direction in accordance with the override condition being satisfied.

4. The system of claim 1, further comprising an elementary verification circuit configured to grant access to a first master piece of equipment to the first controller and a second elementary verification circuit configured to grant access to a second master piece of equipment to a second controller.

5. The system of claim 1, wherein the management circuit comprises:
   a multiplexer comprising a first input configured to receive the first-device direction and a second input configured to receive an override-direction and a selection signal to toggle an output of the multiplexer between the first input and the second input depending on the override condition.

6. The system of claim 1 further comprising a second external port of the SoC configured to simultaneously couple with third and fourth devices external to the SoC, wherein the management circuit is configured to route a second data signal received from a second controller on the SoC to the third device via third-device bussing or the fourth device via fourth-device bussing depending on a direction signal received from the second controller in accordance with the override condition for the management circuit not being satisfied.

7. The system of claim 1, wherein the management circuit further comprises a control register and wherein the override condition is satisfied when a memory location in the control register is set to an override value.

8. The system of claim 7, wherein an elementary verification circuit is configured to limit external accessibility to the control register to a chosen master piece of equipment.

9. The system of claim 1, wherein the management circuit is further configured to route a second data signal received from a second controller to the first device via the first inter-device data bussing in response to receiving another first-device direction from the second controller and route the second data signal received from the second controller to the second device via the second inter-device data bussing in response to receiving another second-device direction from the second controller in accordance with the override condition for the management circuit being satisfied.

10. A system on chip (SoC) comprising:
   a first external port of the SoC, configured to couple with a single first device external to the SoC and configured to couple with third and fourth devices external to the SoC;
   a second external port of the SoC, configured to couple with a single second device external to the SoC and configured to couple with fifth and sixth devices external to the SoC; and
   a management circuit on the SoC, comprising:
      a first mode in which the management circuit is configured to route a first data signal received from a first controller on the SoC to the single first device coupled with the first external port and route a second data signal received from a second controller on the SoC to the single second device coupled with the second external port in the first mode,
      a second mode in which the management circuit is configured to route the first data signal received from the first controller to the single second device coupled with the second external port and route the second data signal received from the second controller to the single first device coupled with the first external port, and
      a third mode in which the management circuit is configured to route the first data signal received from the first controller to one of the third and fourth devices coupled with the first external port, via first inter-device data bussing, in response to receiving a first-device direction from the first controller, and route the first data signal received from the first controller to the other of the third and fourth devices coupled with the first external port, via second inter-device data bussing, in response to receiving a second-device direction from the first controller, in accordance with an override condition for the management circuit not being satisfied, wherein the first inter-device data bussing and the second inter-device data bussing each has at least one individual data pin of the SoC not shared with the other inter-device data bussing.

11. The system of claim 10, wherein the management circuit comprises a fourth mode in which the management circuit is configured to route the first data signal received from the first controller to one of the fifth and sixth devices coupled with the second external port, via third-device bussing, in response to receiving the first-device direction from the first controller and route the first data signal received from the first controller to the other of the fifth and sixth devices coupled with the second external port, via fourth-device bussing, in response to receiving the second-device direction from the first controller, in accordance with the override condition for the management circuit not being satisfied.

12. The system of claim 10, wherein the management circuit is further configured to route the first data signal received from the first controller to the other of the third and fourth devices coupled with the first external port, via the second inter-device data bussing, in response to receiving the first-device direction in accordance with the override condition being satisfied in the third mode.

13. The system of claim 12, wherein the management circuit is configured to route the first data signal received from the first controller to the one of the third and fourth devices coupled with the first external port, via the first inter-device data bussing, in response to receiving the second-device direction in accordance with the override condition being satisfied in the third mode.

14. The system of claim 10, wherein the management circuit is configured to route the second data signal received from the second controller to the one of the third and fourth devices coupled with the first external port, via the first inter-device data bussing, in response to receiving another first-device direction from the second controller, and route the second data signal received from the second controller to the other device of the third and fourth devices coupled with the first external port, via the second inter-device data bussing, in response to receiving another second-device direction from the second controller, in accordance with the override condition for the management circuit not being satisfied.

15. The system of claim 10, wherein the management circuit further comprises a control register and wherein the override condition is satisfied when a memory location in the control register is set to an override value.

16. The system of claim 15, wherein an elementary verification circuit is configured to limit external accessibility to the control register to a chosen master piece of equipment.

17. A method to route data received from a first controller on a system on chip (SoC), the method comprising:
   receiving, by a management circuit on the SoC, a data signal from the first controller;
   receiving, by the management circuit, a direction from the first controller to deliver the data signal, via first inter-device data bussing, to a first of two devices simultaneously coupled with an external port of the SoC, the two devices being external to the SoC, the first of the two devices being coupled to the SoC by the first inter-device data bussing, and a second of the two devices being coupled to the SoC by second inter-device data bussing, the first inter-device data bussing and the second inter-device data bussing each having at least one individual data pin of the SoC not shared with the other inter-device data bussing;
   determining, by the management circuit, that an override condition has been met;
   interrupting, by the management circuit, delivery of the data signal to the first of the two devices coupled with the external port; and
   routing the data signal, via the second inter-device data bussing to the second of the two devices coupled with the external port by selecting a second input of a multiplexer as an output of the multiplexer.

18. The method of claim 17, wherein the override condition comprises storing an override value in a control register.

19. The method of claim 17, further comprising:
receiving, by the management circuit, the direction from the first controller at a first input of the multiplexer; and
receiving an override direction at the second input of the multiplexer.

20. The method of claim 17, wherein interrupting delivery of the data signal to the first of the two devices coupled with the external port comprises blanking, by the management circuit, the data signal with an OR gate or an AND gate.

* * * * *